US009483169B2

(12) United States Patent
Horn

(10) Patent No.: US 9,483,169 B2
(45) Date of Patent: Nov. 1, 2016

(54) COMPUTER SYSTEM FOR AUTOMATIC ORGANIZATION, INDEXING AND VIEWING OF INFORMATION FROM MULTIPLE SOURCES

(71) Applicant: Bruce L Horn, Mammoth Lakes, CA (US)

(72) Inventor: Bruce L Horn, Mammoth Lakes, CA (US)

(*) Notice: Subject to any disclaimer, the term of this patent is extended or adjusted under 35 U.S.C. 154(b) by 0 days.

(21) Appl. No.: 14/984,960

(22) Filed: Dec. 30, 2015

(65) Prior Publication Data

US 2016/0117071 A1 Apr. 28, 2016

Related U.S. Application Data

(60) Continuation of application No. 14/589,900, filed on Jan. 5, 2015, now Pat. No. 9,229,945, which is a continuation of application No. 13/609,078, filed on Sep. 10, 2012, now abandoned, which is a continuation of application No. 13/272,028, filed on Oct. 12, 2011, now Pat. No. 8,280,932, which is a continuation of application No. 12/856,428, filed on Aug. 13, 2010, now Pat. No. 8,055,692, which is a continuation of application No. 11/903,304, filed on Sep. 21, 2007, now Pat. No. 7,840,619, which is a division of application No. 10/621,689, filed on Jul. 16, 2003, now Pat. No. 7,275,063.

(60) Provisional application No. 60/396,439, filed on Jul. 16, 2002.

(51) Int. Cl.
*G06F 17/30* (2006.01)
*G06F 3/0485* (2013.01)
*G06F 3/0482* (2013.01)
*G06F 3/0484* (2013.01)
*G06F 7/08* (2006.01)
*G09G 5/14* (2006.01)

(52) U.S. Cl.
CPC ........... *G06F 3/0485* (2013.01); *G06F 3/0482* (2013.01); *G06F 3/04845* (2013.01); *G06F 7/08* (2013.01); *G06F 17/3002* (2013.01); *G06F 17/30067* (2013.01); *G06F 17/30091* (2013.01); *G06F 17/30554* (2013.01); *G06F 17/30572* (2013.01); *G06F 17/30598* (2013.01); *G06F 17/30607* (2013.01); *G06F 17/30864* (2013.01); *G09G 5/14* (2013.01); *G06F 2203/04803* (2013.01); *G06F 2203/04804* (2013.01); *Y10S 707/99943* (2013.01)

(58) Field of Classification Search
CPC ..................... G06F 17/30705; G06F 17/3002; G06F 17/30067; G06F 17/30598; G06F 17/30091; G06F 17/30607
USPC .......................................... 707/743; 715/768
See application file for complete search history.

(56) References Cited

U.S. PATENT DOCUMENTS 5,630,125 A * 5/1997 Zellweger ......... G06F 17/30994
6,133,914 A * 10/2000 Rogers .................. G06F 3/0482
345/473

(Continued)

*Primary Examiner* — Jean M Corrielus
(74) *Attorney, Agent, or Firm* — Ascenda Law Group, PC

(57) ABSTRACT

A computer data processing system including a central processing unit configured with an integrated computer control software system for the management of data objects including dynamic and automatic organization, linking, finding, cross-referencing, viewing and retrieval of multiple objects regardless of nature or source. The system provides an underlying component architecture having an object-oriented database structure and a metadata database structure which stores only one instance of each object while linking the object to multiple collections and domains for grouping into and retrieval from any of the collections. The system employs configurable, extensible attribute/properties of data objects in metadata format, and a user-configurable interface that facilitates information management.

13 Claims, 45 Drawing Sheets

(56) References Cited

U.S. PATENT DOCUMENTS

| | | | |
|---|---|---|---|
| 6,401,097 B1 * | 6/2002 | McCotter | G06F 17/30011 |
| 6,493,720 B1 * | 12/2002 | Chu | G06F 17/30353 |
| 6,611,840 B1 * | 8/2003 | Baer | G06F 17/3089 |
| | | | 707/812 |
| 6,732,120 B1 * | 5/2004 | Du | G01C 21/20 |
| | | | 707/743 |
| 6,985,905 B2 * | 1/2006 | Prompt | G06F 17/30893 |
| | | | 707/829 |
| 7,043,488 B1 * | 5/2006 | Baer | G06F 17/3002 |
| 7,552,139 B2 * | 6/2009 | Smith | G06F 17/30705 |
| 2002/0103818 A1 * | 8/2002 | Amberden | G06F 17/30873 |
| 2003/0009536 A1 * | 1/2003 | Henderson | G06Q 10/10 |
| | | | 702/219 |
| 2003/0105765 A1 * | 6/2003 | Smith | G06F 17/30705 |

* cited by examiner

Figure 6

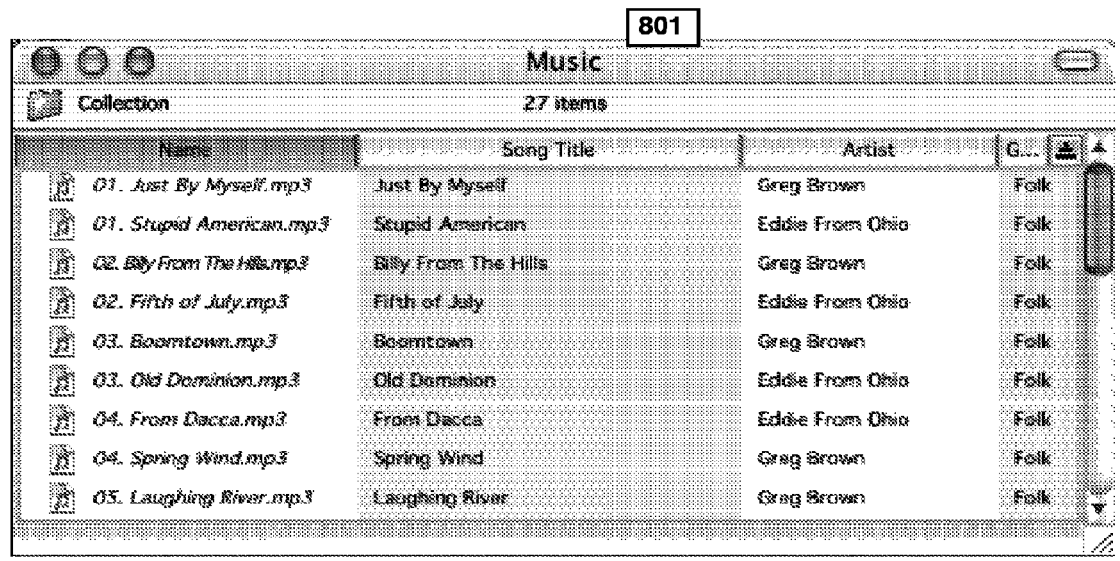
Figure 8

```
pascal OSErr FSpLocationFromFullPath(short fullPathLength,
         const void *fullPath,
         FSSpec *spec)
{
 AliasHandle alias;
 OSErr    result;
 Boolean  wasChanged;
 Str32    nullString;

/* Create a minimal alias from the full pathname */
 nullString[0] = 0; /* null string to indicate no zone or server name */
 result = NewAliasMinimalFromFullPath(fullPathLength, fullPath, nullString,
 nullString, &alias);
 if ( result == noErr )
 {
  /* Let the Alias Manager resolve the alias. */
  result = ResolveAlias(NULL, alias, spec, &wasChanged);

/* work around Alias Mgr sloppy volume matching bug */
  if ( spec->vRefNum == 0 )
  {
    /* invalidate wrong FSSpec */
    spec->parID = 0;
    spec->name[0] =  0;
    result = nsvErr;
  }
  DisposeHandle((Handle)alias); /* Free up memory used */
 }
 return ( result );
}
```

Figure 9b

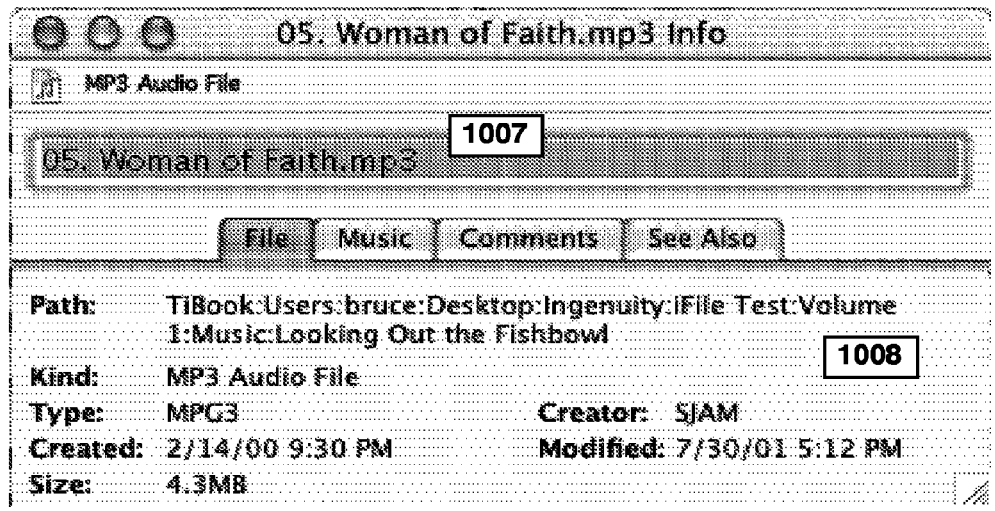
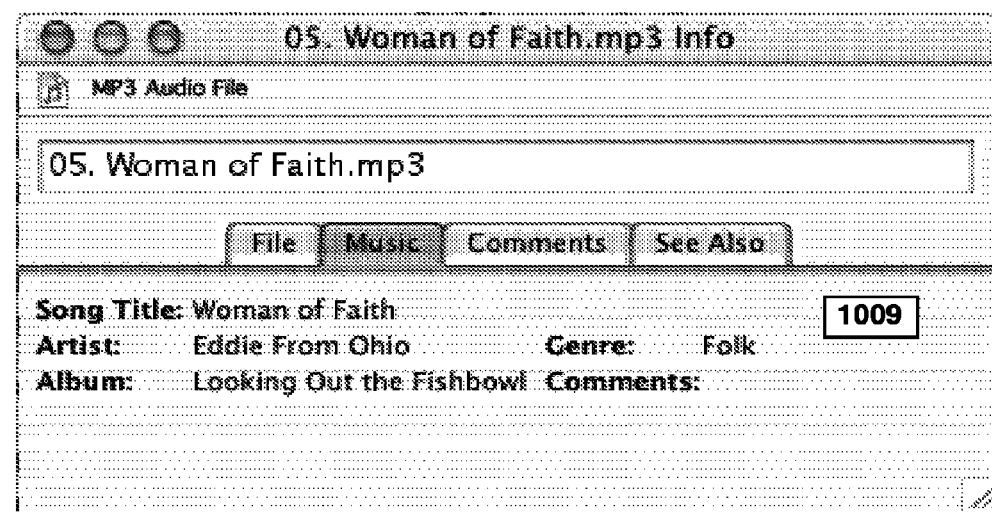
Figure 10b

| Files Domain | Collections<br>Volumes | Objects<br>Volume<br>Directory<br>File |
|---|---|---|
| Music Domain | Collections<br>Artist<br>Album<br>Genre<br>Rating | Objects<br>mp3 file<br>wmp file |
| Images Domain | Collections<br>JPEG<br>PDF<br>BMP<br>Black and White<br>Nikon Coolpix<br>... | Objects<br>JPEG file<br>PDF file<br>BMP file<br>GIF file<br>PSD file<br>... |
| WebDAV Domain | Collections<br>Remote Volumes<br>Websites | Objects<br>Remote files |
| Finance Domain | Collections<br>Accounts<br>Payables<br>Receivables | Objects<br>Payees<br>Checks<br>... |

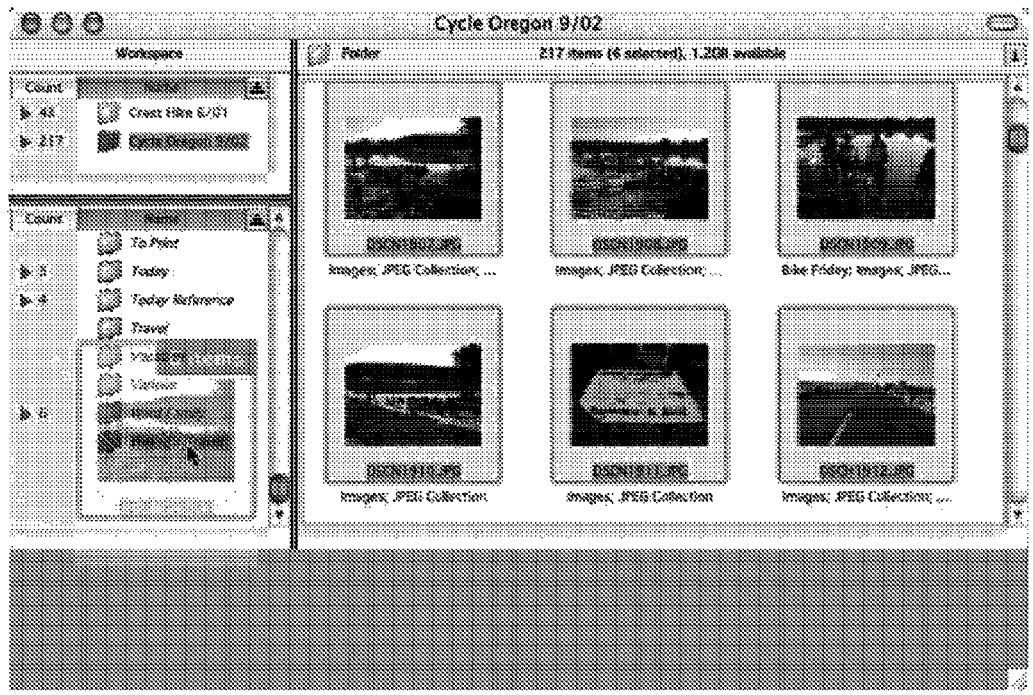
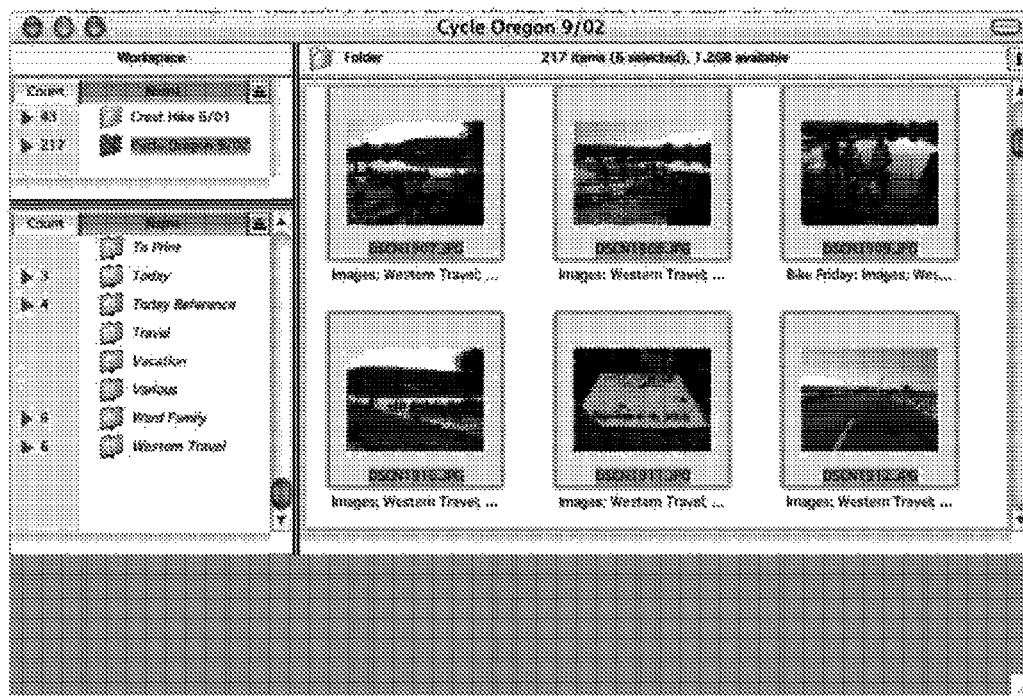
Figure 30

COMPUTER SYSTEM FOR AUTOMATIC ORGANIZATION, INDEXING AND VIEWING OF INFORMATION FROM MULTIPLE SOURCES

CROSS-REFERENCE TO RELATED APPLICATIONS

This application is a Continuation of application Ser. No. 14/589,900, filed Jan. 5, 2015, which is a Continuation of application Ser. No. 13/609,078, filed Sep. 10, 2012, which is a Continuation of application Ser. No. 13/272,028, filed Oct. 12, 2011, now U.S. Pat. No. 8,280,932, issued Oct. 2, 2012, which is a Continuation of application Ser. No. 12/856,428 filed Aug. 13, 2010, now U.S. Pat. No. 8,055,692, issued Nov. 8, 2011, which is a Continuation of application Ser. No. 11/903,304, filed Jul. 21, 2007, now U.S. Pat. No. 7,840,619, issued Nov. 12, 2010, which is a Divisional of application Ser. No. 10/621,689 filed Jul. 16, 2003, now U.S. Pat. No. 7,275,063, issued Oct. 5, 2007, which is a Nonprovisional of and claims priority to Application No. 60/396,439, filed Jul. 16, 2002.

FIELD OF THE INVENTION

The invention relates to computer data processing systems that include central processing units configured with novel software-based information management systems, including but not limited to: file system browsers; personal information management systems; database storage, organization, accessing and retrieval systems; digital asset management systems; email client and server operation; integrated software development environments; internet- or intranet-based search engines; and similar information services and systems.

BACKGROUND

A primary use of computer information systems is the creation, organization, transmission and storage of information of a variety of types in the form of content data, including but not limited to word processing documents; spreadsheets; images; drawings; photographs; sounds; music; email; software source code; web pages, both local and remote; application programs; name and address lists; appointments; notes; calendar schedules; task lists; personal finance management data; corporate customer, department, employee, stocking and accounting data; and so on.

Generally, this information data is stored in either individual file system entities (files) of proprietary formats stored on a local or LAN or WAN network disk drive or accessed via the Internet, such as a word processing document or databases with specialized access software. For example, email messages are often stored bundled together in a single file, and new messages are retrieved from a remote server via an Internet protocol; access requires a specific email client to manage these messages. Similarly, accessing information in a database requires specialized programs that are compatible with the database format or network access protocol to communicate with a server to store or retrieve the information and display it in a useful format.

Although file data strings (the string of digital bits that comprise the content data or object) are generally accompanied by a small, rudimentary amount of metadata about the file, i.e., data that represents properties describing the file contents (such as one or more of: the file's name, the creation date, the last modification date, access privileges, and possibly a comment), there is typically very little or no metadata conveying information as to the internal structure or meaning of the file's contents, that is, no metadata about the content data. Some files do have internal descriptions of the contents, but this data is often difficult to access, requiring special applications to read and not otherwise generally available to the user. Similarly, records in a database lack information that is needed for use in file systems. In general, database records cannot be manipulated in the same way as files in a file system.

Thus, the differences in the nature and manner in which content data is stored in individual files and in proprietary databases, and the lack of useful metadata about the files or the database content data, makes them closed and partitioned. This closed and partitioned nature of files and databases poses numerous, significant organizational, archival and retrieval problems.

File system browsers, due to their bounded (strictly limited) knowledge of file contents created by various and possibly unknown software applications, are limited to organizing files by the basic metadata properties provided by the file system itself: by name, various dates, and by directory or folder.

Finally, there is no general software mechanism (program) in contemporary operating systems to link or group information from diverse independent sources when they are managed by separate applications. This problem with presently available operating systems and application programs was succinctly set forth by Mr. Mundie of Microsoft as follows (referring to Bill Gates):

The scenario is the dream, not something defined in super-gory detail," says Mundie. "It's what Bill and I focus on more than the business plans or P&Ls. For a project as big as Longhorn, there could have been 100 scenarios, but Bill does this thing with his mind where he distills the list down to a manageable set of factors that we can organize developer groups around." Gates' scenarios usually take the form of surprisingly simple questions that customers might have. Here's a sampling from our interviews:

"Why are my document files stored one way, my contacts another way, and my e-mail and instant-messaging buddy list still another, and why aren't they related to my calendar or to one another and easy to search en masse? . . . "

(Quote from Fortune Magazine, available on the Internet at: http://www.fortune.com/fortune/ceo/articles/0,15114, 371336-3,00.html In addition, data stored in computer systems does not have, as a fundamental aspect, relationship information other than the most trivial of forms. For example, files may be grouped together within folders or directories, or they may be labeled with a color, but otherwise there is very little functionality to allow the grouping or linking of disparate pieces of information within the system.

In particular, when a file or other piece of information is logically involved in multiple groupings, linking, cross-referencing or relating the groupings is cumbersome at best with current systems. For example, where a given file "myCarFinances.doc" logically should be grouped in both a "Finances" group and an "Autos" group, there are no truly easy choices for accomplishing such multiple grouping. Either a copy of the file must be made in two separate "Finances" and "Autos" folders, in which case the user must be careful to update both files when changes are made; or a shortcut or alias file must be created and placed in these folders. Both currently available approaches involve tedious, repetitive manual effort to create and manage that becomes exponentially more difficult as the number of groupings or cross-references increases.

Because of this, cross-referencing and filing objects in multiple locations is difficult, error-prone, and time-consuming. If copies are made for each location, valuable disk space is wasted, and the user is left with having to manage changes by making new copies whenever the original is modified and remembering every location of every copy. Many cross-references require many copies, further complicating the task. And even if the user decides to create alias files instead of making actual copies, the alias files still take up space, and the management issue is equally complex and time-consuming.

Accordingly, there is a long felt need in the art to provide a truly open computer system having data structures, input interfaces, displays and operational systems that permits the organization of information, as data objects, in a wide variety of files and databases, which computer system is independent of the source of the information objects, is dynamic and automatic, permitting faster archiving, retrieval and viewing of the information and providing more meaningful and useful links for better organization and indexing of the information. What is needed is a simple-to-use data structure and operating mechanism to link information together in a dynamic, memory-and-space-efficient manner, without modifying the original information or propagating numerous, storage-space-robbing duplicates, each of which individually must be updated as new versions arise.

DEFINITION OF TERMS

It is to be understood that references to the following terms in this application shall have the corresponding meaning provided (even when used in lower case and not in bold):

Metadata Filing System, abbreviated herein MFS: means the inventive integrated software system for the management of informational objects on a computer system through the comprehensive use of metadata as defined herein, for recognizing, organizing, creating and viewing relationships between such objects which comprises one or more software applications that provide both a user-interface and an underlying component architecture for the management and display of the user's information.

Annotation or annotation metadata: means metadata that was not originally associated with an object, but which is defined or specified by either the user or the system for organizational purposes.

B-Tree: means a data structure by which information may be stored efficiently on disk, with a minimum of disk accesses to fetch a particular piece of information using an ordered key such as a numeric identifier or a sortable string of text.

Cache: means a special storage location in memory or on disk where objects and their associated metadata properties may be very quickly retrieved.

Catalog: means a special database built upon the object store that stores and retrieves reference objects addressed by UUID and their special metadata properties of this invention; performs queries on objects by specified metadata property selection or designation; notifies other processes of the metadata property changes; and maintains a dependency graph of objects.

Classifier: means a process by which objects are examined and assigned to one or more containers or collections for the purpose of gathering together objects with similar or the same properties specified in a Boolean-type metadata expression and/or key phrase match.

Collection: means a grouping of objects based on a metadata specification describing properties that all objects in the group have in common, or objects that were grouped together specifically by the user as having some shared meaning or logical grouping.

Container: means an object in which other objects may be grouped together for the purpose of organization. A collection is a special type of container, and containers may contain other containers.

Domain: means an object that includes processes for creating and managing reference objects of specific types, including new classes of objects, in a consistent manner. Domains permits grouping objects by nature, class of information in them, or processes of dealing with them. For example, a domain designated "EMail" may define reference objects for email messages; a mailbox object; a mailbox signature; and so on. The EMail domain also provides a location and retrieval process by which messages are retrieved from a central server and stored locally in the system. A domain designated "File" may define reference objects, explained below, for files, directories, and volumes, as well as a scanning and matching process that creates a mirrored representation within MFS of a directory subtree specified in a Working Set.

Event: an occurrence of note that may be acted upon by a thread (defined below) to perform a task.

Link or link metadata: means metadata that is specifically defined, updated, and accessed for the purpose of linking together and organizing reference objects logically in collections and other containers.

Metadata: means data representing a set of properties of a given type and meaning, that is user-definable and selectable data about the contents of an object, possibly including but having more data than conventional, ordinary, presently used "metadata". Examples of metadata properties in the inventive application software system include, but are not limited to, names; dates and times; comments; locations; descriptions; markers; icons; sizes; dimensions, exposure data, and copyright of images; keywords and phrases; colors; annotations; links; groups; containment; ownership; access restrictions; and so on. Metadata as referred to herein is to be distinguished from currently used "ordinary metadata", which is rudimentary data that identifies or names an object, such as a file (e.g. "miscellaneous" or "photos"), but that does not include data about the contents of an object (about the content data of the object). Metadata as used herein more particularly includes specially formulated and used "annotation metadata" and "link metadata", defined in detail in the description below, including by context and example.

Object: means any piece of information stored in a digital format, including but not limited to file system entities such as files and folders; specific entities such as documents, applications, images, sounds, music files, and the like; contact or name/address records, which may be stored as individual files or multiple records within a single file; received and sent email messages; and objects that act as containers to hold other objects.

Object Store: means a special database that stores and retrieves object data by unique identifier (UID).

Property: means a user definable or selected descriptor of a certain kind for the purpose of attributing characteristics or values to an object in the form of content information metadata that can be used to classify objects into collections. A group of properties set, created or selected by the user or a Domain for a particular object is considered the object's metadata. In the inventive system, specific link metadata is a special property of all reference objects in the WS, provided to organize reference objects logically in collections and other containers.

Reference Object: means an object internally created and stored in the catalog and object store, which represents data originating externally (such as files or email messages) that are managed within WS, the inventive metadata filing system.

Thread: means a software entity that performs a particular task simultaneously, and asynchronously, with other threads.

Unique Identifier, UID: means an identifier that is unique within the scope of an object store.

Universally Unique Identifier, UUID: means an identifier which is used to uniquely specify reference objects within the inventive metadata filing system, as well as provide a one-to-one mapping between external data (for example, files in the file system) and reference objects.

Value: means a Boolean, float, integer, date, time, text string, image, or other measure or metric of a property of an object.

Working Set: means the set of sources of information, either created internally or imported from or received from external originators, that the inventive MFS, metadata filing system, manages. This includes data from file systems, either local or remote on a network; web addresses; email servers; and the like.

SUMMARY

The invention comprises a computer data processing system, described in more detail below, that includes a central processing unit configured with operating system and applications software, the latter which includes a novel integrated computer control software system for the management of informational objects including recognizing, organizing, creating and viewing relationships between multiple objects. The overall inventive computer control system, given the shorthand term "MFS" for metadata filing system, includes one or more novel software applications that provide both a user-interface and underlying component architecture, including an object-oriented database structure, or object store, and a metadata database structure, or catalog, for the management and rendering of these objects to a display viewable by a user in response to user input, regardless of the source or nature of the object.

The inventive MFS computer data processing system for automatic organization, indexing and viewing of information objects from multiple sources is characterized by: at least one central processing unit configured with client operating system and applications software; (and/or in the case of Internet operations the MFS system is configured with server software to host a site on the Internet including the serving of both static, generally informational Web pages, and dynamic Web pages, of information to individuals including information that may be generated on the fly in response to individual requests, routers and interfaces including at least one client and/or network interface to at least one network data communication device for exchange of data among computers, routers and input devices); and peripheral input and output devices linked to said client/server central processing unit in an architecture so as to provide client and/or site operation and functionality; said central processor unit includes at least one memory coupled to a bus; said memory including selected program structures stored therein, including an operating system program structure, at least one client and/or server system management program structure, at least one hierarchical data storage management system program structure, and selected application program code structures including the novel MFS code structure described herein; said central processing unit reading data input so as to implement system functionality selected from operational, computational, archival, sorting, screening, classification, formatting, rendering, printing and communication functions and processes; and data record structures selectably configurable in object, metadata, relational or hierarchical databases and which data records are selectably associatable, correlatable and callable; said central processing unit reading from user, network or Internet server input devices data relating to objects received by, created by or selected by individual users, and processing such data in said central processing unit so as to generate and manage informational objects by special metadata linking to reference objects created, received or selected and/or input by users, and so as to provide information management tools that facilitate communication to generate, transmit and receive, archive, search, order, retrieve and render objects, including information organization personalized for each individual user based on preferences selected by the user.

The inventive MFS computer data processing system apparatus for automatic organization, indexing and viewing of information objects from multiple sources includes a computer-readable memory structured to store object information in an object oriented database and metadata in a catalog database, a computer display connected to said memory means for displaying said objects, a computer-operator (user) interface device for inputting information to specify objects or properties of objects, sources of external objects for management by the inventive MFS system, a computer processor connected to said memory for transferring said specifying information to storage in said memory, link metadata in a second catalog database in said memory linking said specifying information to said objects to provide rendering thereof on a display for viewing by the computer system users.

The computer(s) of the invention can be configured in a system architecture, for example, as one or more client or server computer(s), database computer(s), routers, interfaces and peripheral input and output devices, that together implement the system and network(s) to which a client computer system may be connected. A computer used in the inventive system typically includes at least one processor and memory coupled to a bus. The bus may be any one or more of any suitable bus structures, including a memory bus or memory controller, peripheral bus, and a processor or local bus using any of a variety of bus architectures and protocols. The memory typically includes volatile memory (e.g., RAM) and fixed and/or removable non-volatile memory (e.g., ROM, Flash, hard disk including in RAID arrays, floppy disc, mini-drive, Zip, Memory stick, PCMCIA card, tape, optical (CD-ROM, etc.), DVD, magneto-optical, and the like), to provide for storage of information, including computer-readable instructions, data structures, program modules, operating systems, and other data used by the computer(s). A network interface is coupled to the bus to provide an interface to the data communication network (LAN, WAN, and/or Internet) for exchange of data among the various local network users, site computers, routers, and other computing devices. The system also includes at least one peripheral interface coupled to the bus to provide communication with individual peripheral devices, such as keyboards, keypads, touch pads, mouse devices, trackballs, scanners, printers, speakers, microphones, memory media readers, writing tablets, cameras, modems, network cards, RF, fiber-optic and IR transceivers, and the like, A variety of program modules can be stored in the memory, including OS, server system programs, HSM (Hierarchical Storage Management) system programs, application programs including the MFS control system program(s), other programs modules and data. In a networked environment, the program modules may be distributed among several computing devices coupled to the network, and used as needed. When a program is executed, the program is at least partially loaded into the computer memory, and contains instructions for implementing the operational, computational, archival, sorting, screening, classification, formatting, rendering, printing and communication functions and processes described herein for the inventive MFS operation of automatic organization, indexing and viewing of information objects from multiple sources.

The inventive information object management system manages these objects, in the applications control program CPU-configured aspect, by scanning the created, selected or incoming objects' source data, whether files on disk or data provided by remote servers. When individual objects are recognized as contained in the source data, reference objects within the MFS system are created and tagged with UUIDs to provide a one-to-one mapping between external data and MFS reference objects. Specific knowledge of the data formats is used to extract any relevant information from the objects (e.g. ID3 tags for artist, genre, and so on for music files) to be used as metadata. This metadata is attached to the reference objects, which are stored in the catalog for fast access. As reference objects are created or are updated by MFS, they are collected into system and user-defined collections, which provide a logical grouping of objects based on one or more of three criteria: 1) user-defined categorization; 2) user or system-defined metadata query specification(s); and 3) user or system-defined key phrase matching.

The inventive MFS-configured CPU(s) streamline information management by providing a view of information objects of all domain natures (varieties) from different sources, with a simple, direct, shared and unified storage and linkage system that comprises the salient functionality of storage of only one object, the MFS reference object, and linking it to one or more collection groups by special user-created or selected MFS link metadata, including a UUID, which is in turn stored in a special MFS catalog database. The link metadata, including the UID and UUID, are aliased to the various MFS collections selected, set or created by the user in order to create the retrieval links from the various relevant collections to the reference object. The inventive MFS-configured system automatically updates stored reference objects' metadata (names, sizes, and the like) and links (collection and container membership), classifying incoming and changed objects by their content data and metadata, thereby automatically updating and creating new links to the growing number of objects in the various collections.

The inventive MFS-configured system provides an organizational structure and methodology for information management, including archival storage, retrieval, indexing, cross-referencing, logically grouping, and display of informational objects of all kinds. Objects may be created within MFS directly by the user, or within MFS through software components that create representations of information not stored directly within MFS, such as files and folders on a storage medium.

From the perspective of process, or method of operation of the MFS-configured computer system the CPU is caused to process as follows (by reference to an "external object" is meant an object outside MFS, although it can be one created by the client computer system or could be an incoming foreign object, that is, one sent from a distant server). When an external object is to be managed by MFS (whether incoming or locally created), MFS creates an internal representation of the object and stores the representation in the MFS object oriented database (OODB), called the object store, which assigns an internal unique identifier (UID), upon which it is termed the "reference object" (RO). The RO is simultaneously scanned and metadata is created (including a desktop icon) and/or extracted, and this metadata is associated (bit strings added to the object data) with the reference object. Only this metadata (including unique reference information for finding the external object, called the universally-unique ID, or UUID) is stored in the catalog database, not the entire external object itself. This process is "mirroring", with the reference object identified within the system by internal UID, and the association properties metadata being the "image" (or "virtual image") in the catalog. The system, as metadata are created upon selection or creation of collections or containers, "reflects" the reference object in them through tagging additional "path" and "hierarchy" link metadata to the properties metadata that is automatically associated with the reference object and stored in the catalog. Updates and changes to the reference objects also update the metadata in the catalog with the changes rippling throughout all the images in all collections instantly and simultaneously. User identification, selection, or creation of a collection writes the metadata for the selected object; dragging and dropping an object into a collection or container also auto-writes to the metadata, adding the relevant link. Searching the metadata, via automatic or user selected or created queries recalls the single reference object from the OODB, and if selected, the external object is retrieved from the external source (hard drive or other data storage), permitting a comprehensive desktop interface.

The inventive MFS-configured computer system application programs may be written in a wide range of computer languages, a suitable exemplary language being the C++ language. A number of equivalent versions of the inventive MFS program(s) can be written by a person skilled in the art of software development upon an understanding of the architecture, methodology and functional features disclosed herein. The inventive MFS applications can be run on a standard computer system architecture including a standard industry computer processor, input/output devices, a bit-mapped display, and at least one primary defined physical data storage area for temporary and permanent storage of data objects.

The following summary of the features of the inventive WS-configured computer system(s) and how these features are functionally realized will enable one skilled in the art to write suitable code for applications that realize the WS functionality.

Collections: The inventive MFS-configured CPU control program simultaneously classifies objects into multiple containers using link metadata rather than duplication, thereby allowing users to categorize objects in ways that most clearly reflect different approaches and ways of viewing the same information. Users can select predetermined collections provided in a basic menu, such as Family, Friends, Work, To Do, Activities, and Vacation when running the MFS program for the first time, and can create and set up user-defined collections as well.

Drag-And-Drop Categorization: Another feature of the inventive WS-configured computer system enables the user to organize all kinds of information, not merely simple files, through a drag-and-drop windows-and-icons software functionality, making it easy to organize objects and cross-reference them from place to place using a desktop-style interface. That is, clicking on the icon or list reference to an object in one collection window and dragging it into another collection window establishes a new link; the object is now accessible from both collections. And, rather than being duplicated in an object database, only the link metadata is placed in the catalog, with that catalog being updated for retrieval of the reference object from either collection. This drag-and-drop linkage creation without duplication is an extremely powerful function of the inventive application program.

Dynamic Queries: Another function of the inventive MFS-configured computer system provides novel ways to show relationships between information objects based on shared properties by querying the WS metadata and creating links dynamically, including but not limited to matching key phrases in an object's textual properties; matching dates and times, including date and time ranges or exact matches; filtering on sizes, ordering, or type; and so forth.

Partitioned Storage: Another function of the inventive WS applications program structure provides a unique and efficient mechanism for storage of objects and their properties, for fast and dynamic updating and retrieval, a partitioned storage organization comprising a catalog (a metadata database) and object store (an object database for storing object data, including B-Tree nodes, foundation and reference objects).

View By Reference: Another function of the inventive MFS program provides a novel mechanism for presenting non-apparent or unexpected relationships between objects by leveraging both the system's and the user's categorization mechanisms to show only relevant information through filtering and cross-referencing.

Sticky Paths: Another function of the inventive WS program provides a variety of hierarchical views of objects and their containment relationships and/or location paths within the user's computer system, including but not limited to list views whereby the visible objects' containment hierarchies are continuously made visible in a dynamically-updating portion of the window.

People, Activities, Time Orientation: Another function of the inventive MFS-configured computer system provides a basic set of organizational principles so users can intuitively manage their information in a way that reflects the information's relationships as they occur in the real world, including organizations based on people, projects, activities, time, places, etc.

Consistency Maintenance: Another function of the inventive WS-configured system keeps all object relationships up to date automatically, so that any changes in the user's information space (e.g., desktop) results in timely and appropriate changes to any object views.

Automatic Hypertext Linking: Another function of the inventive MFS-configured system utilizes the existing organizational structures and data to automatically create links between objects, including but not limited to hypertext inks in textual properties of objects such as the bodies of email messages or the contents of a document.

Extensible Domains: Another function of the inventive MFS-configured system provides a plug-in mechanism for other applications to take advantage of the features of the invention: MFS provides interfaces to permit one or more client applications to actively create new objects for, apply properties to, store, link, and classify the client application's information such that it may be viewed and collected in the same way as any other objects in the system. MFS provides the software functionality to dynamically restructure and link preexisting file systems, files, and databases in a way that is modular, scalable, and extensible.

BRIEF DESCRIPTION OF THE FIGURES AND DRAWINGS

The invention is described in more detail by reference to the figures and drawings in which.

Figure 3:
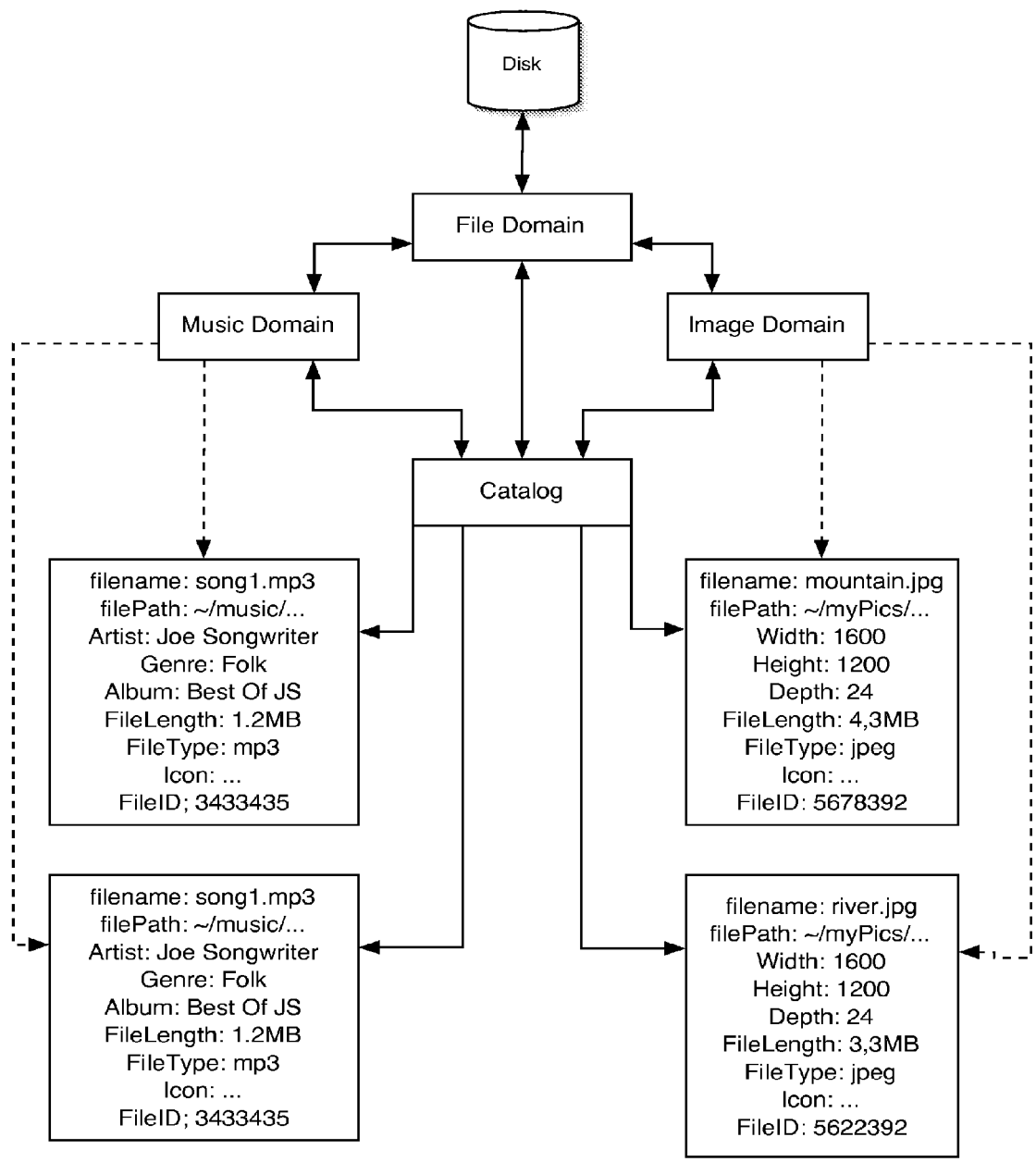
Figure 4:
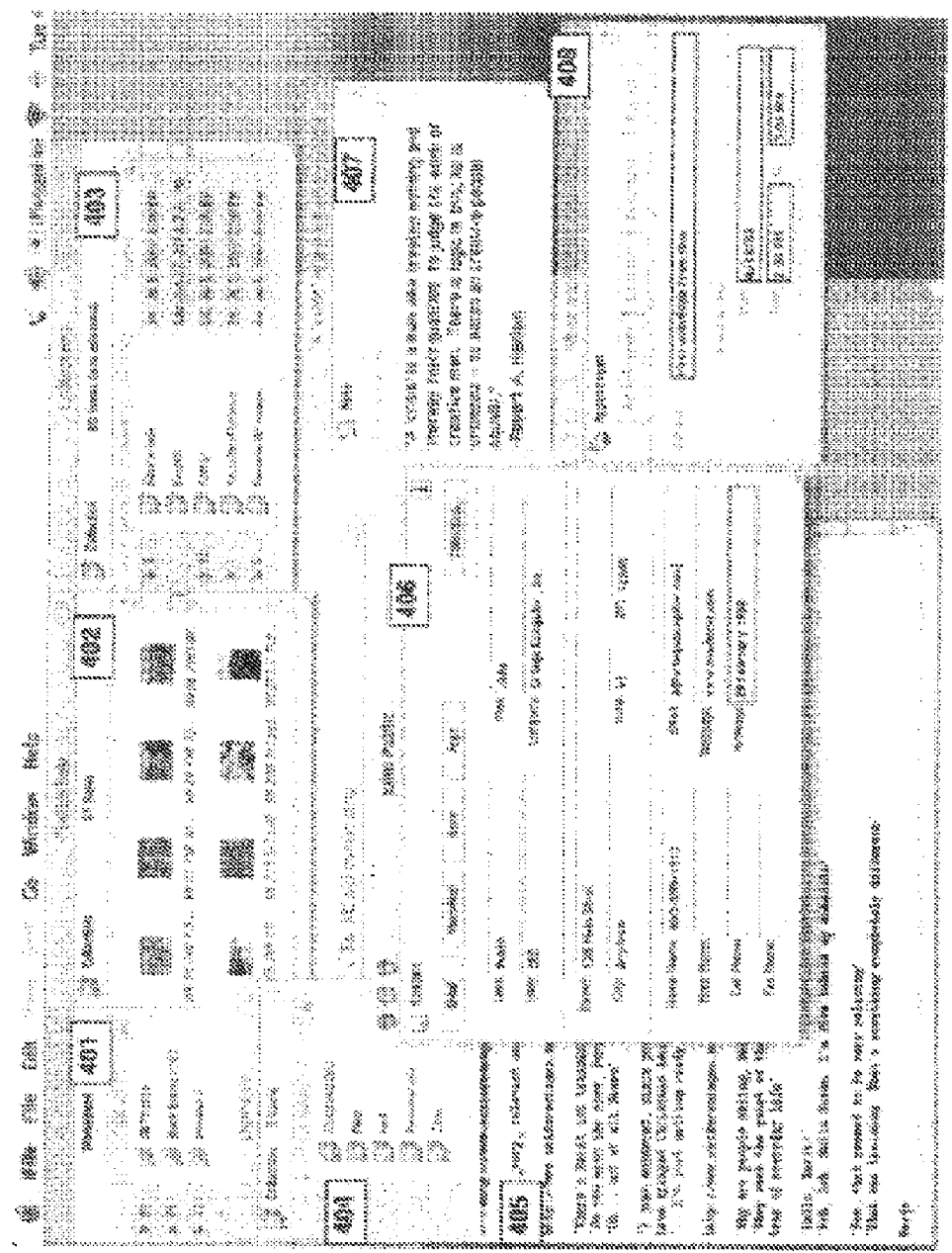
Figure 5:
Figure 7A:
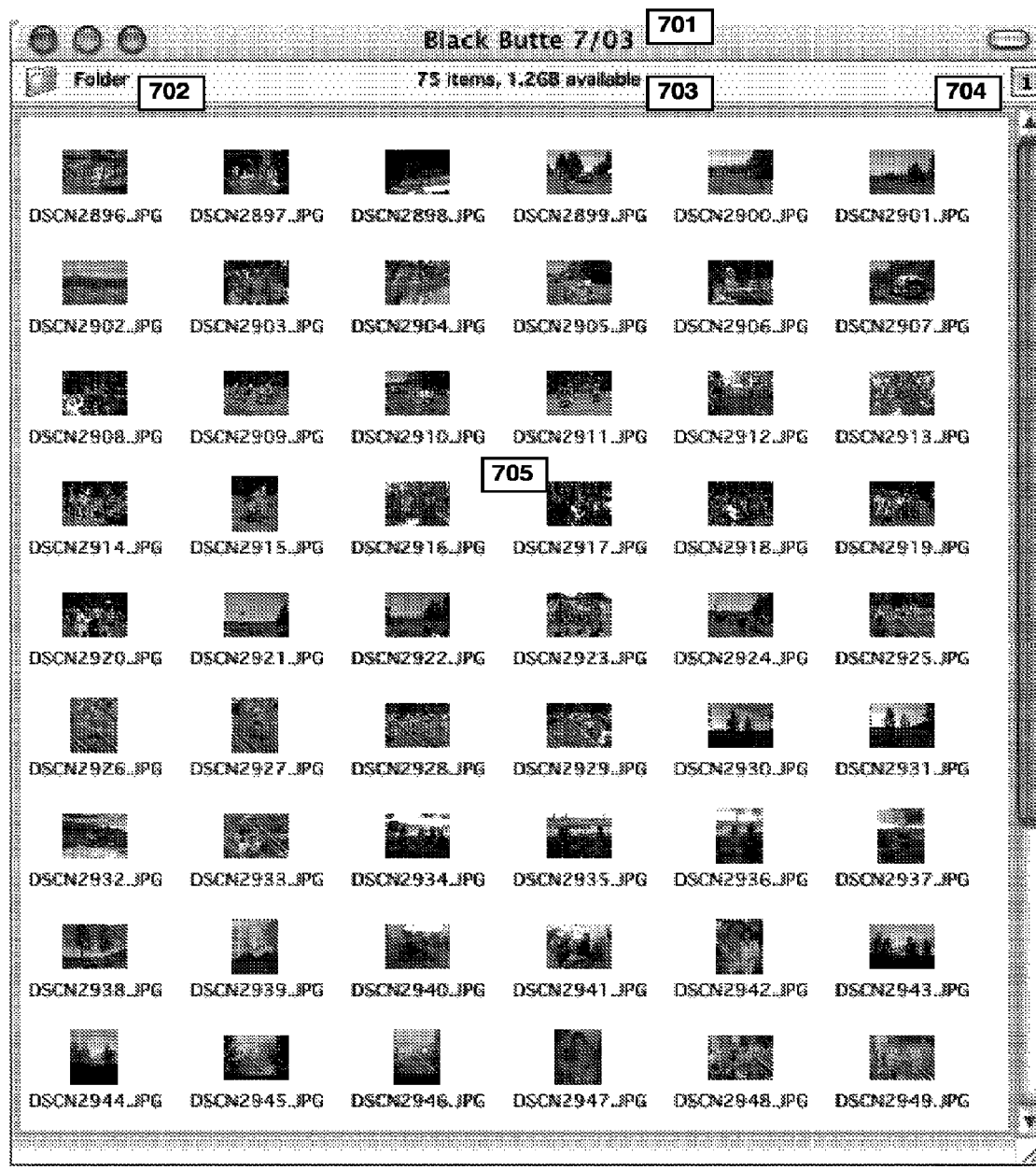
Figure 7B:
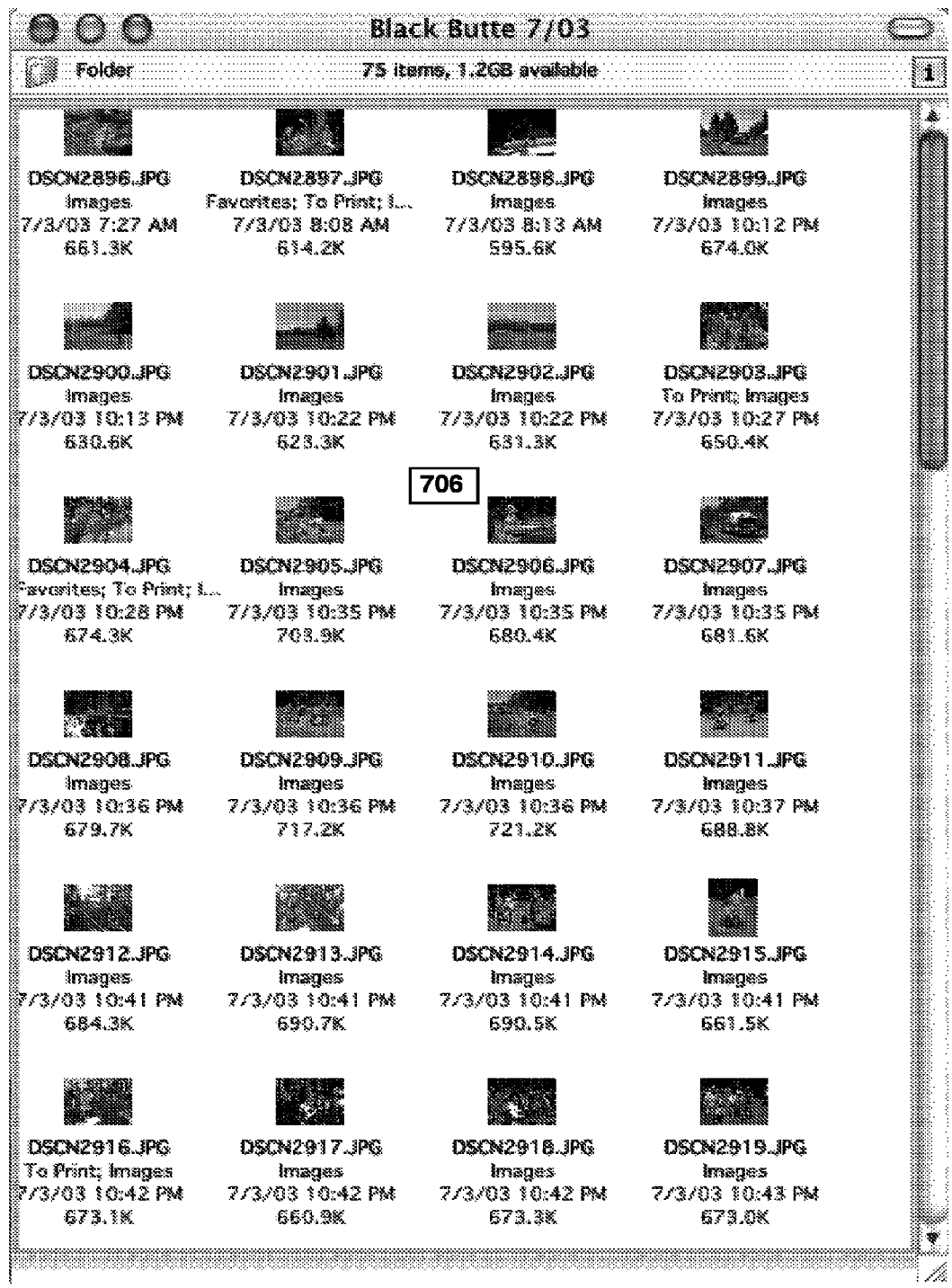
Figure 7C:
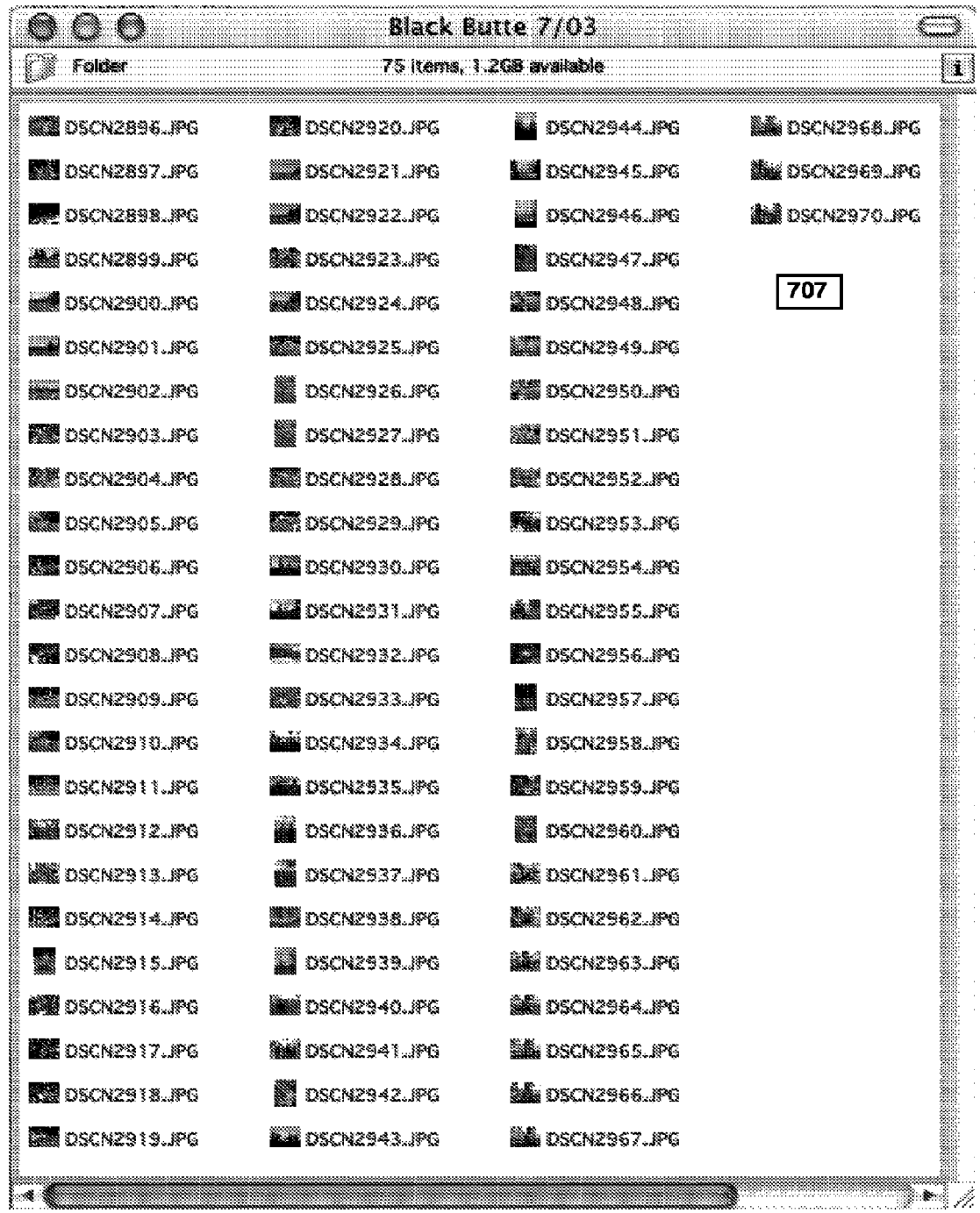
Figure 9A:
Figure 10A:
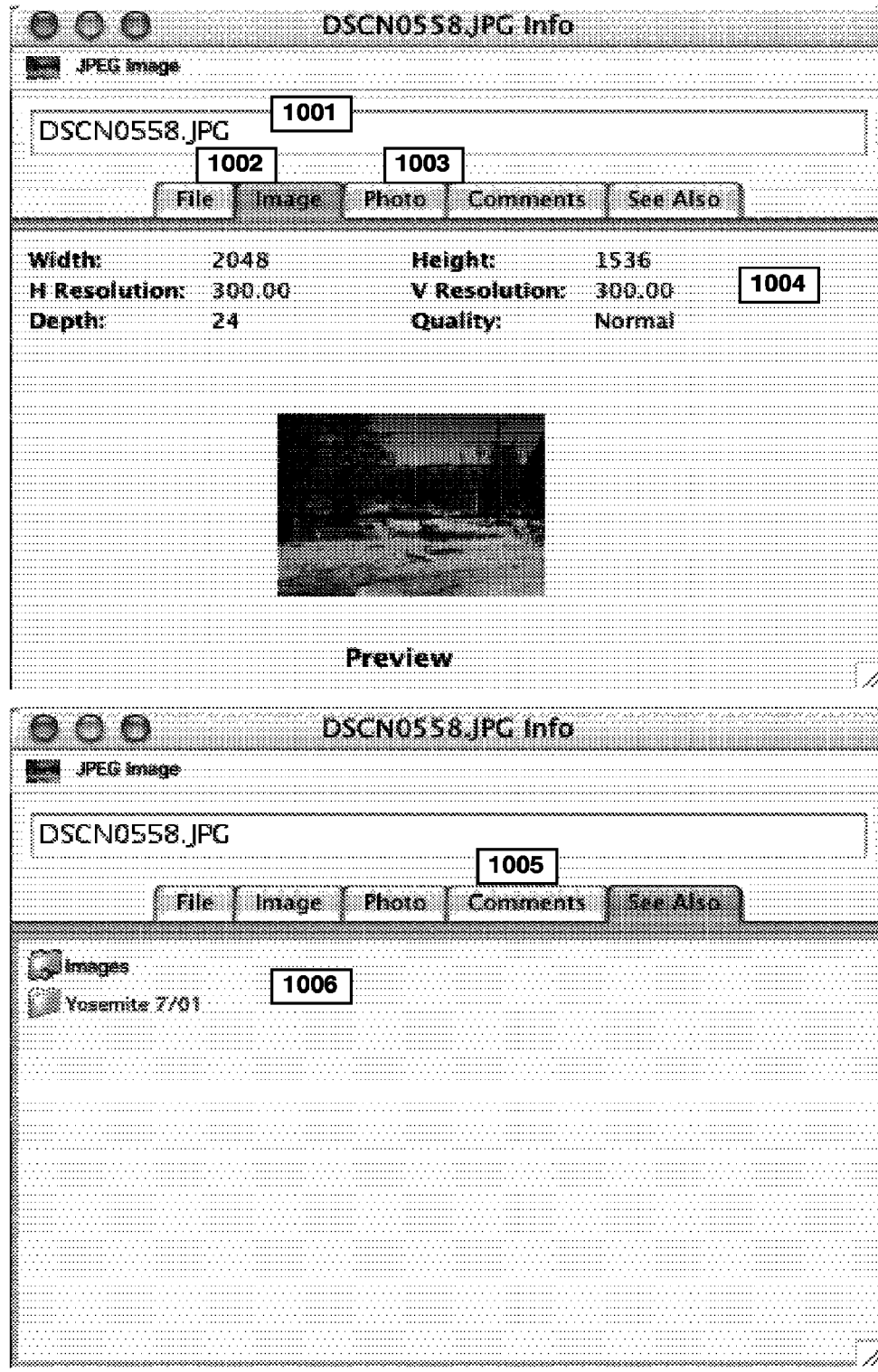
Figure 11A:
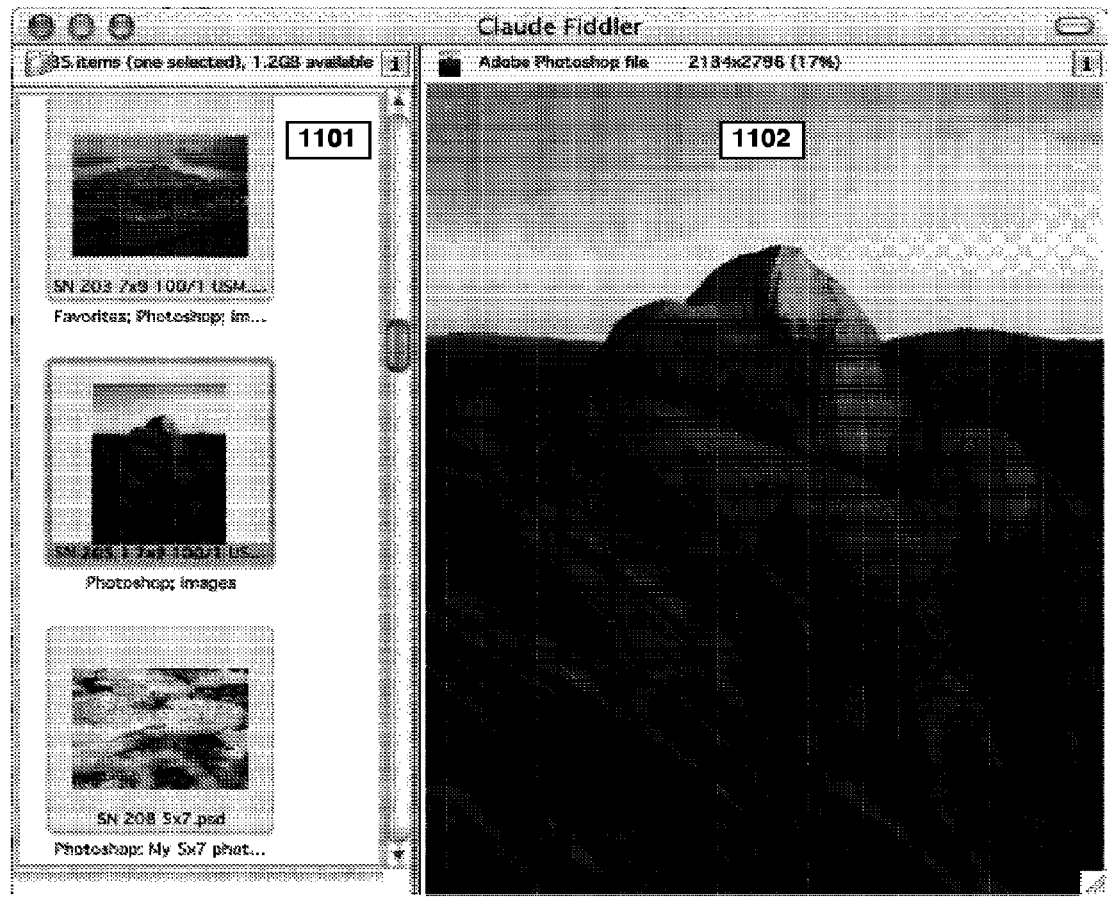
Figure 11B:
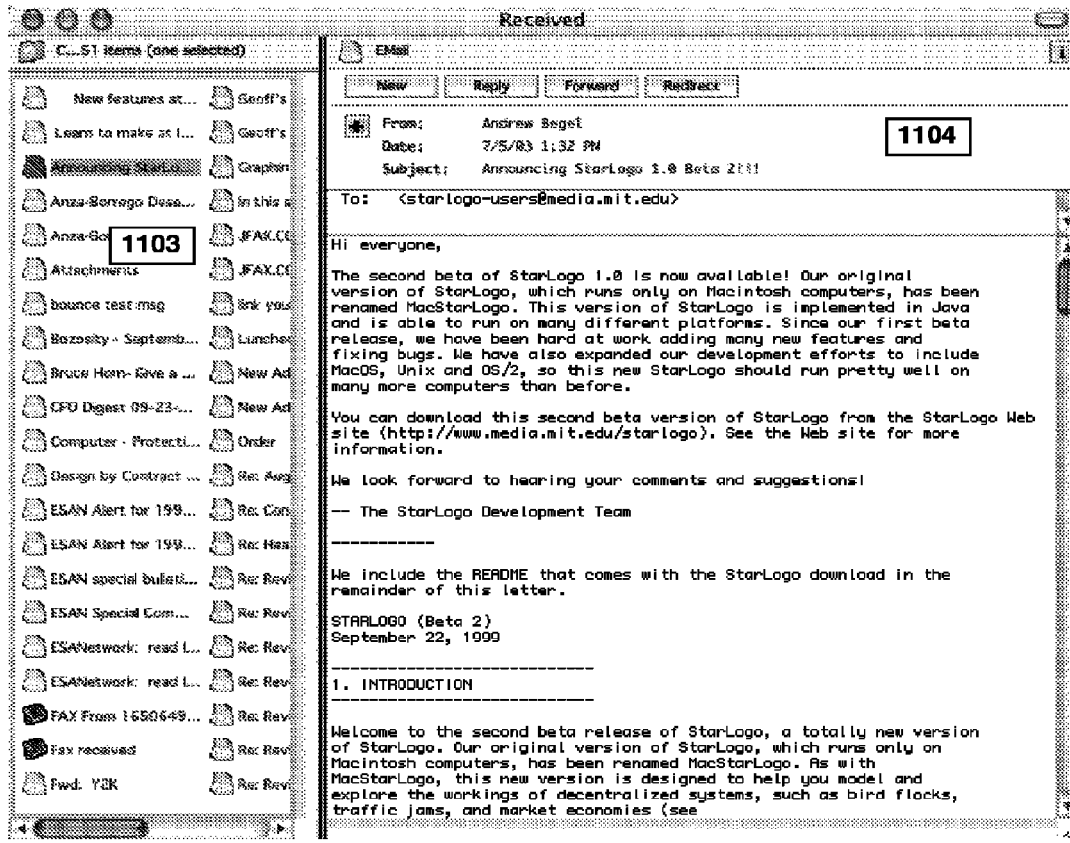
Figure 12A:
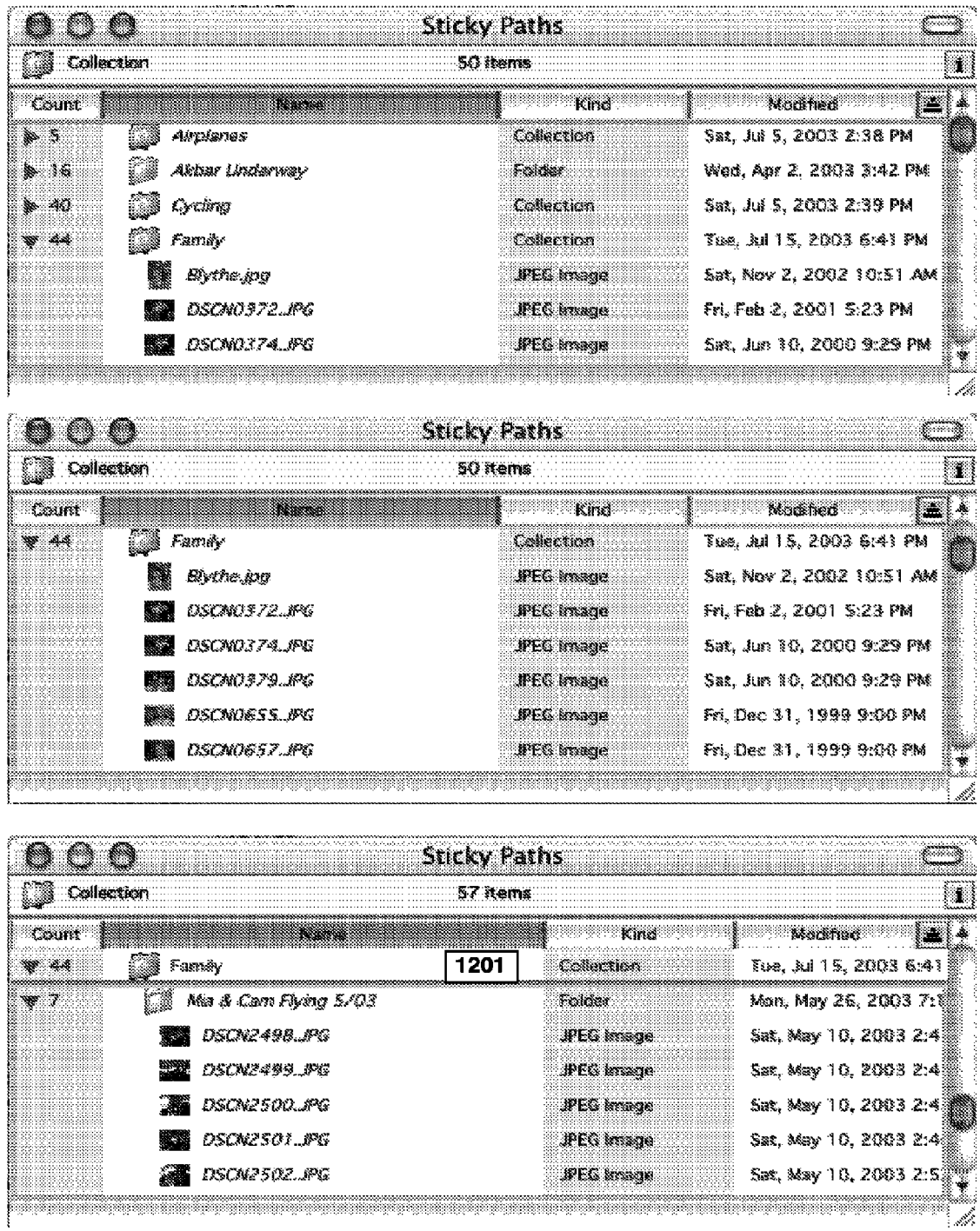
Figure 13:
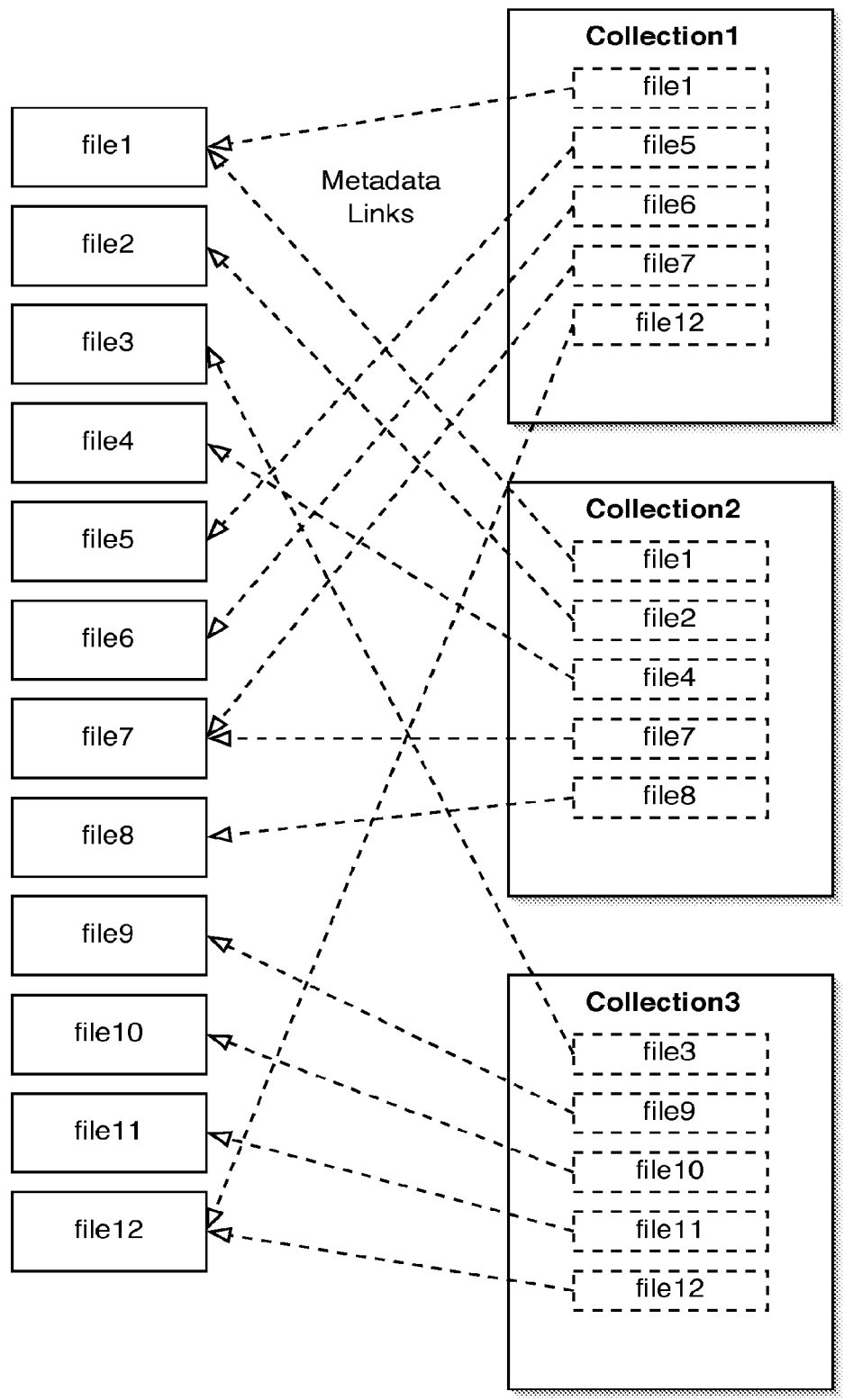
Figure 15:
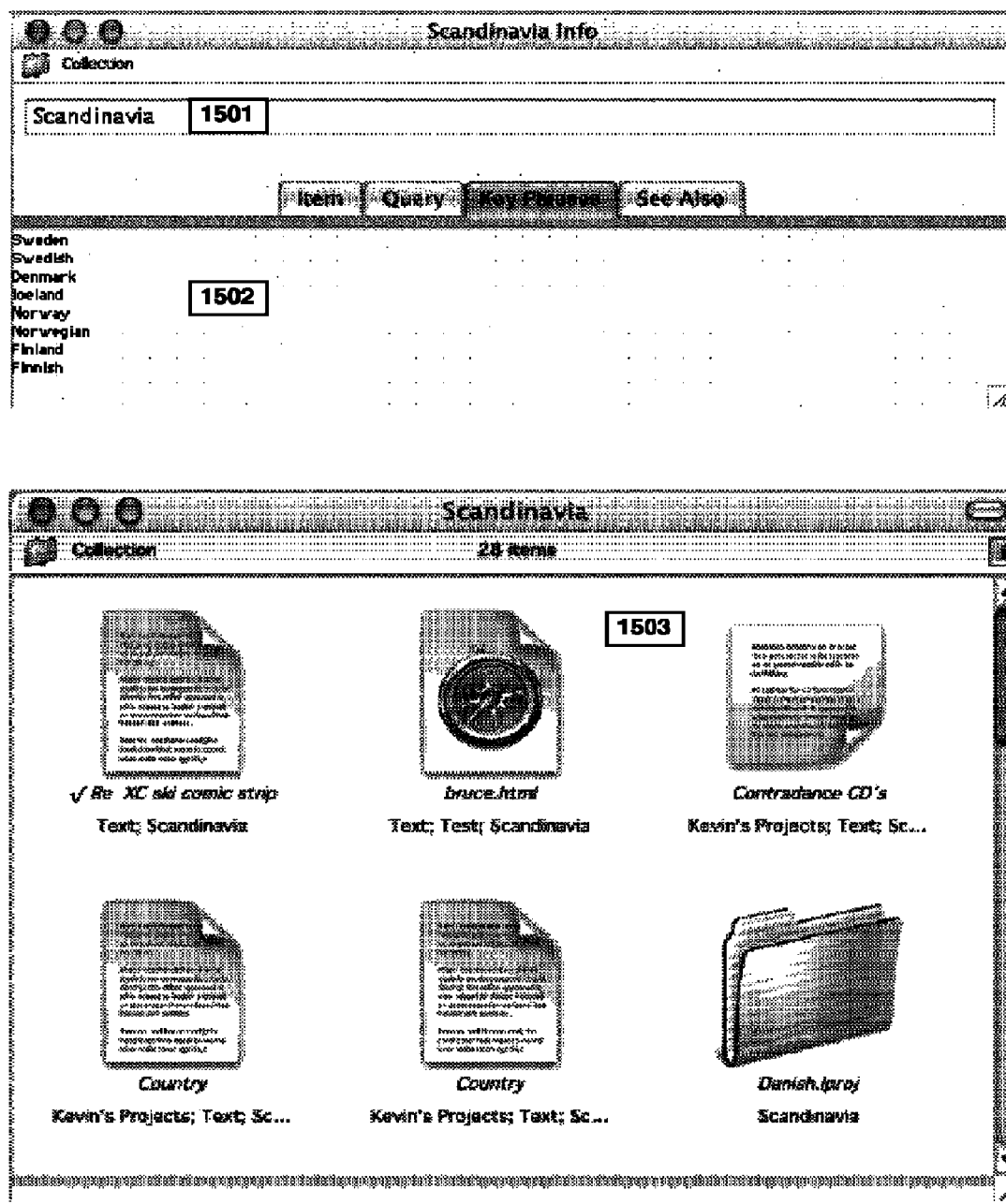
Figure 16A:
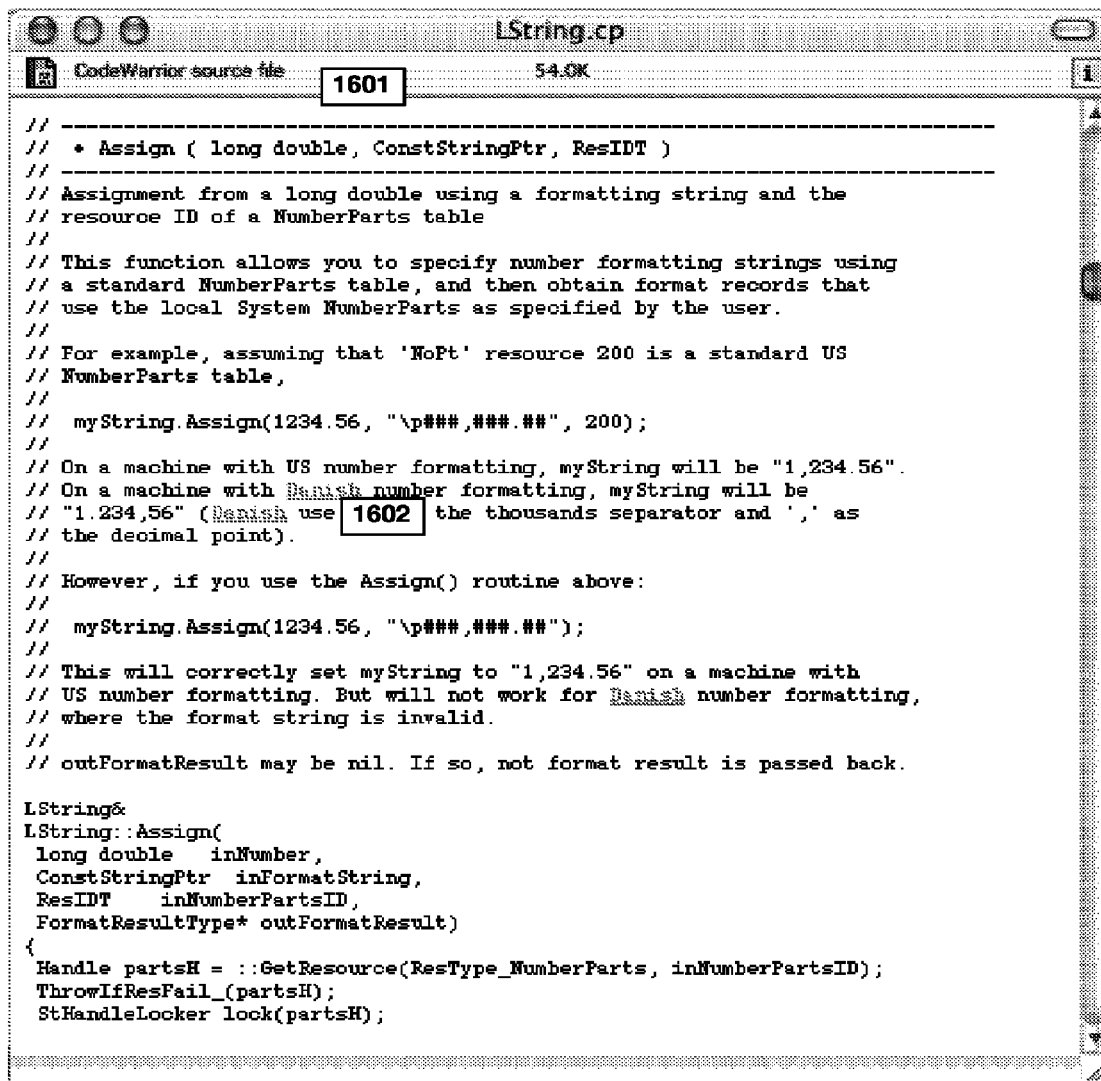
Figure 16B:
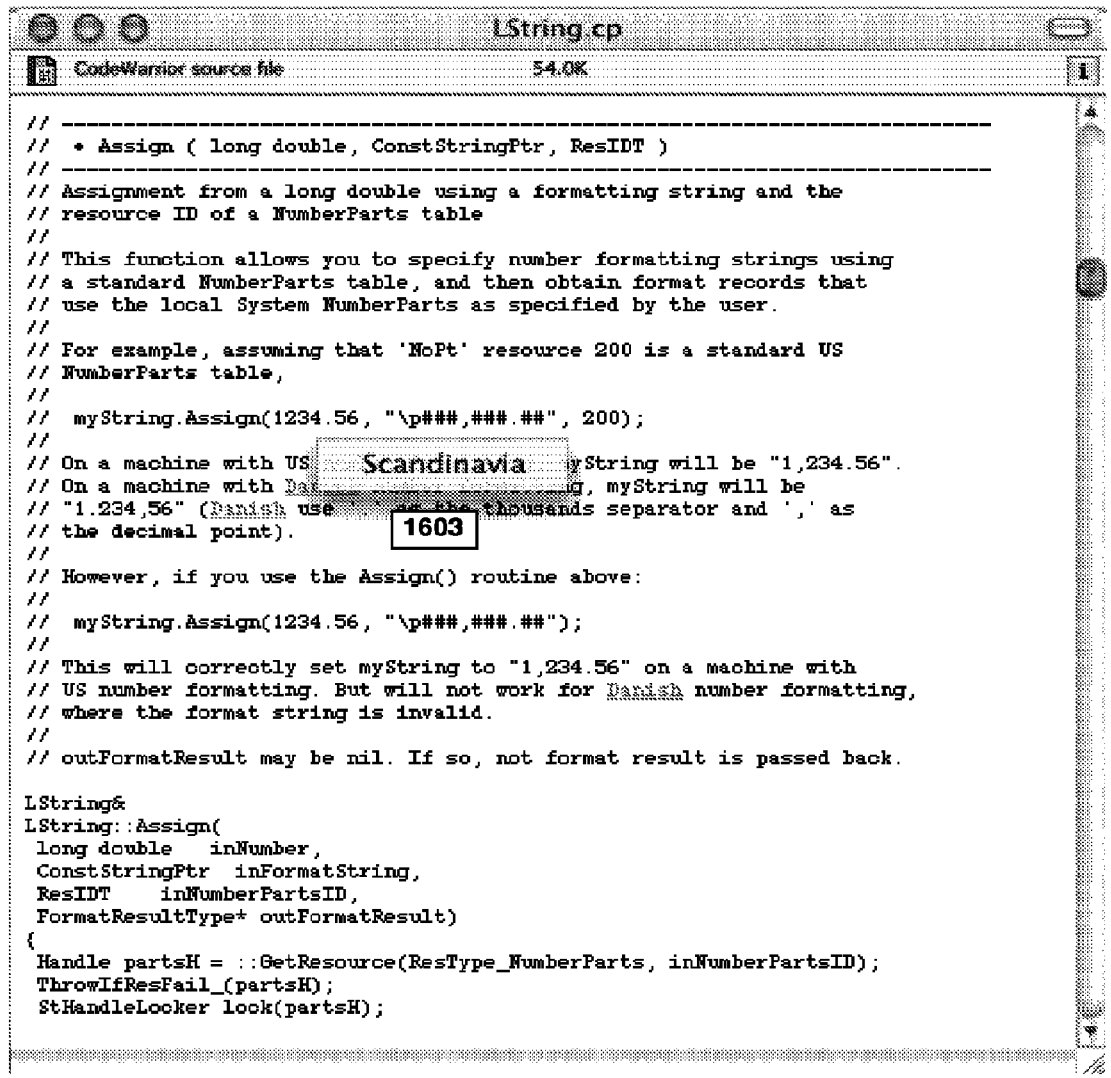
Figure 17:
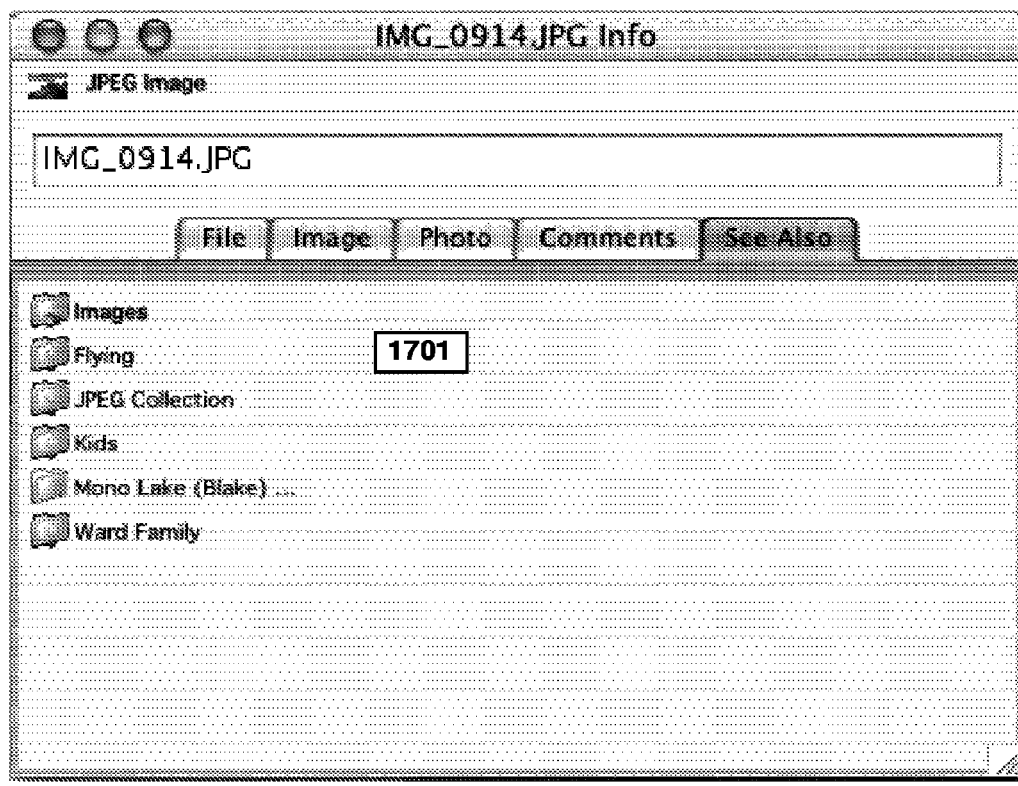
Figure 18:
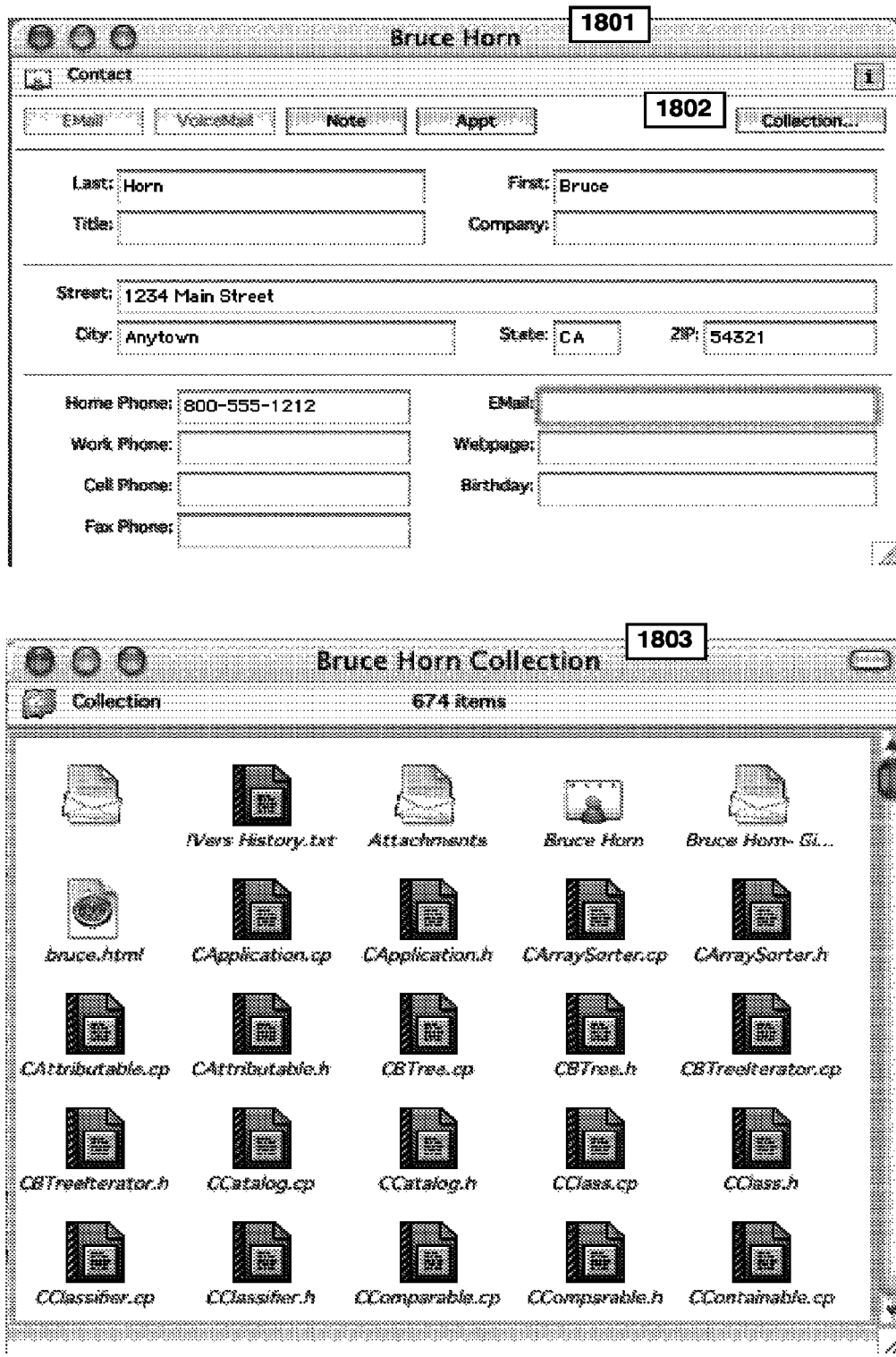
Figure 19:
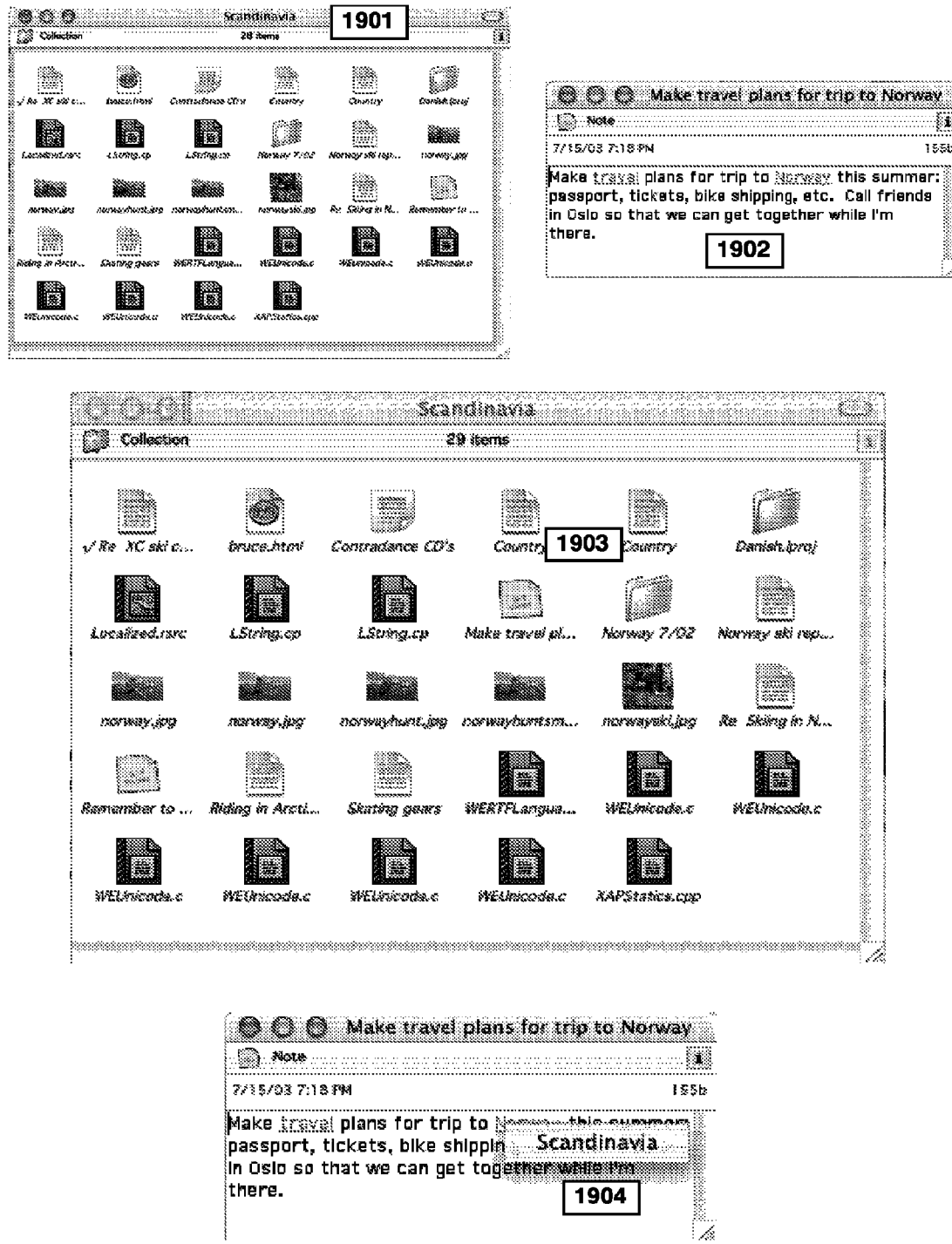
Figure 20:
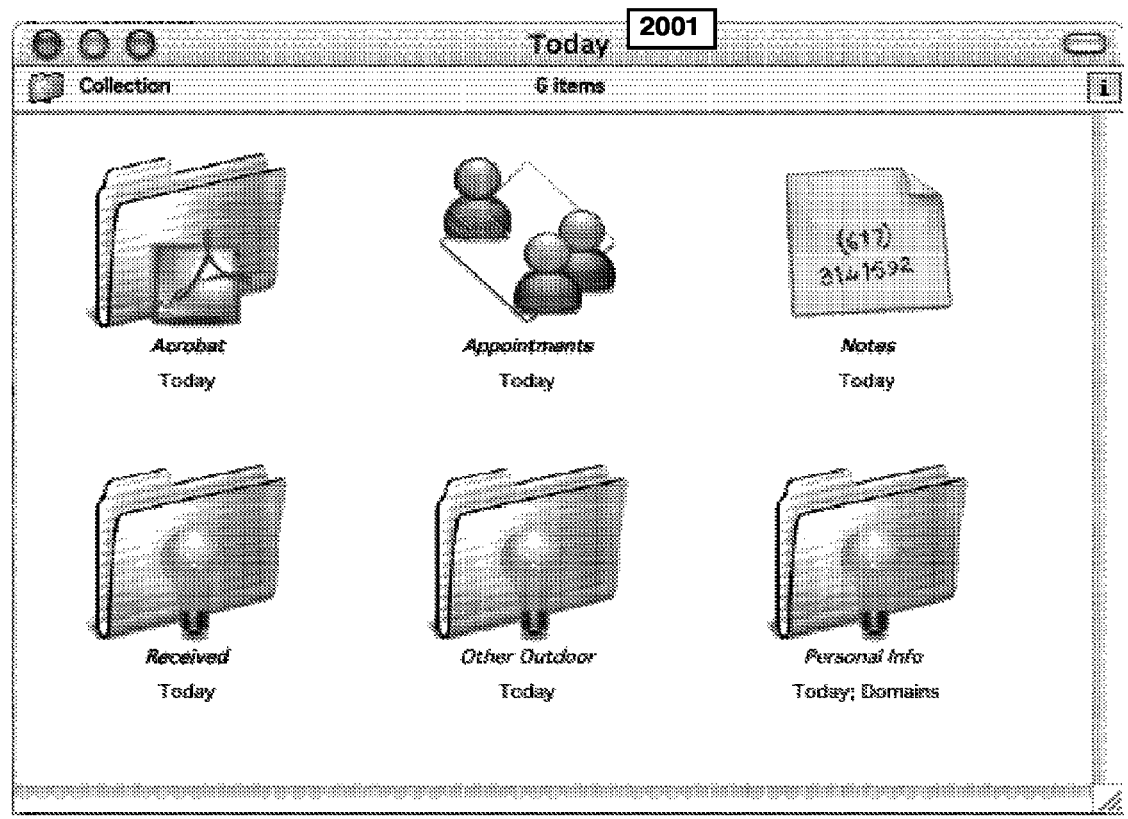
Figure 21:
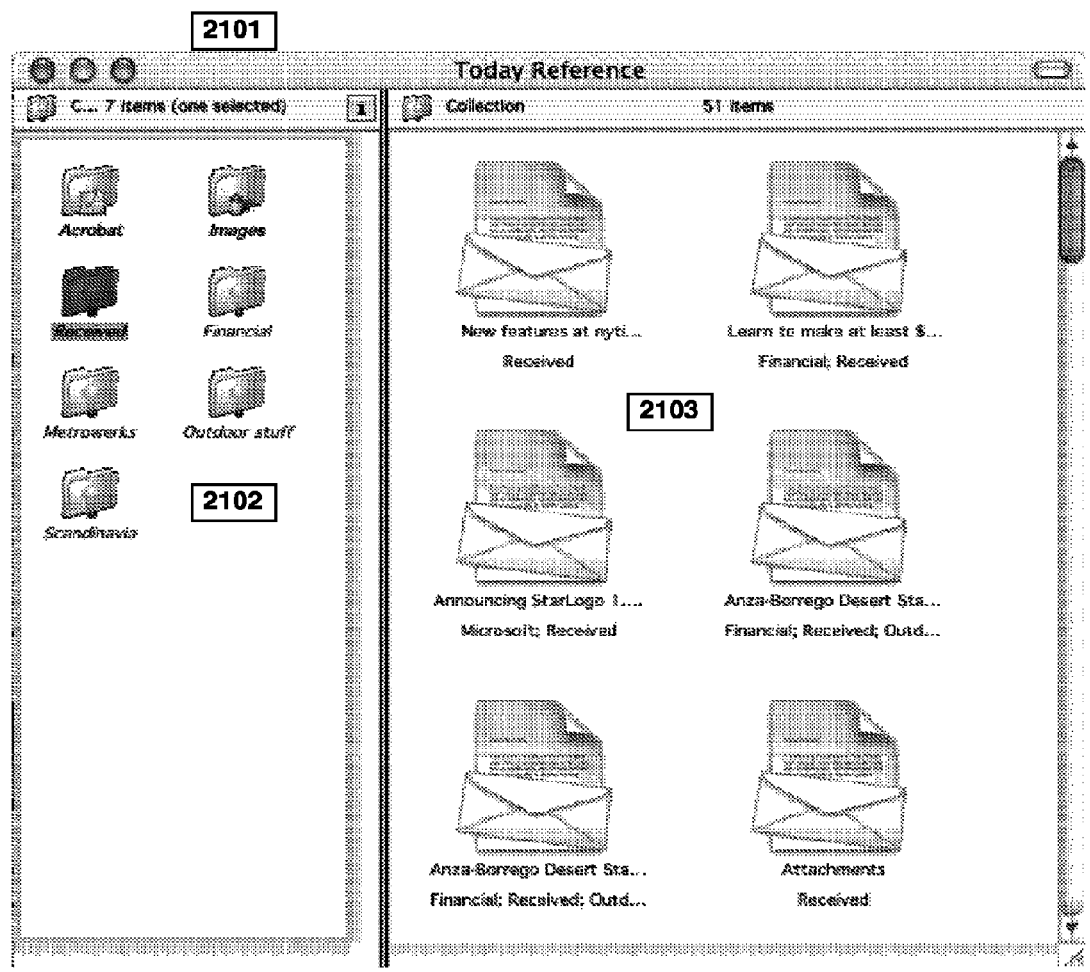
Figure 22:
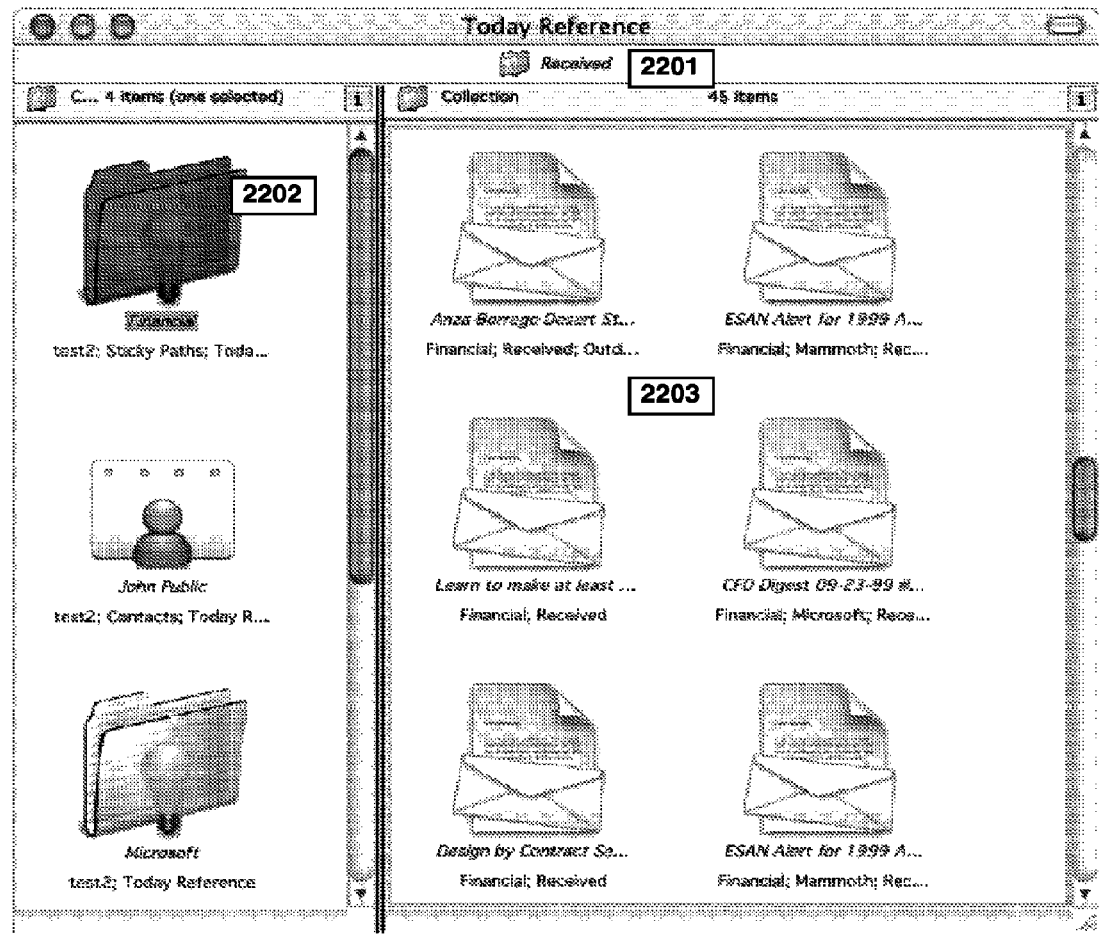
Figure 24:
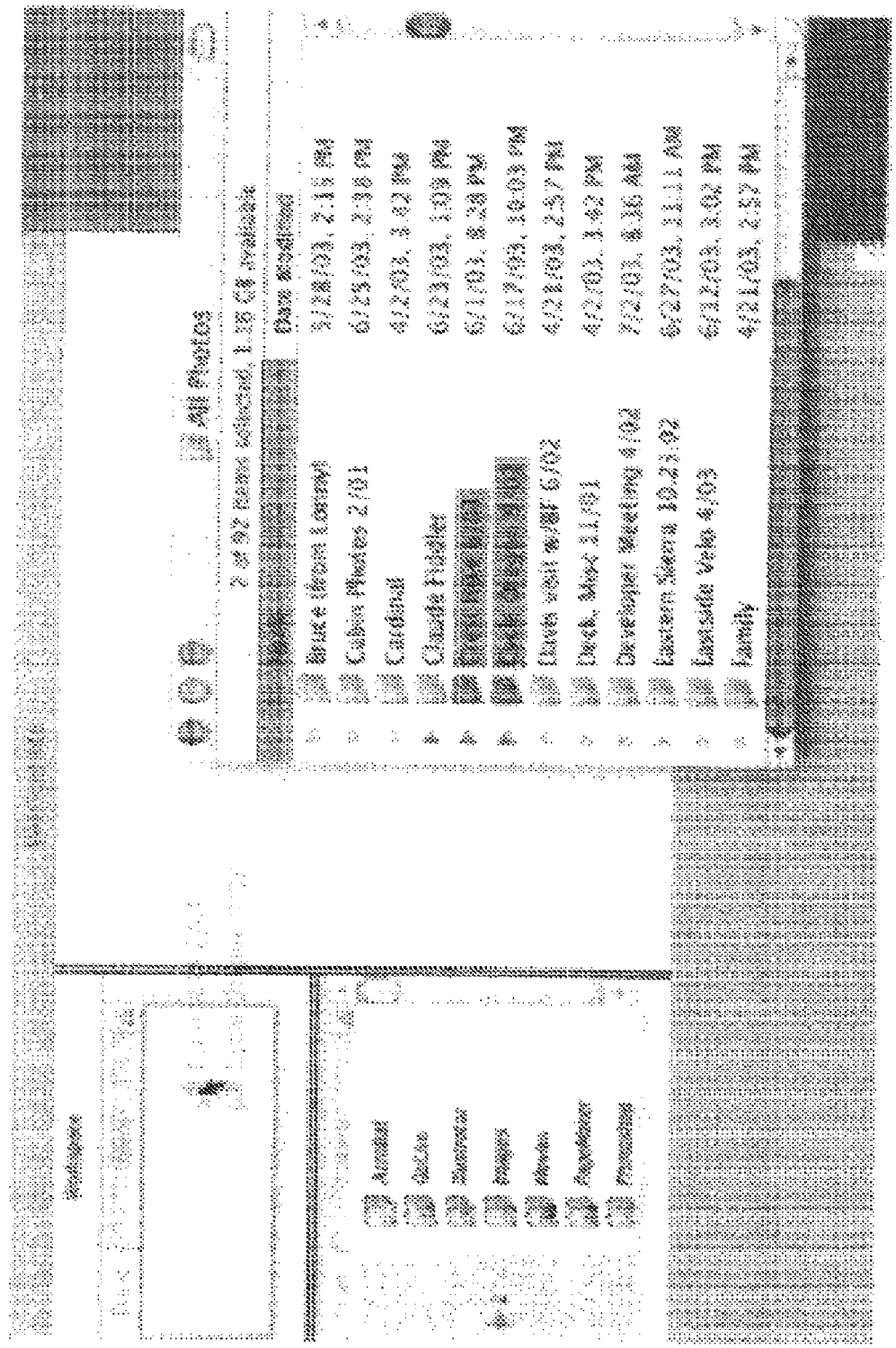
Figure 25A:
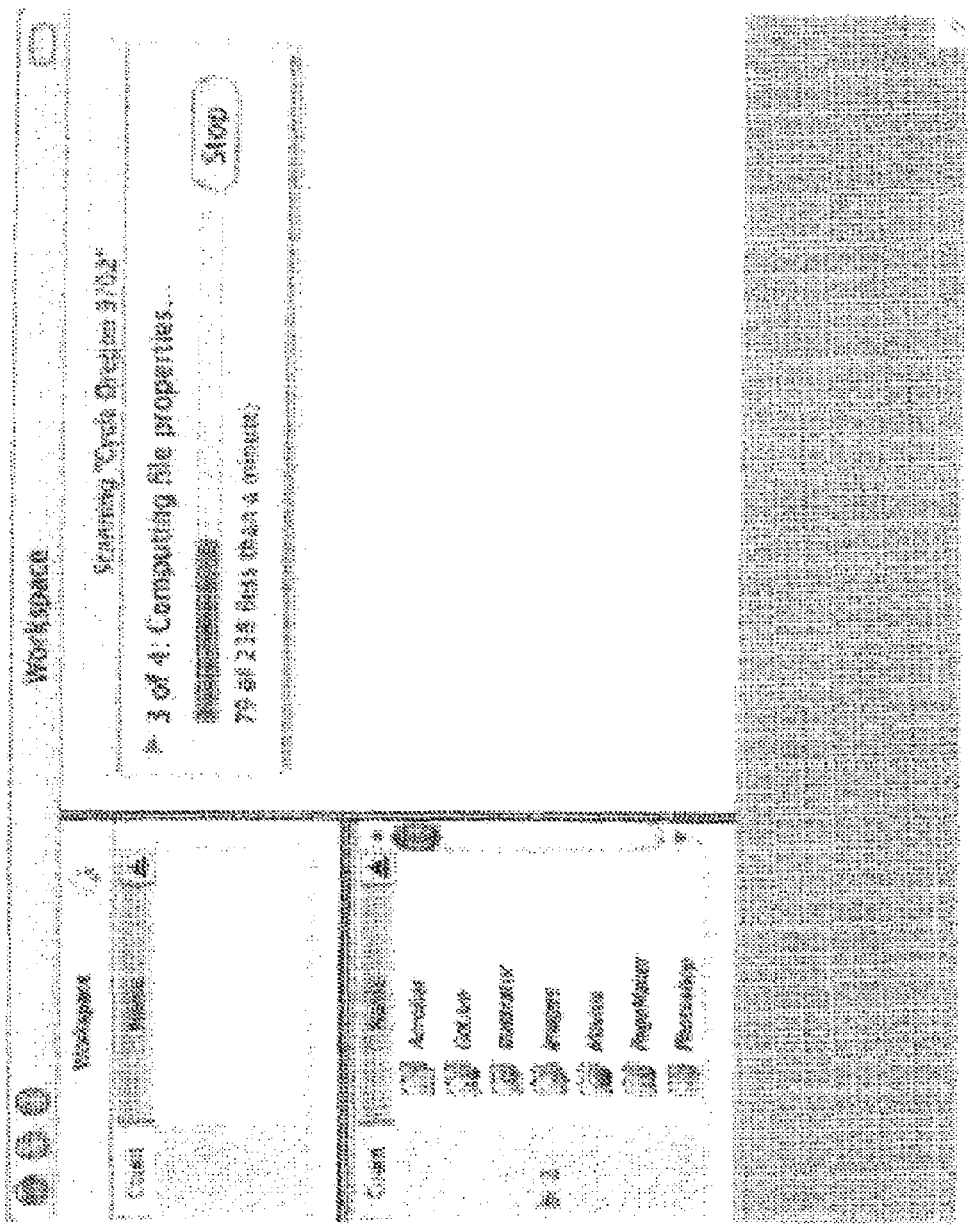
Figure 25B:
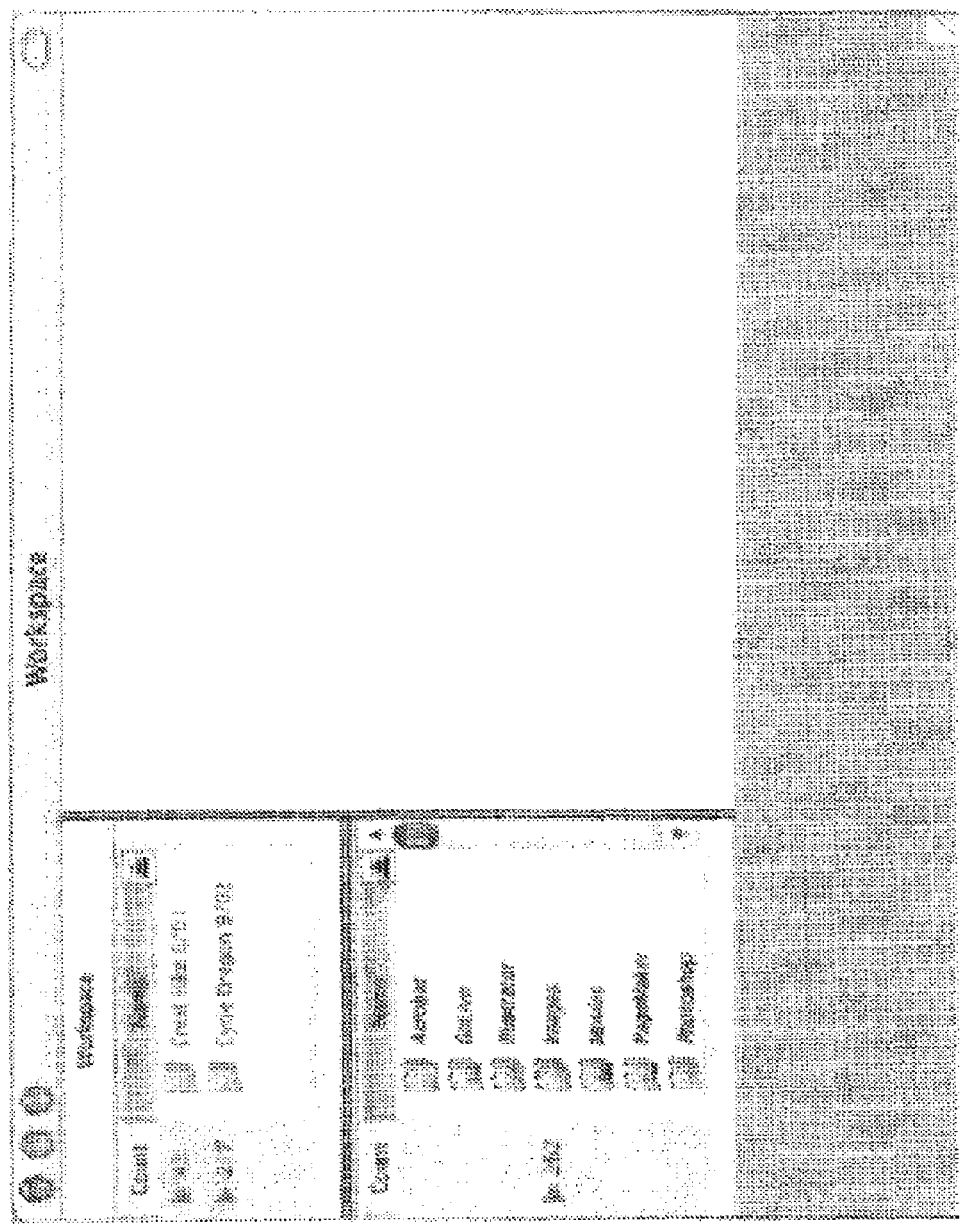
Figure 2B:
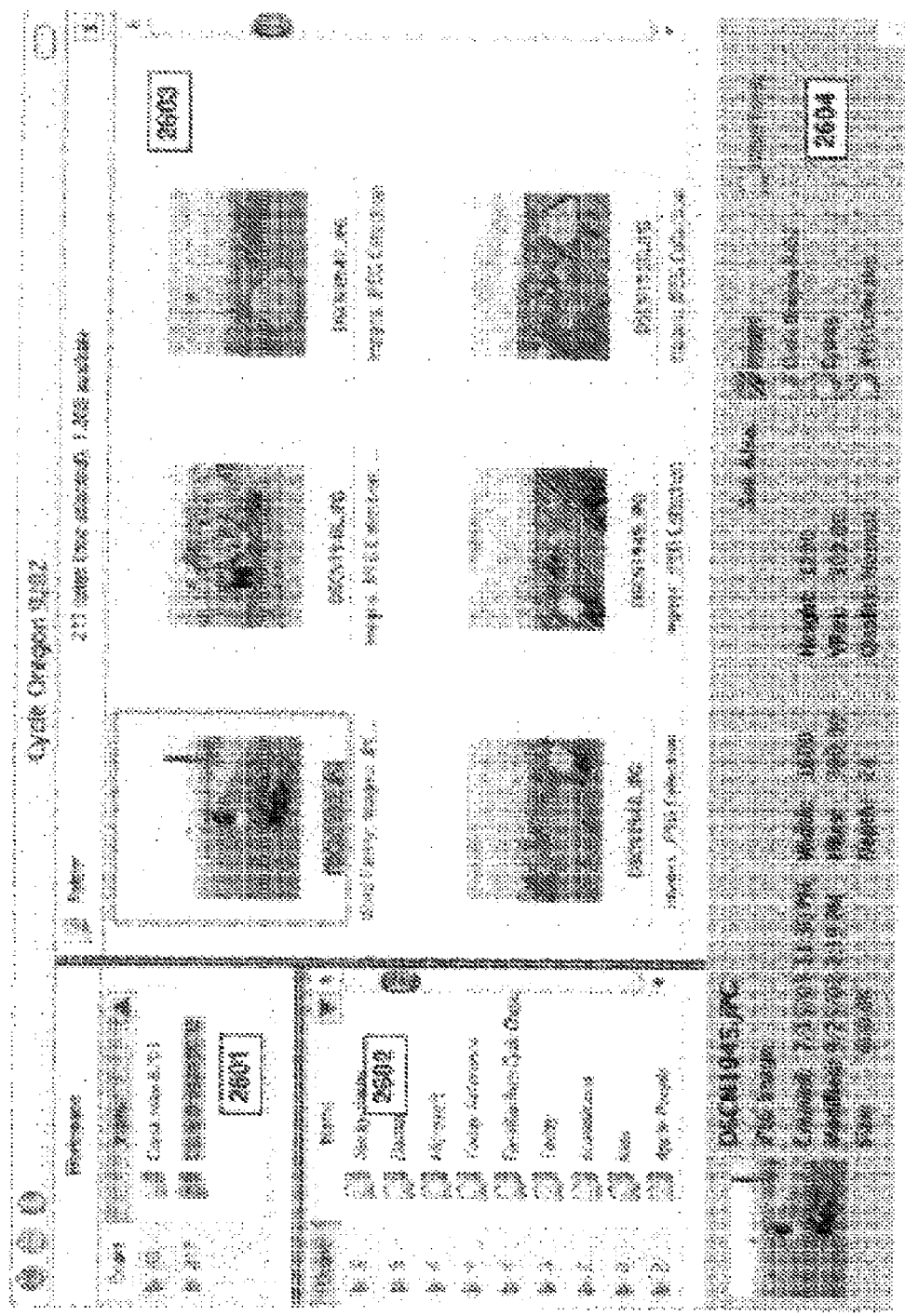
Figure 27:
Figure 29:
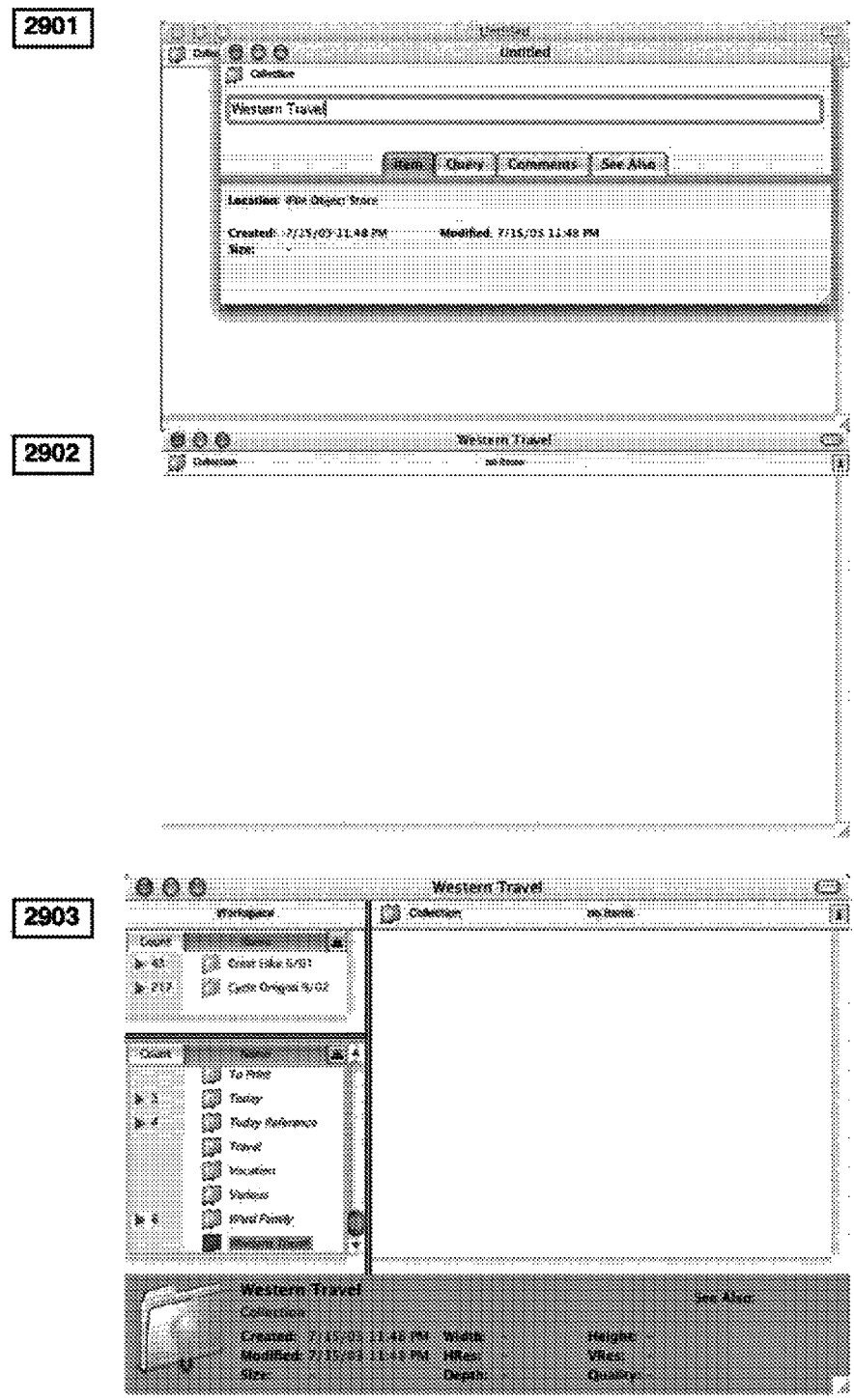
Figure 31:
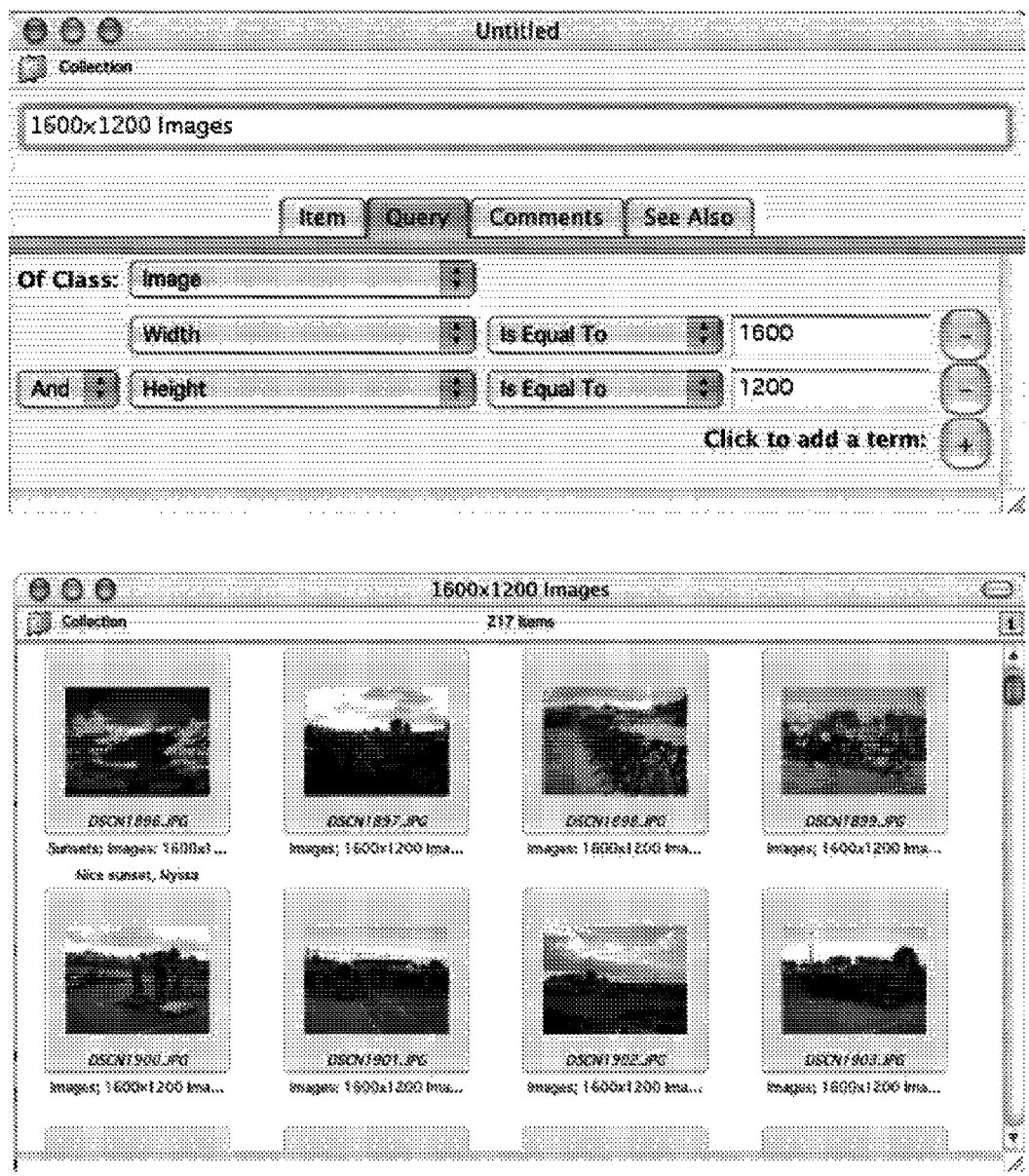
Figure 32:
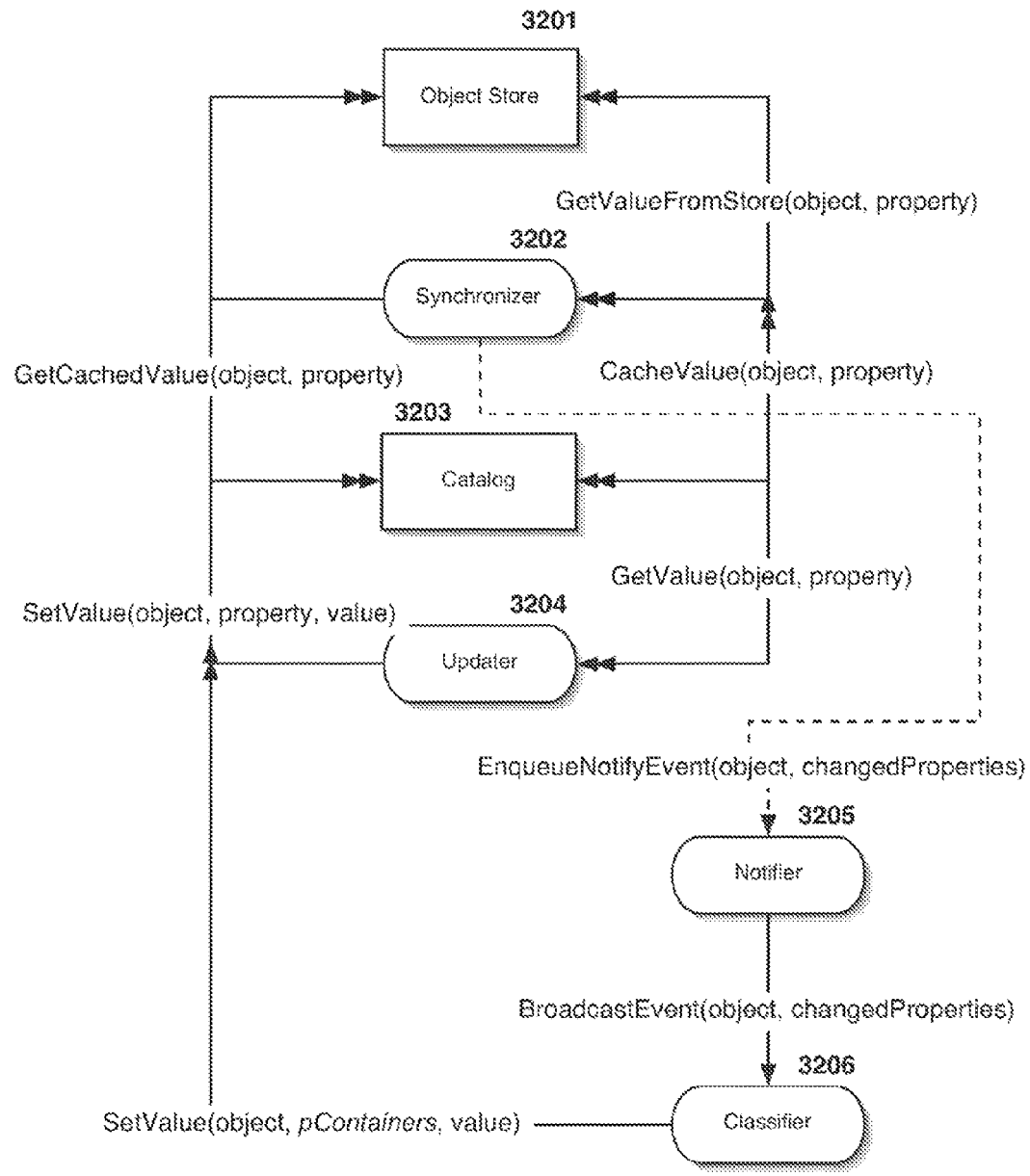
Figure 33:
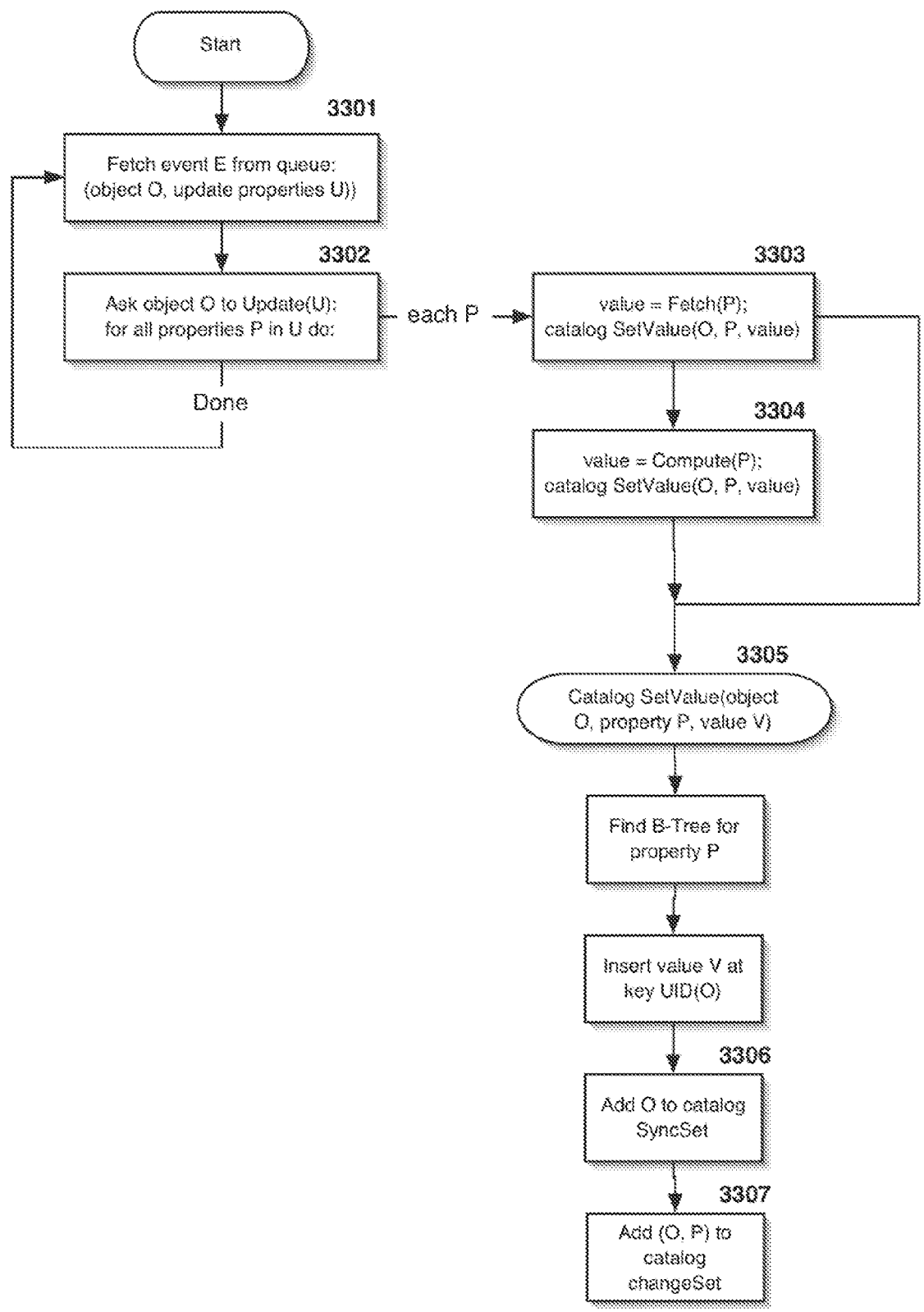
Figure 34:
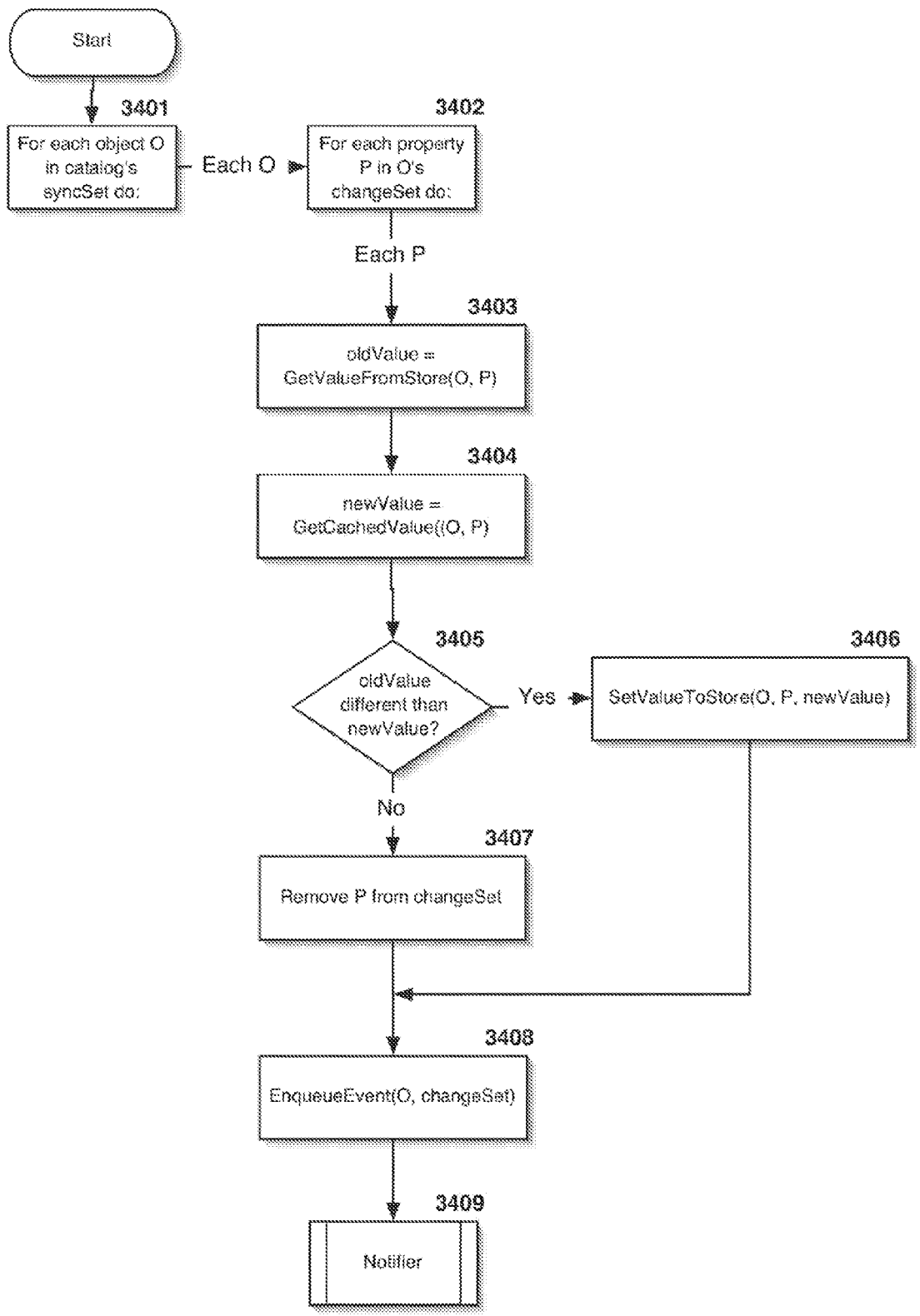
Figure 35:
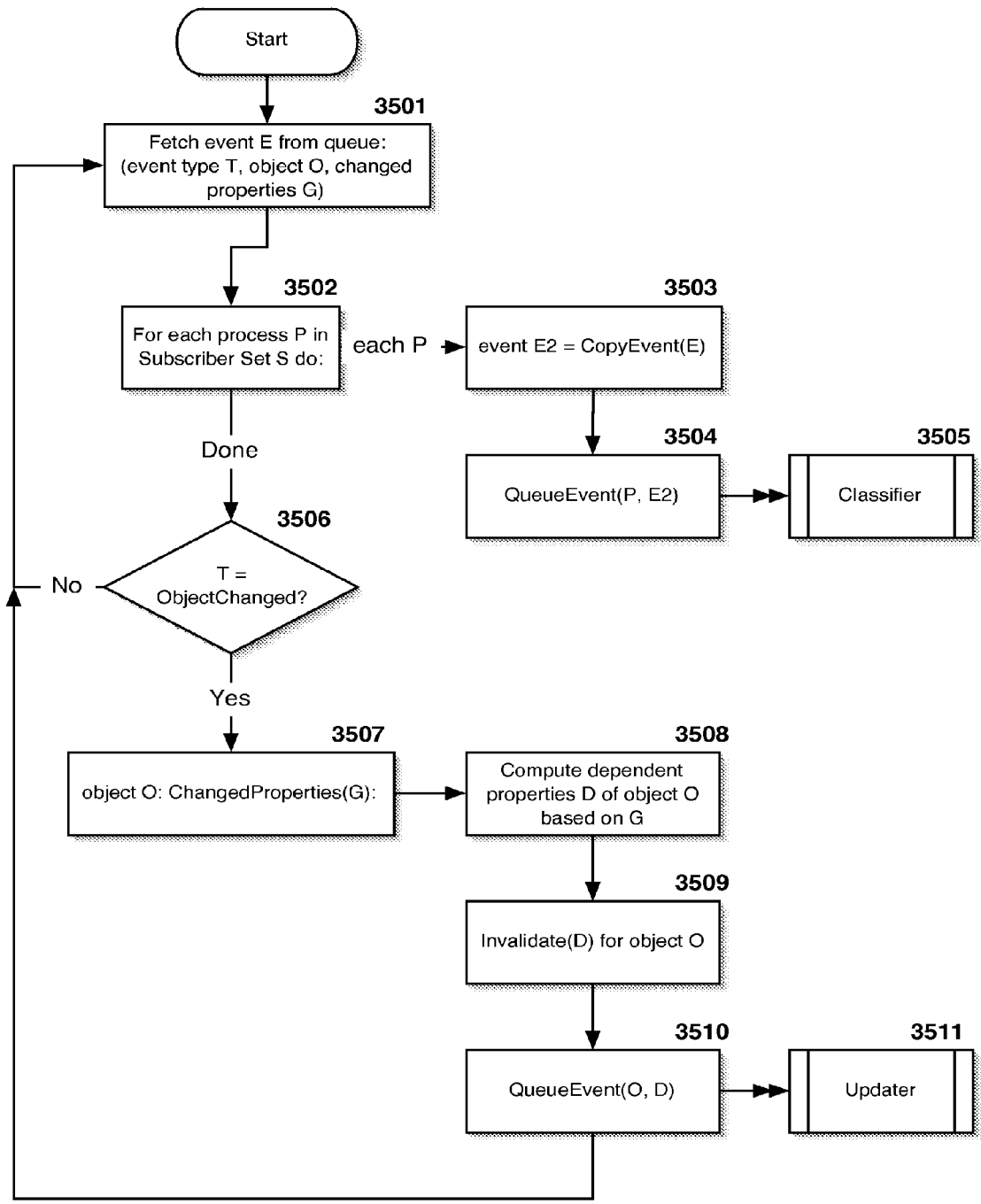
Figure 36:
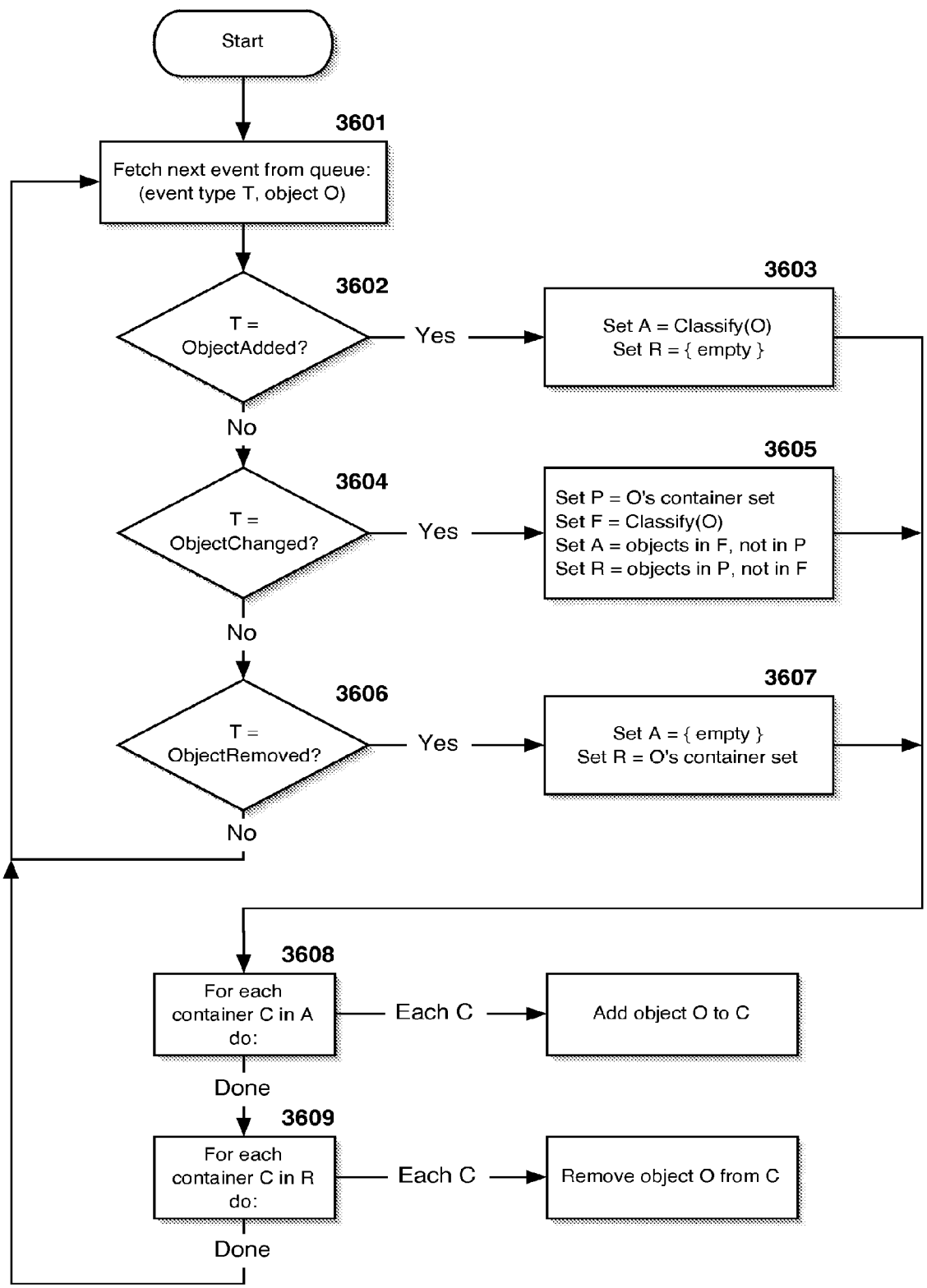
Figure 37:
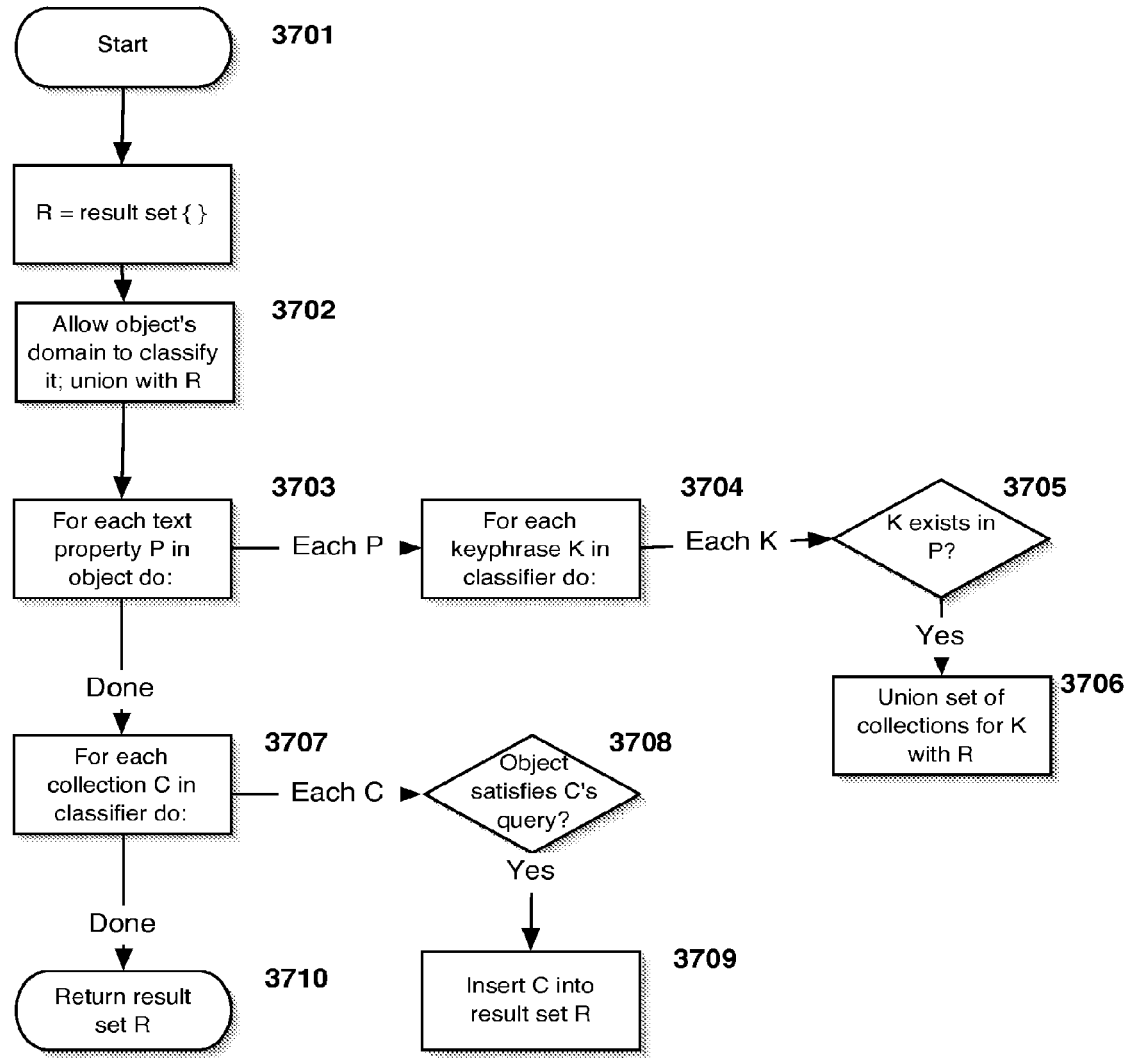

FIG. 3 describes the Property-Based Information Access;

FIG. 4 is a display depicting the MFS inventive system desktop interface;

FIG. 5 is a display showing the preview viewing mode for images;

Figure 6:
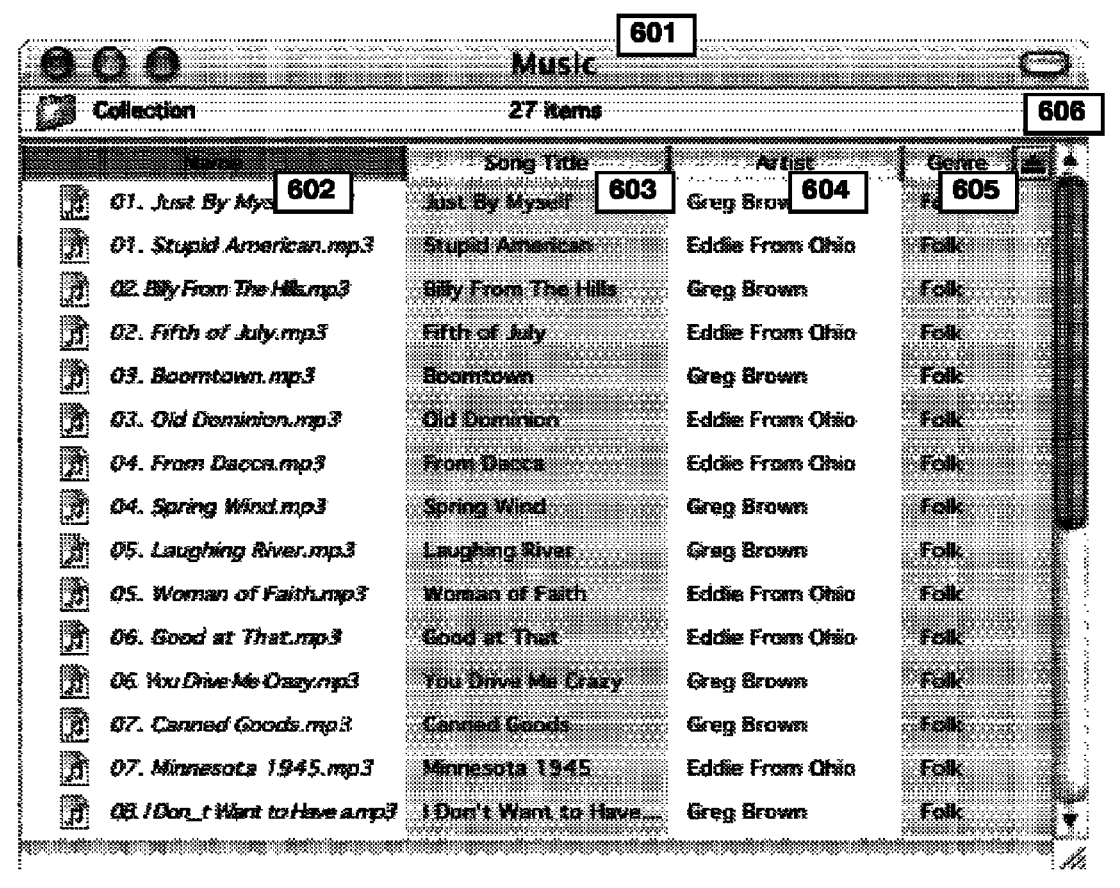

FIG. 6 is a display of the list viewing mode;

FIGS. 7a, 7b and 7c show several displays of the small and large icon views, with added property tags;

FIG. 8 includes two displays depicting the view scaling mechanism;

FIGS. 9a and 9b include two displays of the image and text window views;

FIGS. 10a and 10b show two displays of the Information windows for image and music files;

FIGS. 11a and 11b show two displays of the content view mode, for images and email;

Figure 12B:
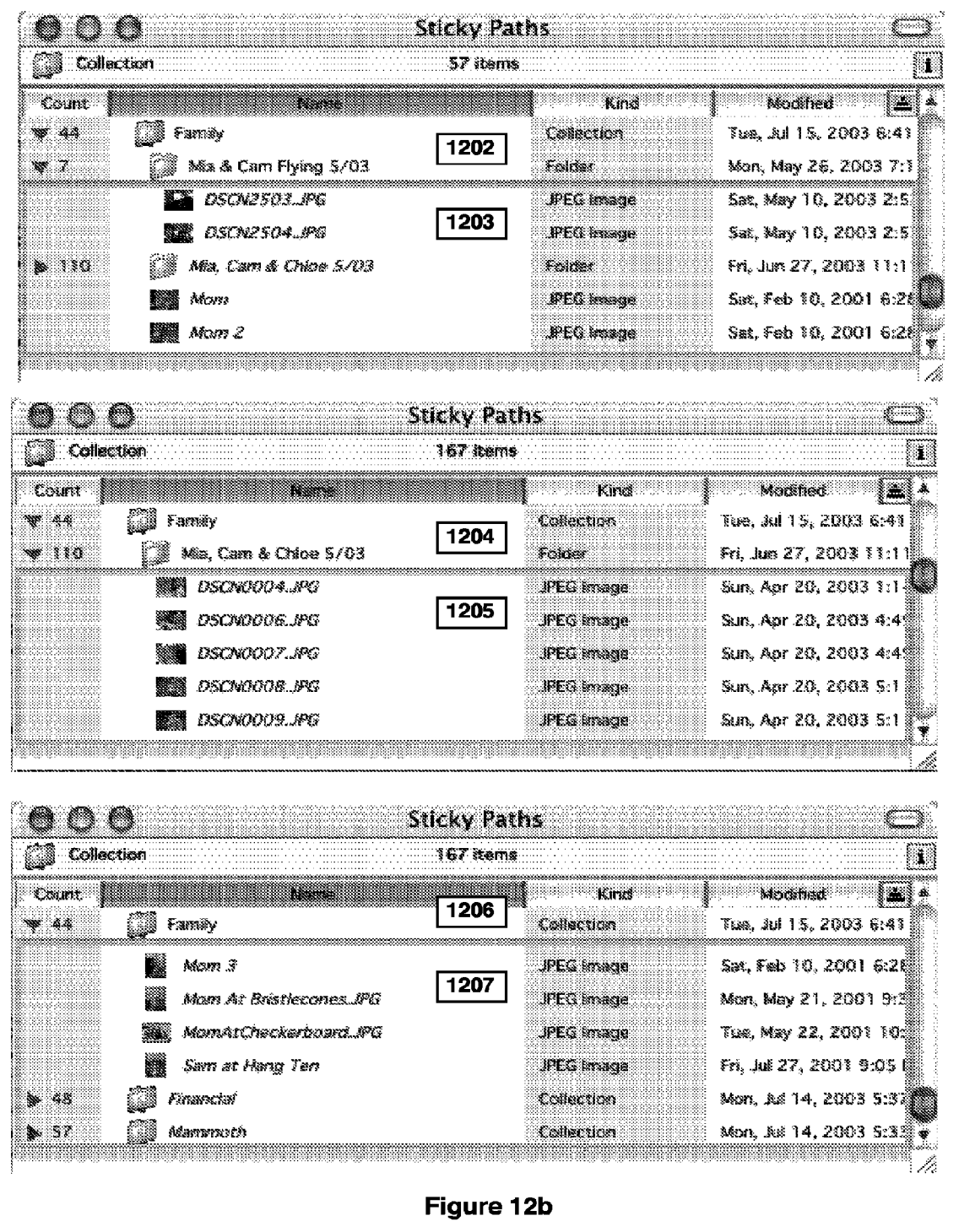

FIGS. 12a and 12b describe the sticky path mechanism for viewing hierarchies in a list format;

FIG. 13 depicts link metadata between objects and collections;

Figure 14:
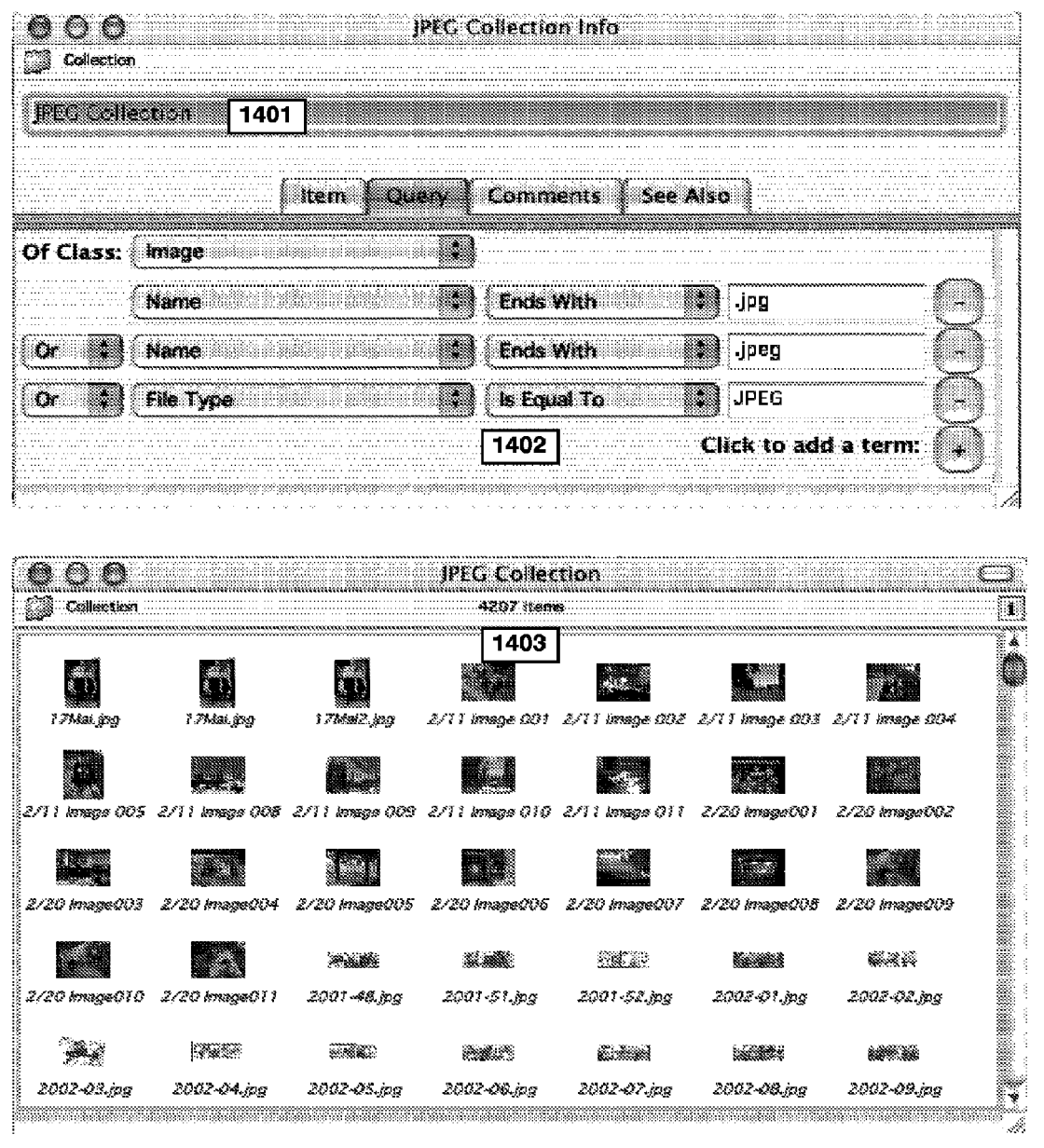

FIG. 14 shows two displays of creating a collection of JPEG image files;

FIG. 15 shows two displays of creating a collection of objects related to Scandinavia by key phrase;

FIGS. 16a and 16b depict the hyperlinking mechanism for objects with textual properties;

FIG. 17 shows an information window displaying the multiple classification of an image;

FIG. 18 shows a contact object and its corresponding collection;

FIG. 19 depicts creation of a new object, and dynamic updating of a collection classifying same;

FIG. 20 is a display depicting the Today collection, showing all objects that had activity today;

FIG. 21 is a display of Today, cross-referenced by collection;

FIG. 22 is a refinement of FIG. 21, Today cross-referenced by Received email;

FIG. 23 is a depiction of the domain mechanism for extending MFS;

FIG. 24 shows adding folders to the MFS working set;

FIGS. 25a and 25b show the workspace during and after folders have been added;

FIG. 26 shows the workspace view;

FIG. 27 shows the standard container and content views;

FIG. 28 shows a sticky path view;

FIG. 29 shows creation of a collection;

FIG. 30 shows manually adding objects to a collection;

FIG. 31 shows a metadata query specification for a collection;

FIG. 32 is a schematic describing an overview of consistency maintenance: how objects are processed within the inventive system to update properties, classified into collections, and notified of changes by other objects;

FIG. 33 is a schematic describing in detail the updater process: how objects' properties are updated and their values stored into the metadata catalog;

FIG. 34 is a schematic describing in detail the synchronizer process: how changed metadata is written back to the object store;

FIG. 35 is a schematic describing in detail the notifier: how objects are notified of changes in metadata, and when the classifier and updater are notified of changes;

FIG. 36 is a schematic describing the classifier process: how objects are processed for classification into collections; and FIG. 37 is a schematic describing in detail the classification of a single object.

DETAILED DESCRIPTION

The following detailed description illustrates the invention by way of example, not by way of limitation of the principles of the invention. This description will clearly enable one skilled in the art of computer programming and software design to make and use the invention, and describes several embodiments, adaptations, variations, alternatives, and uses of the inventions, including what we presently believe is the best mode of carrying out the invention.

In this regard, the invention is illustrated in the several figures, and is of sufficient complexity that the many parts, interrelationships, and sub-combinations thereof simply cannot be fully illustrated in a single patent-type drawing. For clarity and conciseness, several of the drawings show in schematic, or omit, parts that are not essential in that drawing to a description of a particular feature, functionality, aspect or principle of the invention being disclosed. Thus, the best mode embodiment of one feature may be shown in one drawing, and the best mode of another feature will be called out in another drawing.

All publications, patents and applications cited in this specification are herein incorporated by reference as if each individual publication, patent or application had been expressly stated to be incorporated by reference.

The Inventive System Implementation

Figure 1:
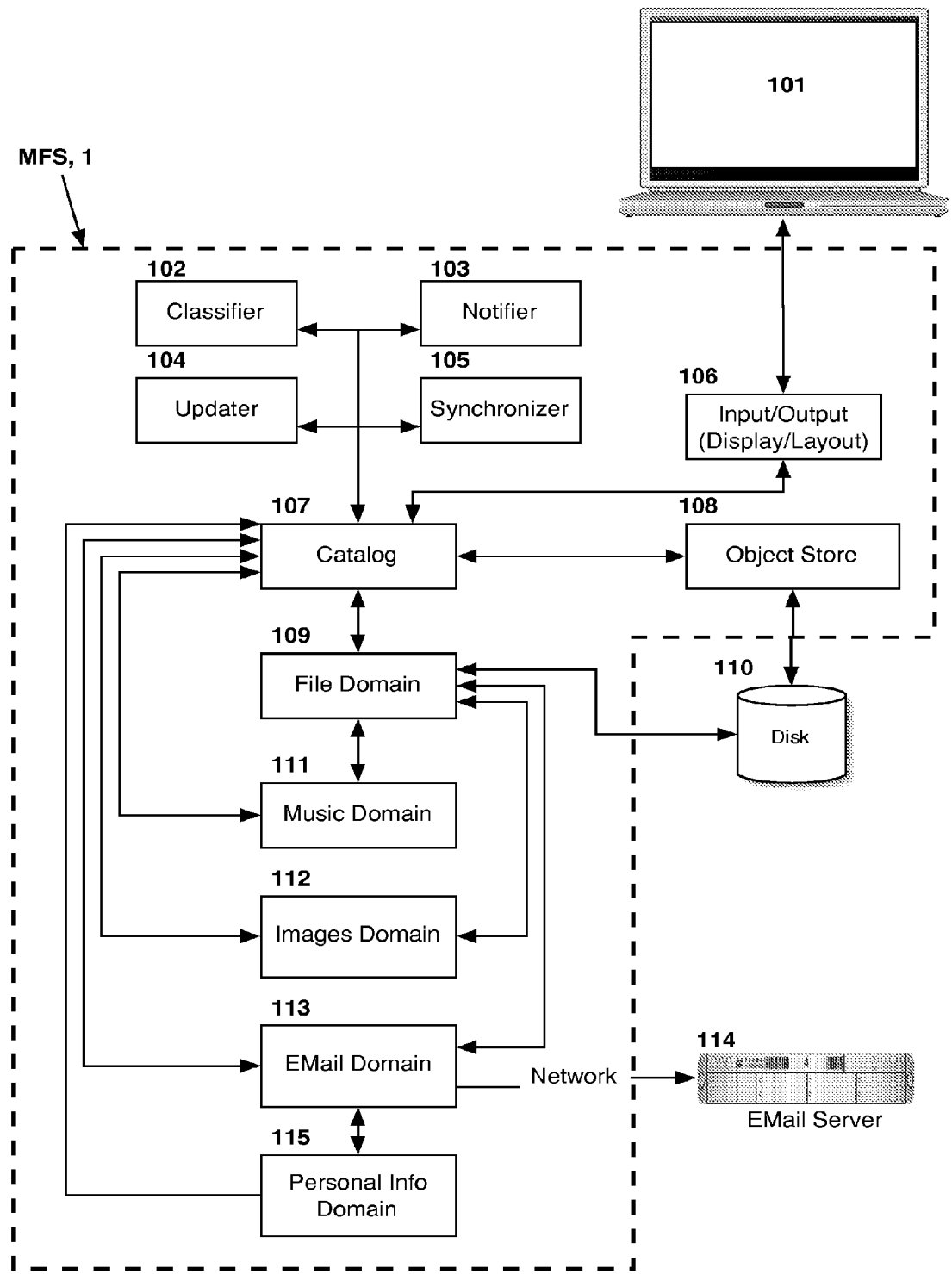
FIG. 1 is an overview of the inventive system's major features.

The operation of the inventive MFS-configured computer system is enabled, and by way of example, embodied in one or more software program(s) that configure the CPU to provide(s) the functionalities described above. The overview of the system architecture is shown in FIG. 1 as implementing a Mirrored Object System providing Property-Based Information Access, through a Comprehensive Desktop Interface, with Collections Providing Logical Groupings, with a unique method of Viewing By Reference, as an Extensible Platform. Each of these functionalities is described below, with reference to corresponding figures and discussion.

FIG. 1 illustrates a computer system comprising a computer 101 with an output display screen, an input keyboard and a memory unit, such as a hard drive, 110, and one or more network link(s) via an e-mail server 114. MFS, 1 comprises code modules, described in detail below, that interact as shown by the arrows, including: classifier 102, notifier 103, updater 104, synchronizer 105, a display, layout and input/output manager 106, the catalog metadata database 107, and the object store reference object database 108. Representative domains viewable on the desktop include a file domain 109, a music domain 111, images domain 112 an e-mail domain 113 and a personal information domain 115. The e-mail domain is linked through a network for the communication of files, music and images to and from a network link, e.g. the Internet.

Mirrored Object System. MFS, by which is meant the inventive system disclosed herein, comprises one or more application(s) for organizing all types of text and image information—from word processing documents and spreadsheets; to web pages and multimedia; to illustrations, images, movies, and photographs; to contacts, notes, and appointments; to sounds and music; or anything else that is stored and retrieved on a computer—using the concept of extensible properties and link information stored as unified metadata (annotation and link metadata) associated with a reference object.

Many of the different instances of information that a user may want to organize are already stored as different types of files in the file system, or otherwise external to the user's client computer or the user's MFS, such as web pages on the World Wide Web or records in an online database. Some information is stored one-for-one: that is, a single file represents a single piece of information (say, a text file). Other information is aggregated into a single file, or is spread across multiple files: for example, email messages are typically stored many to a file due to their small size, and records in a database may be stored across multiple files as well. MFS provides the software-enabled computer system functionality so that the user can manage all of these different sizes and types of information through portable and replicatable links to reference objects without repetitive duplication and with automatic updating. Only one of each reference object is stored in the object store, and the reference objects mirror one-for-one the pieces of information found externally (external to MFS as described above).

Figure 2:
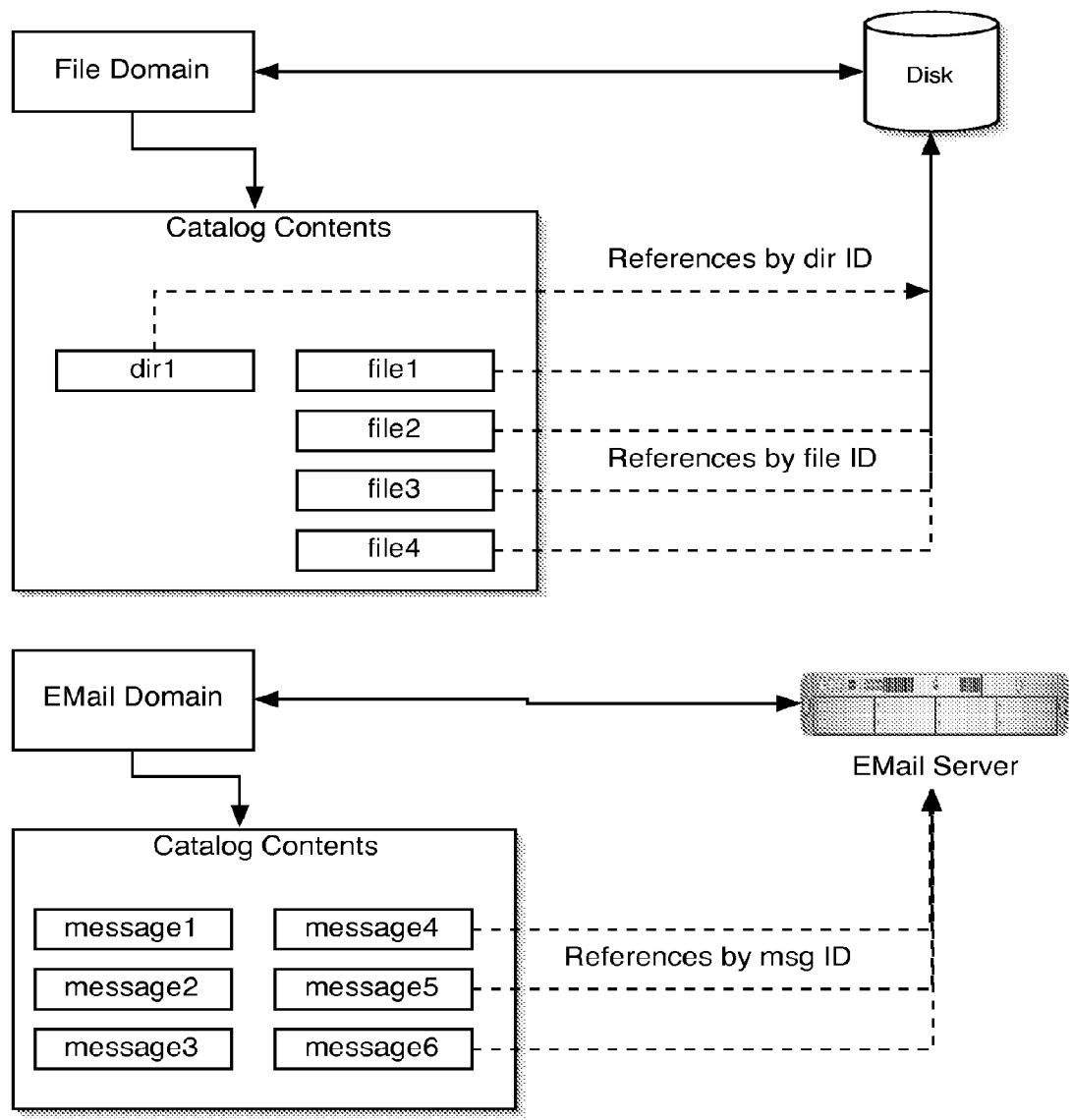
FIG. 2 is a depiction of the Mirrored Object System.

MFS may be used concurrently with other software or applications that operationally configure the computer system to modify the external data sources; these sources do not notify MFS of any changes, nor do the other applications that make changes in the system. MFS provides an internal client computer mechanism for noticing external changes in data sources such as individual files that may contain objects of interest, and for creating, deleting, or updating the appropriate reference objects within MFS as necessary, by comparing external data sources with the reference objects and making the appropriate additions, deletions and changes in the reference objects and metadata. (See FIG. 2).

Property-Based Information Access. A property is information about an object. Currently properties are used in conventional metadata format in a primitive form on computers: filenames, modification dates, folders, and possibly comments. The MFS inventive system, through the use of unified metadata (locally-stored, having been extracted from the original object, as well as links and annotations created by MFS) makes possible the attachment of system-defined as well as user-selected or created extensible properties about the content data of, or in, the object for different types of objects, thereby organizing information, regardless of the nature of the object, based on the unified metadata values stored in the catalog by the MFS inventive system.

MFS maintains for each kind of object the conventional, ordinary types of properties that common operating systems support—name and modification date, and the folder in which the file is stored—as well as links and annotations in the form of corresponding metadata defined by the MFS itself. In addition, for images, MFS stores and maintains up to date in the catalog metadata representing the image dimensions in pixels and the pixel size, as well as resolution, size, and quality. For music files, MFS stores as metadata the album, artist, song title, genre and length of song in the catalog. For contacts, the metadata information stored is the typical contact record: first and last name, phone numbers, and so on in the catalog. For Adobe documents, special Adobe-specific properties called XMP (Extended Metadata Protocol) is read from each document and stored in the metadata database catalog as well. These properties may be available by examining the images, music files, Adobe files, and so on, but are not available in a way that makes it easy to organize these pieces of information due to the data being embedded in the files in proprietary and changeable formats. MFS extracts the selected properties and stores them in the catalog in the form of metadata, where they may be viewed, modified, and used for classification into collections. These are only a few of the different types of objects managed by MFS, and the types of objects managed is unlimited by the system architecture.

Because of the use of a special metadata data storage structure in the MFS, the catalog, it is very easy and fast to find the information needed. Objects may be quickly retrieved by any expression denoting desired property values stored in the MFS metadata. Since MFS provides a separate location to store this metadata and relationships, MFS may be used with any operating system regardless of the metadata supported by the operating system directly. (See FIG. 3)

Comprehensive Desktop Interface. MFS presents information in a familiar desktop-style interface, with windows that show objects as icons or list views, among others. Window and icon sizes and locations are maintained persistently, to preserve the user's spatial arrangements. FIG. 4 shows a list of folders (401), an icon view of Photoshop files (402), a list of user-defined collections and the counts of objects within (403), a list of domains (404), a partially-hidden text view (405), a contact record (406), a note (407), and an appointment (408).

MFS goes much farther than other desktop interfaces, however, in providing new and innovative viewing mechanisms that leverage the ability of MFS to store and retrieve arbitrary metadata.

For example, preview images are created and stored by MFS as annotations, and can be very quickly displayed in a slide view. FIG. 5 shows a typical MFS window with the object name (501), a type identifier showing that it is a collection (502), a count of the objects displayed (503), a get info button (504), and a content region in which the objects are shown (505).

In a list view, FIG. 6, appropriate properties are shown for the types of objects being viewed; no longer is the user limited to viewing only the basic name-size-and-date list view. For example, music properties are shown when appropriate, since they are stored as metadata in the catalog and can be quickly retrieved. FIG. 6 shows the Music collection (601), with columns for filename (602), song title (603), artist (604), and genre (605). List views may be sorted ascending or descending; the control (606) determines this, while clicking on the column headers determine the property on which to sort.

In the icon views of FIGS. 7a, 7b and 7c, arbitrary layouts of icons and their related properties are possible; this can be done programmatically, or laid out by user preference. The standard view adornments (701 through 704) are available, and the content may be viewed either as large icon (705), large icon with additional properties available (706), or small icon (707).

As shown in FIG. 8, all views may be scaled within the window, regardless of view type (icon or list). Window (801) is scaled at 100%, while window (802) is scaled at 150%. Views may also be sorted by a variety of properties that are shared by most objects: by name, by date, by size, by count (for folders and other containers); and by kind. This is also extensible by WS to new property types.

As illustrated in FIGS. 9a and 9b, objects may also be viewed directly in their own windows. Images and text files in particular are easily examined within WS, allowing the user direct access to the data. The image window has the typical adornments (901-904; note that 903 displays the image size and percentage zoom) and the content region (905) displays the image itself. Resizing the window also resizes the image to fit the window. A text window has the standard adornments (906-909; note that 908 displays the text file size) and the content region (910) displays the file's text.

Because each object type may have different WS-usable metadata that can be extracted or synthesized from the original content data, the information window changes depending on the type of object being viewed. For example, FIGS. 10a and 10b show that image files present their metadata properties (resolution, dimensions, and so on) differently than music files (artist, song title, genre). An image file information window displays the file name (1001), tabs for file and photo data (1002 and 1003), and image-file-specific information such as width, height, resolution, and depth (1004). All information windows have a tab to show comments (1005) as well as a view of containers in which the object resides (1006), and relevant contacts and projects. A Music file information window displays the filename (1007), common file information (1008), and custom properties for music files including title, artist, album, and genre (1009).

Sometimes it is convenient to view objects in a single window without opening new windows for each. MFS provides this through the content view, illustrated in FIGS. 11a and 11b. For example, when viewing images, the content view is divided into a view of the objects in the container (1101) and the content of the selected object (1102). Of course, this is not limited to showing individual objects. Folder contents, contacts, email, and so on may also be viewed in this way. A list of email messages (1103) may be examined one at a time by selecting them; the contents are shown in the right hand pane (1104).

Finally, MFS provides a unique list view feature. List views can have arbitrary columns for property values, depending on the type of objects being displayed; these can be determined programmatically or by user preference. As is common in list-type views of data, objects in the view that are containers for other objects may be expanded, showing their contents in-line with the other objects in the list, and generally indented to indicate depth in the hierarchy.

One of the problems with a list view is that it is easy to lose one's place when scrolling through a hierarchical list of containers. When the user is looking at an item in the list, how does the user know what that item's container is if it has scrolled off the top? The hierarchical path is easily forgotten. The unique sticky path view functionality of MFS, shown in FIGS. 12a and 12b, displays hierarchies in list format, while also maintaining a current-path view at the top of the window (1201) that keeps the user oriented as to location in the hierarchy (on the path) as scrolling occurs. In this way the user always knows what the path is to the items and where the items (or, conversely, the user) are in the hierarchy. As the user scrolls through the list, MFS maintains a Sticky Path Pane at the top of the window that always displays the path to the topmost item in the list (1202, 1204, 1206), updating dynamically. When the path changes (branches) due to scrolling, the sticky path redraws to correctly identify the new current path. Only the bottom part of the window (1203, 1205, 1207) scrolls while the path is updated as required. Each branch successively "sticks" in a multi-line window at the top of the scroll window.

Collections Providing Logical Groupings. The MFS system tags objects of various kinds with the special attributes, links, and general descriptive metadata described above. Users may leverage this MFS metadata information to logically group related objects through special containers called collections. Collections permit selection of objects and contain objects that are logically-grouped by 1) user-defined categorization; 2) user or system-defined metadata query; and 3) user or system-defined key phrase matching.

User-defined categorization is enabled by a user directly specifying that a given object belongs to a given collection; this is generally achieved through dragging the object to the collection's icon in a window, though there are additional ways to provide user-defined categorization. This updates specific link metadata in both the object and the collection to indicate the relationship between the objects. (FIG. 13)

User-defined metadata queries, as shown in FIG. 14, provide automatic grouping of objects that share certain property values. These are Boolean metadata expressions used by MFS to define which objects should belong to the collection (in addition to those that were categorized by the user). For example, a collection of all JPEG files may be created by the user selecting (via a MFS-provided popup menus, and/or a type-in query line) all objects in the system that have names that end in .jpg or .jpeg, or have a file type of JPEG. The objects are immediately retrieved and displayed in the collection window. The collection's metadata query is specified in an information window, which consists of the collection name (1401) and a pane of terms (1402) which must be satisfied for objects to be collected. When the information window is closed, the collection window is shown with the collected objects (1403). Time-based collections, such as "Today", dynamically modify their metadata queries to reflect the meaning of the collection. For example, Today will update the metadata query each day to correctly specify only those objects whose modification date is during the current day. Time-based collections are particularly applicable to viewing by reference.

User- or system-defined Key Phrase Matching shown in FIG. 15 provides for automatic grouping of objects whose textual contents contain certain key phrases. For example, to group all emails, text files, etc. that mention cities and countries in Scandinavia, a collection may be created for that purpose with a query based on key words or phrases that are related to Scandinavia, and MFS will collect them together. As before, the collection's Information window specifies the collection definition; its name (1501) and a list of key phrases (1502), at least one of which must exist in an object for it to be collected. The result collection is displayed in a standard WS icon window (1503).

As shown in FIGS. 16*a* and 16*b*, because collections can group objects based on key phrases as well as by metadata properties, examining the objects can provide automatic cross-indexing and hypertext linking based on the collections defined. Text windows (1601) are annotated by underlining and coloring hypertext-linked phrases (1602). Clicking on a link will provide a popup of the collections that specify that key phrase (1603); choosing one will open that collection. If more than one collection specifies the same key phrases, all appropriate collections will be listed.

An important aspect of the inventive MFS-enabled computer system control program is shown in FIG. 17. Since it simply modifies the metadata links to indicate collection and container membership, and does not move or copy the original objects at all, objects may be classified into several different collections at once. For example, this image is in the Images collection; it is taken from the air and so was categorized in the Flying collection; it is a JPEG file so it is in the JPEG collection; it's a photo of children, so it is in the Kids collection; it was taken during a trip to Mono Lake, so it is in the Mono Lake (Blake) folder; and finally, the children in the photo are in the Ward family. All the containers that contain the object are listed (1701) and can be opened directly. In this way the user is spared from having to decide what single folder the file or object should be stored; collections can have MFS metadata links to many objects, and object links may be stored in many different collections. For example, an automobile repair bill can be filed in Auto, Repairs, and Bills simultaneously.

By way of further enabling example, a typical logical grouping involves People, Places and Activities. As part of the Personal Information Management Domain, MFS provides the ability to create named collections for places, as well as contacts and projects, around which objects may be grouped. A collection is defined for each contact, and for every project currently being worked on.

As shown in FIG. 18, MFS automatically creates such collections and organizes your email and files by examining them for the contact or project name. Automatic collections may be extended as desired; for example, if contacts have nicknames it would be appropriate for their collections to search for their nicknames as well. In a Contact window (1801) a Collection button (1802) opens the Collection that is automatically linked (1803). Note how the Bruce Horn collection has collected together all emails that reference "Bruce Horn" as well as all of the source files that were written by Bruce Horn in the development of MFS.

While metadata-query specification and key phrase matching can be viewed as database queries, collections are also dynamic: when new objects appear, or objects are edited by the user that then satisfy the metadata query, the collections are updated immediately. The collections need not be visible for this to occur, as MFS operates in the background. All collections are kept up to date at all times.

For example, as shown in FIG. 19, creating a new note regarding a trip to Norway this summer is automatically added to the Scandinavia collection. The original collection (1901) does not include the note (1902) until it is created and the word Norway is noted by MFS; then it is added (1903) and hyper-linked automatically (1904).

One easy way to leverage MFS's metadata capability is to write meaningful descriptions in the comment field for files that can be searched by collections. While some operating systems, such as Mac OS9, provide direct support for storage of comments, MFS supports comments for all objects whether or not the operating system does. All metadata created for objects within MFS is available, whether or not the host operating system provides such a feature.

Viewing by Reference. Because a collection specifies what objects should appear in the collection, objects may be in many different collections simultaneously if they satisfy each of the collections' specifications. This is a great benefit in that it allows the user to view data in a variety of ways.

For example, a car repair bill can appear in the Car collection, the Repairs collection, and Bills simultaneously.

The more collections there are, the more different ways there are to examine and navigate through information. Each collection is defined by the user as a meaningful way to view objects in the user's information space. The unique MFS cross-reference display, combined with a dynamic, time-based collection set, provides the user insight into the relationships between various objects.

This display is called view by reference. For example, the user might want to view what has happened today: what new email has been received, and what documents have been created or modified. The Today collection shows this in FIG. 20. The collection window (2001) is the same as any other Collection with the exception that the query is automatically maintained by MFS, changing as necessary.

As shown in FIG. 21, now, by switching to the reference view, the user sees all the collections that contain objects that were created or modified today. This is extremely useful in that it filters for only those collections that are relevant to Today, with no refinement (2101). Instead of showing all of the collections for all of the people that may have sent email in the past, the reference view shows only the collections that have had activity today. For example, by clicking on the Received collection (2102), the view shows the all received email (2103).

Further, as shown in FIG. 22, if the user is only interested in the Received email today, the reference view can be further refined by double-clicking on the Received collection in the left pane. This moves the Received collection to the shelf above (2201), and now only those collections relevant to Received email Today are visible. Clicking on each collection in turn shows the collection's objects that fit the specification. Selecting the Financial collection (2202) shows all the email received today that is related to financial news (2203).

Because MFS remembers settings and views, the user can set up collections and preferred ways of viewing them and keep them available at all times, constantly updated. A user may prefer to always view email through the Received collection, filtered by Today; if the user ever chooses to view previous days' email she can always view by other time collections such as Last Week, Last Month, or all received email.

Extensible Platform. Although many of the types of objects that people use in their daily work with computers are already provided by MFS, there are many scenarios where third-parties might want to leverage the power of MFS's desktop metaphor, single reference object storage, metadata linking functionality, and collection capabilities.

MFS provides an extension mechanism by which new object types, new views, and new capabilities are easily added to MFS such that their functionality is presented as seamlessly as built-in MFS features. Extensions of this sort are provided in MFS through Domains. While the MFS email and personal information domains provide much of what the standard user may want and are built in as basic application functionalities, other email and PIM domains can be developed that function within MFS following the principles of the invention disclosed herein.

Examples of other significant domains that may be developed include, but are not limited to: a music jukebox, a domain that allows the user to organize his/her music in the same way as every other piece of information in MFS; an extended Image cataloger domain; WebDAV support domain; personal finance domain; and many more. These can be easily supported and implemented within the MFS architecture as disclosed herein. (FIG. 23)

Description Summary. The extensible architecture of the inventive system enables disparate applications to share and merge information: email, contacts, notes, and so on are stored in the same data space, and can refer and cross-index each other as needed. Separate email databases, personal information management systems, and file browsers cannot perform this task. All-in-one solutions, such as Microsoft Outlook, or application suites such as Microsoft Office, are limited to the functionality provided by the original developer, and cannot be extended by third parties. The inventive MFS-enabled computer system's catalog mechanism provides unlimited support for new types of objects and new metadata, regardless of the underlying file system or operating system's features or lack thereof.

Being able to organize all of these disparate types of information using the same mechanism provides unique benefits. For example, a user can maintain a collection of all correspondence to and from a given person or related to a particular project easily, whether the correspondence was via email, documents, voice mail, fax, or image files. Similarly, a user may organize his information on a project-by-project basis; because a given item may appear in many different collections simultaneously, a person may work on several projects and their contact information will therefore appear in all of the relevant projects.

The system architecture and methodology in providing dynamic collection functionality (such as time-based collections: Today, Yesterday, Last Year, and so on), combined with real-time updating and referencing (Viewing by Reference), provides a unique and valuable mechanism for examining a user's changing information environment.

Finally, the benefits and advantages of the inventive data organization and archival system includes real-time updating of collections, which allows the software to notify the user in a variety of ways as objects enter and leave collections. For example, the user may want to attach a notification to a given person's collection, so that when the user receives email from that person a particular musical piece is played, or a voice speaks a phrase.

By way of further description of the inventive system, the following is a specific example of the use of an application program, having the functionalities outlined above which one skilled in the art will recognize is enabled in the following description, including where pertinent, pseudo-code outlines.

Exemplary Methods of Use of the Inventive MFS-Enabled System

The following is a step-by-step description of a typical use of the inventive system, embodied in a computer program running on a client (user) computer with a standard operating system and file system to store documents and other data. The use described below is of organizing and retrieving images created with a digital camera and stored on the computer in individual image files.

Adding Sources to the Working Set

In order to inform MFS of sources of information to track, the user must give MFS the appropriate directions and specifications so that MFS may find and cross-index the information. In the case of an email source, the user creates a mailbox within MFS and lists the internet addresses of the servers needed (e.g. POP/SMTP or IMAP servers). In the case of tracking information stored in files and directories in a file system, the user clicks on a folder in the computer's desktop application (the Finder in the Macintosh OS, or Explorer in Microsoft Windows) and drags it to the workspace window to add it to MFS's working set. Other sources will require different mechanisms.

The following describes use of MFS to manage and organize files in a file system; in particular, image files. For example, assume that, over a period of time, a particular computer user has taken thousands of digital images with his/her digital camera, in various places, including images of various friends and family. Assume further that he/she has already grouped these images in folders with descriptive names such as "Crest Hike 6/01" and "Cycle Oregon 9/02". These images may, in general, have embedded information in the form of metadata properties, such as image size, bit depth, date on which the photo was taken, etc.

The user starts the MFS program, and, by dragging the desired folders of images to the MFS workspace, begins the organization process. (FIG. 24)

MFS brings up a window showing the progress of the importing process, while MFS scans each file and folder, recursively, in the working set (FIG. 25a). At the end of this process, the window is removed, and the folders appear in the Workspace. (FIG. 25b).

Viewing User Data

The user may now navigate this folder using the standard and traditional methods of disk navigation in graphical user interfaces: double-clicking to open the folder into a new window; clicking on the disclosure triangle to show the folder's contents in the same view; and so on. The windows display the images in a variety of ways, including well-known icon and list views showing icons representing either the type of the file (such as a Photoshop JPEG file) or a miniature "slide" view (thumbnail) of the image itself. Displayed with the icon, typically, are properties of the object such as the object's physical size, its image dimensions, the last modified date, and so on. MFS provides additional features for viewing the images; viewing the image properties (width, height, bit depth, and so on), and basic editing features (rotation, for example).

MFS also provides a Workspace view (FIG. 26) in which the following information is visible in four separate panes:
  a. the original folders from which the images were examined (the working set); (2601)
  b. a list of all collections defined by MFS and the user; (2602)
  c. a content pane, which dynamically displays the contents of whatever item is selected in the first two views (2603). In the case of a folder or collection, the contents of the folder or collection is shown in an icon or list view; in the case of an individual item, the item itself is shown in detail (such as the full image, or contact information)
  d. and a metadata pane, which describes the currently-selected item's metadata, including the set of containers to which the item belongs. (2604)

The user may double-click on any of the folders in the top-left pane, collections in the bottom-left pane, or any item in the metadata collection set to open them in a new window.

Two other views are available (FIG. 27): a standard window, which displays the content of a folder, collection or item (2701); and a content window (2702), which displays a list of the objects within a folder or collection on the left and the details of the selected object on the right.

Double-clicking on any item opens a window on that item, at which point the user may choose how to view the item's contents. Other data, typically considered to be the object's metadata properties (e.g. name, modification date, and so on) may be displayed by selecting the item and choosing the Get Info command, which will bring up a custom information window for each type of object that displays that object's particular properties. For example, a music file would be able to show the music genre, album name, and so on, while an image file would show image width and height, along with other image-specific metadata.

Folders and collections may be viewed in a list format with the sticky path view, described above. This provides dynamic path information to the items you are viewing as you scroll through a hierarchical (folders within folders) list. (FIG. 28)

Creating a Collection

By selecting the New Collection command, the user creates a new collection for organizing the images. (FIG. 29) Two windows are then opened: the first showing the contents of the untitled empty collection, and the second, above, showing the information about the collection including the collection's title (2901). The user then types in a name for the collection—for example, "Western Travel"—and closes the window. The main collection window remains (2902), and an icon for the collection is created in the Workspace collection pane (2903).

Manually Categorizing Objects into Collections

The user may now view images from any of the source folders, and by dragging their icon representations to either the collection window or the icon representation in the Workspace, add those images to the collection. This does not move the images, nor modify them in any way; it simply updates the links in the catalog indicating that they belong to the collection. Items from any source may be dragged in this way to any collection, and items may belong to more than one collection at a time. (FIG. 30)

The user may also quickly create a collection of images by selecting the images and choosing the Collect command; this gathers together the images into a collection, which then may be renamed by the user.

Items may be re-categorized into different collections by dragging them to the new collections directly. Also, items may be removed from a collection by choosing the Remove command, which removes the items from the collection but does not otherwise delete the item from the source (e.g. the file system) or any other collections.

Creating a Collection with a Metadata Specification Query

Once the user has told MFS which information on the disk should be tracked, independent collections based on the metadata of images, say the width or height properties, may be made of the items imported as well. These collections are the same collections as described before, with the additional specification of a metadata query.

For example, say that the user would like to collect all images that have a width of 1600 pixels and a height of 1200 pixels. The user would then do the following:

Choose New Collection from the File menu. A window opens, showing the contents of the untitled empty collection, and a Get-Info sub-window opens above that with information about the collection.

The user selects the "untitled" text and changes it to "1600×1200 Images". Then the user clicks on the Query tab. An empty query appears. The user clicks on the popup menu and chooses Image.

The user clicks on the (+) button, creating a term in the query. The user clicks on the first popup, choosing the "Width" property. The user clicks on the second popup, choosing the "Equals" property. The user types 1600 into the text field.

Then, then user clicks on the (+) button again, creating a second term, and clicks on the OR popup menu. The user then performs similar operations to choose "Height Equals", and types 1200 into the text box.

Finally, the user closes the Get Info subwindow, and the appropriate images appear in the collection window. (FIG. 31).

Creating a Collection with a Key Phrase List

Another variant of the collection is one that collects items that include in their textual properties specific key phrases. For example, a Scandinavia collection may be quickly created by specifying a collection that includes the key phrases "Oslo", "Norway", "Bergen", "Copenhagen", "the little mermaid," and so on. Items with textual properties, such as a file comment or the contents of a text file that include any of these will be gathered into the collection.

Synchronizing with Changes

From time to time, the user may want to ensure that the data he/she is viewing from within MFS is consistent with the data from the outside sources, such as the file system. The user may then choose the Update command to tell MFS that it should synchronize its mirrored data structures with those elsewhere (such as the file system, the email servers, and so on). MFS will then update all information stored in the catalog and object store as required; the user will simply see the changes in the items (e.g. new items in a folder window; changed names; etc.) as they are discovered.

Overview of Specific Functional Modules Enabling the Inventive System

An exemplary MFS-enabled computer system to implement the inventive information management features comprises the following elements from which one skilled in the art will be enabled to make and use MFS:

a. a computer system as described above including a CPU, one or more input peripheral a display device and an operating system;
b. an object store data structure in which data is stored persistently on a device such as a disk drive;
c. a set of foundation objects that define items, containers, and collections, and which may be refined for particular uses;
d. a catalog data structure in which foundation objects and their properties are maintained, using the object store for reading and writing low-level data;
e. a set of consistency maintenance threads that manage information flow through the system, comprising at least one of each of: an updater, which is responsible for maintaining correct metadata for objects; a notifier, which manages dependency relationships between objects; a classifier, which assigns objects to containers and collections based on their property values; and a synchronizer, which is responsible for writing changed metadata back to the object store.
f. a display and layout system, consisting of window management routines; scenes for displaying groups of objects; figures for each object's display; forms for defining figure layout of properties; and a set of views for displaying various types of content data; and
g. a set of domains, which define objects and behaviors for different information-management tasks such as personal information management (contacts, appointments, and so on); file management (files, folders, documents, and so on); and also define scanners and matchers, which are responsible for scanning external data sources, creating and updating reference objects for each of the external objects that will be managed within MFS.

FIG. 32 describes in overview the communications between these modules. The object store (3201) sets and gets values, communicating with the synchronizer (3202). The catalog (3203) reads and writes values through the synchronizer to the catalog's property B-Trees when values change. The updater (3204) determines what the values of properties should be for various objects, and is notified by the notifier (3205) when the synchronizer (3202) writes changes to the object store (3201). The classifier (3206) determines what collections objects should be in, and runs when the notifier (3205) tells it of changes. It then writes new values for object's container list causing the catalog (3203) to write back the container list through the synchronizer (3202) and finally to the object store (3201).

The Object Store

The fundamental storage mechanism for MFS architecture is an object-oriented data-base, or the object store, that provides permanent and temporary storage facilities for low-level objects. This object store is capable of saving and restoring the complete state of any object, thus providing a persistent repository of the user's information.

Implementation. Object classes are registered with the object store at program initialization time, in order to inform the object store of the classes of objects that may be created by reading from the store. When an object is requested, the object store looks up the class of the object, which is noted in the data header of the object in the store, and requests that the object be created by the class.

A class whose instances can be stored in the object store provide six basic operations: Initialize, StreamIn, StreamOut, StreamLength, Reference, and Finalize.

Initialize is called by the object store after the object is read into memory to allow it to perform any one-time setup that is required.

StreamIn, StreamOut, StreamLength are functions that are called to ask the object to create a flattened representation of the object's information. This may include references to other objects, values, or raw data. These operations are called by the object store when creating an object to initialize the object's state from a stream of data read from the store, or to transform the object into a flat stream of data for writing out to the store. In this way each object class specifies the particular information that must be written in order that the object may be completely recreated at a future time.

Reference is called by the object store to traverse an object's reference tree. If a given object has references to any other objects, Reference must be defined to provide access to these references. This is used to attach recursively all objects that are referenced by a given object when the main object is attached to the object store. Similarly, when an object is detached the object store detaches all objects referenced by it that are referenced by that object. This operation allows the object store to determine where references to other objects occur within a given object, to allow objects within the store to contain other objects as parts.

Finalize is called just before the object is written out to the object store. It allows the object to perform any final cleanup before the object ceases to exist in memory.

Objects are attached to the object store to allow them to be stored persistently within the object store, and are detached from the object store when they are no longer persistent. Objects have a UID that is unique in the object store that never changes during the life of the program. Objects may be referenced and loaded from the object store by using this UID. The object store automatically calls the correct constructor for creating an object given an object's UID by looking up the object's class, which also resides in the object store.

All storable objects maintain a reference count for memory management. Objects that are attached to the object store may be written to the object store and removed from memory when their reference counts reach one (e.g. are only referenced by the object store). Objects that are not attached to the object store are reclaimed when their reference counts reach zero. Circular references are not detected nor managed in any way. A special smart pointer structure keeps track of when objects are being used in the program, and increments and decrements the reference count as needed. This structure maintains a pointer to the object and a reference count when the object is in memory, and a UID and pointer to the current object store when the object has not yet been loaded.

Foundation Objects

An MFS Object is something that can be organized, sorted, searched for, and otherwise manipulated by the user in MFS. MFS Objects represent entities that encapsulate a given kind of information: email messages, mailboxes, image files, text documents, and so on. Objects have intrinsic data and type (e.g. an object may be an email message) and also have attached property values.

Reference Objects. Reference objects are mapped from the external world by the creation of an identifier, the UUID that uniquely specifies a given external object. Each object type is responsible for the creation of the UID. By way of example, a file may create a UUID by using the file system's file ID or inode, combined with the volume's creation date. This allows a fast and reliable mapping between an external entity and one stored within MFS; this is needed, for example, when a file has changed on disk and MFS needs to find the internal representation to update the object's properties.

Containers. Containers group objects together. There are many different kinds of containers: disk volume, folder, and collection, by way of example. Each kind of container has different properties: a folder groups objects together physically, and a collection groups objects together logically, based on the user's specification.

Each object maintains a set of the containers in which it appears as a property of the object, called pContainers; similarly, all containers maintain a set of objects that appear in the container, called pObjects. Other properties are computed from these, such as pObjectCount, which is computed from the pObject property. These properties define some of the basic link-metadata stored for all objects in the MFS.

Collections. Collections group objects together logically, rather than physically, as folders in file systems do. Rather than specifying where an object is (e.g. in the folder named "Leslie's Finances"), collections allow the user to specify which objects should be grouped together in a variety of ways. Collections are containers, like folders or directories, in that they can be opened to display their contents, but they differ in that they:
  a. contain objects from a variety of locations;
  b. contain objects of a variety of types (e.g. not just files or folders);
  c. can have objects manually categorized by being added to the collection, or removed from the collection, without moving the original objects themselves;
  d. can display dynamic, changing contents, updated in real time, based on a working set;
  e. can automatically collect objects based on a specification, similar to a database query, by which objects are selected by Boolean combinations of property terms and operators;
  f. and can also automatically collect objects based on a key phrase search of the objects' textual properties, including its contents.

By way of example, a collection may have files from both the local file system and email messages fetched from a server; images from a digital camera may be manually classified by the user into named collections such as "Summer Vacation" and "Kids"; different sizes of digital images can be automatically classified as they are added to the working set into "4×6" and "8×10" collections by specifying different width and height queries for the given collections; and a collection for objects that have something to do with Scandinavia might have a set of key phrases defined that include the names of Scandinavian countries, cities, and geographical areas (See FIG. 15).

Like containers, collections have the link metadata property pObjects that is a set of reference objects that belong to the collection. Collections also have additional link- metadata properties called pInsiders and pOutsiders, and use additional link metadata properties in reference objects called pInclusions and pExclusions.

PInsiders is a property that contains the set of reference objects that always belong to the collection, regardless of any other collection specification. Similarly, pInclusions is the set of collections to which a given reference object belongs, again, regardless of any other action by a collection to select the object. This permits manual inclusion (categorization) of objects by MFS into collections that persists despite any automatic collection processes, such as collecting objects by metadata or key phrase query. Manually categorizing an object by adding it specifically to a given collection results in the following changes to the link-metadata:
  The object's pInclusions and pContainers properties are modified, to insert the given collection to each set;
  The collection's pInsiders and pObjects properties are similarly modified, to insert the given object into each set.

Automatic classification of objects into collections is done when the collection's pQuery property, which defines the Boolean metadata specification for objects belonging to the collection, is set to a non-empty value by the user. Setting the pKeyPhrases property also triggers automatic classification by key phrases. This begins the classification process:
  a. First, the collection's pObjects property is invalidated. This adds the collection to the Updater thread, which then requests the collection to update its metadata.
  b. The collection determines that its pObjects property is invalid. The collection asks the catalog to perform the query on the contents of the catalog, returning a set of reference objects that match the query.
  c. If the pKeyPhrases property is not empty, then the catalog also returns a set of reference objects whose textual properties (e.g. name, textual contents, etc.) contain one or more of the key phrases.
  d. The union of these two sets of objects is compared to the current set of objects that is the value of the pObjects property. This comparison returns a set of added objects, removed objects, and objects that persisted in the collection.
  e. For each added object, the object's pContainers property is updated by inserting the collection, and the collection's pObjects property is updated by inserting the object from the set;

f. For each removed object, the object's pContainers property is updated by removing the collection, and the collection's pObjects property is updated by removing the object from the set;

g. By setting the pObjects property for the collection, and the pContainers properties for the added and removed objects, the catalog creates notify events for each affected object; these events are handled by the notifier, causing affected windows to redraw as required.

In this way, the link metadata is updated so that both object metadata specifies container membership, and containers (in this case, collections) have metadata specifying the objects that belong to them.

Collections respond to changes in the environment by adding and removing objects as needed to satisfy their specification. This occurs in real time as objects change their properties (e.g. their names or textual content), as new objects are created or added to the working set, or as objects are deleted or removed from the working set. For example, if the user adds a comment to a file object and there exists a collection that specifies a key phrase that occurs in that object's comment, then the object will be immediately added to the collection. This is done by the classifier thread, described below.

For each object to be reclassified, all collection specifications are evaluated, resulting in a new set of collections for the changed object. For key phrases, the classifier can return all matching collections in one pass: key phrases are compiled into a graph, with terminal nodes listing all matching collections. Novel use of the Aho-Corasick algorithm allows text to be scanned efficiently, returning all matching collections into which the object will be classified. Then, the following MFS process occurs:

a. The set of collections is compared to the object's pContainers property, resulting in three subsets: added, removed, and persistent objects. The pInclusions set is also inserted to the added set, and the pExclusions set inserted to the removed set, to ensure that manual classifications are taken into account;

b. For each added container, the object adds itself to the collection in the manner described above: updating its pContainers property by inserting the collection, and updating the collection's pObjects property by inserting itself;

c. For each removed container, the object removes itself from the collection in the manner described above; updating its pContainers property by removing the collection, and updating the collection's pObjects property by removing itself.

d. Setting these properties causes the catalog to enqueue events on the notifier, which then causes windows to be appropriately updated (e.g. the contents of collection windows).

These processes will be described in more detail below.

The Catalog

An object may have an arbitrary number of property values attached to it in the form of MFS metadata. Property values can be textual, date, numeric, Boolean, type, or image values, among others. The catalog manages the definition of metadata (e.g. the property names and types), and the linking of objects to their property values.

Implementation. The catalog database structure stores an object's properties by providing a property object that contains a B-Tree to store the property values. The property object is stored in the object store and maintains certain information such as the property name, whether the property is a sortable or searchable property, the order of sorting, the property's data type, whether changing the property should notify other objects, the B-Tree itself, and so on. The object store provides a function to retrieve an object by name; thus, if the property pModificationDate is required, the object store is called to retrieve the object by providing the name "Modification Date," which is the property object itself. The property B-Tree data structure is also stored in the object store, and maps the object's UID to the property value for that object. In this way a new property can be added at any time, simply by creating a new property object and corresponding B-Tree in the object store. New property values for an existing property are also easily added, by first finding the correct property object and B-Tree, and then by inserting a value for an object's unique ID into that B-Tree.

Values are flattened into streams of data to be stored in the B-Tree. The value can have any length; the B-Tree node is variable length depending on the lengths of the values stored within the node.

As object MFS metadata is written through the catalog, the catalog maintains a value cache, mapping objects and properties to property values, as well as a change set that maps objects to a set of properties that have been changed. The values in the value cache are eventually written back to the property B-Trees via the synchronizer, by using the change set to determine which values need to be written.

The catalog is also responsible for notifying other parts of the MFS system of changes in objects via the consistency maintenance processes. When an object's property is written, the value is compared with the value as stored in the catalog. If the value is different, an event is created and posted to a notification queue described later in this document.

Consistency Maintenance

MFS provides a sophisticated architecture for maintaining object property values and information displays correct by supporting a threaded dataflow mechanism that processes events. In particular, the catalog provides change notification, such that when objects change their property values by setting them in the catalog, a process is started to tell all potential users of that object of the change. For example, when an object is added to or removed from a collection, all objects that are affected by that change are notified, in particular the collection's window.

Objects may depend on the property values of other objects. In the process of updating one object, others may be notified of the change; and when a property value changes, dependents are notified and specific dependent properties are then made invalid, to be updated by the updater thread.

For example, the physical size of a folder depends on the physical size of all the objects contained in that folder. Those objects may be files or other folders. The folder is thus a dependent of all the items in the folder, and thus is notified if any of them change so that it may recompute as required.

In this way, any changes to objects can be tracked and values propagated to dependent objects. For example, in a personal finance application, the values of checks written must be taken into account when balancing the checkbook; reconciling the checkbook involves propagating values from reconciled checks to the current balance.

Implementation Details. The consistency maintenance process is a composite process by which objects are created; their properties computed and set; their collections determined through classification; their dependents notified of the changes; and finally, deleted when no longer used.

There are four separate processes that communicate between one another and provide distinct services: the updater, the synchronizer, the notifier, and the classifier.

Each process communicates with the others by means of an event queue: a queue of events describing tasks to handle in order. Events on the event queue specify the information needed by each process to perform the required function.

Objects maintain a set of properties in an update set that need to be refetched from the original source (via the domain) or recomputed. When this set is changed due to the object invalidating an individual property through the Invalidate function, the object asks the catalog to add the object to the updater's queue.

Values are stored temporarily in a value cache, keyed by property and UID. Periodically the cache is synchronized with the value trees stored in the object store. At this time a notification event is queued on the notifier thread.

The notifier thread's job is to tell interested listeners which objects have been changed, and which properties of those objects. Listeners include dependent objects (e.g. containers may want to know that they have to invalidate their physical sizes if any of their contained objects had changed size) and user interface elements (windows displaying object information).

The Updater. The updater is the process by which invalid object properties are computed and new values set for future retrieval. The updater walks through the update queue and tells each object to update its properties. This is a two-part process, involving two functions: Fetch and Compute, as follows:

a. Fetch, causes the object to find the needed property values from their original sources. These are considered concrete properties in that there is a direct one-to-one correspondence between the property value for the object and a value stored elsewhere in the operating system. For example, if a file object's name is invalid, Fetch will ask the file's domain to get the filename from the file system directly; and b. Compute, updates properties that are derived from the concrete properties. For example, a derived property called pFullName might be the concatenation of pFirstName and pLastName in a contact record; or, the physical size of a folder might be the sum of the sizes of the objects within the folder.

During the Fetch and Compute methods, the object will call Set Value(property, value) on the properties for which it has determined values. SetValue tells the catalog that the property for this object has the given value, and the catalog will store it away.

In the process of storing the value for the object, the catalog determines whether the object actually changed the value; if the value being set was the same as the previous value, then nothing occurs. If the value did in fact change, the property is added to an update set maintained for that object. More specifically, the updater performs the following procedure, illustrated in FIG. 33:

a. First, the updater retrieves an update event from the updater event queue (3301). The update event record consists of an object specifier and a set of properties that require updating for that object: the invalid set.

b. Next, the updater forwards the invalid set to the object (3302), and requests that the object Fetch the given properties (3303). It is the object's responsibility to know how to do this, since for each type of object this procedure may be different. Then the updater requests the object Compute derived properties (3304) that may be based on the properties fetched (e.g. the physical size of a folder is derived from the sum of the sizes of each object in the folder).

c. During the Fetch and Compute procedures, the object being updated will set the property values that were requested (3305). In setting the value for the given object and property, the catalog stores the object and its new property and value in the synchronizer's data structure (typically a hash table) (3306), and then updates a change set (3307): a set of objects and associated properties that have been changed. This change set will be referenced by the synchronizer later in the process.

The Synchronizer. The synchronizer is the process by which objects' updated property values are written back to the object store. On a periodic interval, the synchronizer will perform the following procedure, illustrated in FIG. 34:

For each object in the catalog's change set (3401), the synchronizer will walk through the value cache (3402), where it will fetch the current (old) value (3403) and new (cached) value (3404) compare the object's property value with the current value in the property B-Tree (3405). If the value is different, the new value will replace the old (3406) and the property will remain in the value cache. If the value is the same, the property will be removed from the change set (3407).

When the object's values have been synchronized with the values stored in the object store, a notifier object changed event is created and added to the notifier's event queue (3408, 3409). This event includes the object specifier and the set of properties for which new values were written. Note that properties whose values were the same were removed from the set, so only properties with new values remained in the set and are in the notification.

The Notifier. The notifier is the process by which other processes, and objects, are notified of additions, changes, and removal of objects in the system. Concurrently, the notifier performs the following procedure, illustrated in FIG. 35:

a. The next notifier event is removed from the notifier event queue (3501). There are three different types of notifier events: an object added event, which is queued by another thread when an object is first created in the system; an object changed event, which is enqueued by the synchronizer when an object's property values are changed; and an object removed event, which is enqueued when an object is removed from the system.

b. The notifier then broadcasts the event to all listeners by going through the subscriber set (3502), copying the event (3503), and enqueuing the event on the subscriber's queue (3504). One of the typical subscribers is the classifier (3505), which receives events and determines whether the object needs to be reclassified.

c. If the event is an object changed event (3506), then the object itself is subsequently notified of the change (3507). This is done by computing dependent properties (3508), invalidating them (3509), and queuing an update event (3510) to the updater (3511) so that they are refetched and recomputed. The effect of this is that the object can then notify its own dependents, such as figures depicting the object on the screen, or other objects whose properties are dependent on properties of the original object.

Dependent properties allow the object to invalidate certain properties that are computed from other properties that had changed; for example, a container may invalidate its physical size property if its object set property had changed. Invalidating one or more of an object's properties in this way will result in the object in turn being placed on the updater's event queue as described, for further processing to compute the desired properties.

Other parts of the MFS system can subscribe to the notifier thread at any time. For example, when an object is displaying properties in a window, the window management system in MFS temporary subscribes to the notifier thread so that it may update the window contents when the object changes, such as the object's containers.

The Classifier. The classifier is the process by which objects are added to and removed from collections based on their property values. Concurrently, the classifier performs the following procedure, described in FIG. 36:

The next classifier event is removed from the classifier's event queue (3601). Since the classifier is subscribed to the notifier, it receives notifier events when objects are added to the system; when objects change their property values; and when objects are removed. In each of these cases the classifier is responsible for determining the set of containers (folders, collections, or other specific containers) to which the object belongs.

- a. If the event is an object added event (3602), then the classifier determines the set of containers to which the object belongs and creates an added set and an empty removed set (3603).
- b. If the event is an object changed event (3604), then the classifier performs the following procedure (3605). First, the existing container set is retrieved. Next, the object is classified, resulting in a set of containers to which the object should now belong. Next, these two sets are compared, resulting in the added set, which includes containers to which the object should be added; and the removed set, containers from which the object should be removed.
- c. If the event is an object removed event (3606), then the classifier creates an empty added set, and sets the removed set to the object's container set (3607).
- d. Finally, the object is added to the containers in the added set (3608), and removed from containers in the removed set (3609).

In this way, each object referenced in the classifier event queue ends up in the correct set of containers that select for its current property values.

Classification of a Single Object

The classifier determines container membership for an object through the process described in FIG. 37:

Initially, the result set, which contains the set of containers to which the object should belong, is set to empty (3701). Then the classifier asks the object's source (e.g. the File or EMail domain) to perform an initial classification of the object (3702), resulting in a new result set. The Files domain, by way of example, would add a file object to its enclosing folder.

Objects can be classified into collections by specifying in each collection a list of key phrases whose occurrence in an object means that the object should be referenced in the collection. A collection may have many key phrases, and the same key phrases may be specified in many different collections. The WS-configured computer system's key phrase classifier performs a single-pass, multiplex sorting of a given object into an unlimited number of collections based on the pKeyPhrases properties defined in those collections and the textual content of the object.

The classifier runs through each text property in the object (3703) and for each property goes through each key phrase in the classifier (3704) determining whether the key phrase exists in the property's value text (3705). If so, it adds the entire set of collections associated with the key phrase, since a single key phrase may be listed by multiple collections (3706).

The key phrase classifier is based on a novel use and implementation of the Aho-Corasick string search algorithm. The classifier begins by scanning each collection when WS is launched, and adds each key phrase to the Aho-Corasick finite state machine. At the terminal nodes for each key phrase is a list of collections that specify that phrase; as the collections are scanned and each key phrase is added, the list of collections at each key phrase is kept up to date with all collections that specify it.

All objects maintain a list of collections in which they occur. Classification is accomplished by scanning the text body of an object using the Aho-Corasick algorithm. When a key phrase is found within the text, the list of collections for that phrase is fetched from the finite-state machine and united to a final (list or set) of collections in which this object should appear. When the entire text body has been scanned, the final set is compared with the initial set. For collections that appear in both sets, nothing is done. For collections that appear in the initial set but not the final set, the object is removed from those collections. For collections that appear in the final set but not in the initial set, the object is added to those collections. Finally, the object's collection set becomes the final set, reflecting that object's membership in those sets.

Next, the classifier goes through each collection (3707) and determines if the object satisfies the query specified by the collection (3708). If so, the collection is inserted into the result set (3709).

Finally, the result set is returned (3710) and the object is placed into the collections listed in same.

View by Reference

A container C (folder, collection, or any other container) is viewed by reference using the following process.

- a. An empty result set R is created.
- b. For each object in the container C, the set of collections to which that object belongs is added to the result set.
- c. A new container V representing the reference view, is created.
- d. For each collection A in the result set R, a new proxy collection P is created, where-by the contents of the proxy collection P is simply the objects in C that are also in the collection A; this is done through a set intersection of the collection A and the container C. Generally, this proxy collection is simply defined by an MFS metadata query on P which states that the contents of the proxy collection are the intersection of the contents of collection A and container C.
- e. The final container V that is the reference view now contains a set of proxy collections, each of which holds a subset of the original objects in C.

The reference view may then be further refined by choosing a proxy collection P's contents (a subset of C's) to view by reference. This is done as follows:

- a. The reference view V adds P to its prefix set.
- b. V replaces its proxy collections with new proxy collections, using the same process as above, but with one difference: each proxy collection's MFS metadata query now states that the contents of the proxy collection are the intersection of the contents of collection A, container C, and all the collections in V's prefix set.

In this way, a view of the "Today" collection, which shows the objects modified today, can more easily be viewed by reference, which shows that (for example) the Received email collection was changed today, as well as the Documentation project. Clicking on the Received proxy collection in the view reveals email objects received today; further refining by Received will show the collections in which email was received today: typically a list of the contacts from whom email was received.

Display and Layout

MFS provides an architecture for display and layout of objects in a variety of ways. Individual objects are viewed in content viewers defined by each domain, which is responsible for the individual object types. Viewing containers of objects (e.g. collections or folders in icon or list views) is based on three classes of objects: forms, figures, and scenes. A unique type of list view is implemented by MFS's sticky paths mechanism.

Content Viewers. For each specific type of object, a content viewer is available for viewing the actual object data. By way of example, contact objects are displayed in a window showing first and last names, addresses, and so on. Email messages have their own specific viewer, with the standard to, from, and body panes within the window. Text files or notes are displayed in a standard text-editing window.

In the case of content viewers that provide text fields, key phrases can be highlighted automatically when examining the object's contents and provide a hyperlink to the defining collection automatically. If multiple collections specify a given key phrase, the popup menu will list all collections that do so, allowing the user to choose which collection should be opened.

An object that has been classified into several different containers will indicate this in the Information window, where all of the containers are listed and may be opened.

Forms. A form is a 2-dimensional layout of property values of a single object. For example, a standard icon view includes two fields: the icon property situated and centered above the name property. A list view form will include a left to right arrangement of the object's icon, name, and additional properties as required by the display. Forms are used by figures to determine the appearance of the object in the window.

Figures. A figure is a drawable entity representing an object. Figures are linked to forms, which define how the figure should be drawn. Figures also provide the ability to be highlighted when clicked; to have their properties edited directly, such as the name in an icon view; and to be dragged from one place to another within the MFS interface. Figures are arranged within scenes, which determine where each figure should be located.

Scenes. A scene is an arrangement of figures in 2 or 2½ dimensions (2½ dimensions include a representation of depth). The scene is generally responsible for determining the form the figures within the scene should take; thus, MFS defines a small icon scene whereby the form defines a small rectangle for the icon property and a rectangle to its right for the name property; a large icon scene with the icon rectangle above the name rectangle; variants on the previous; and a preview scene where the object's preview property is drawn within a slide frame, along with the object's name, size and modification date; and various list views, among others.

The scene is also responsible for locating each figure within the scene based on certain conditions. For example, in the small icon scene the objects are sorted by a given property (chosen by the user) and then laid out top-down, left-to-right in the window; scrolling to the right shows additional figures. The large icon scene lays out the figures left-to-right, then top-down in the window; scrolling down shows additional figures.

The user typically chooses which scene to display objects in, by selecting an item in the View menu. Unique and specialized scenes may be defined by domains as well, if needed.

Sticky Paths

Sticky paths are a unique way of displaying hierarchies of objects within MFS. Often hierarchies of objects are displayed in a sort of outline view, whereby objects are listed in some order (typically alphabetical), and sub-objects that are contained in other objects may be displayed or hidden at the user's control. An object that contains other objects in this way may be either expanded (displaying its sub-objects) or collapsed (hiding them). Each object has a depth, a numeric value that describes how far down the hierarchy it exists; in particular, how many nodes down the hierarchy tree from the root. Objects at the same depth are known as siblings. The depth determines how far the object is indented to the right in the outline display.

When an object is collapsed, any object that contains others is indicated in some way with a clickable region, typically a symbol such as a + sign or a triangle, that may be clicked. Clicking on the region expands the object by displaying those objects which are contained within below the object and indented to the right by a specific amount, due to their depth being one greater than the depth of the parent object. Other objects that were at the same level as the object being expanded are moved down the display by the amount needed by the expanded object.

Objects within an expanded object may in turn be expanded, resulting in several levels of expanded objects and multiple indentations.

The path to an object is defined as the name of the object itself, prefixed by the names of the nested containers in which the object exists in outermost order. For example, if an object E is contained in an object D, and in turn D is contained in C, and C is contained in B, the path to the object E is generally described as B:C:D:E.

In a highly-hierarchical display with many objects that do not fit on a single screen, the user must scroll the hierarchy display in order to see objects lower down on the list. In particular, if some objects have many sub-objects which are in turn expanded to show their respective sub-objects, it is quite easy to forget what part of the hierarchy one is looking at, i.e., where the user is on the path, since the enclosing objects have scrolled off the top of the display.

Sticky paths are a mechanism by which a scrollable outline of this form is displayed in two dynamic parts: a path area and a scrollable area. Sticky paths provide the user with a constant awareness of his location in the hierarchy by:

a. constantly displaying the current path to the topmost item in the scrollable area above the scrollable area, and dynamically updating the path as the objects are scrolled up and down;

b. dynamically resizing the scrollable area to accommodate the path display.

Implementation Details. The sticky path scrolling mechanism is implemented, by way of example, in the following pseudocode:

a. Get the old path frame from the current display.

b. Get a list of container objects that comprise the path to the topmost figure in the outline. Do this by determining the object at the top of the scrolling region, and then walking up the outline item's parent tree until there are no more parents.

c. Set the path display by starting at the top of the list and drawing each parent in turn, indented appropriate to the parent's depth.

d. Get the size of the new path frame.
e. Determine the difference between the heights of the old and new frames.
f. If the difference is zero, then the size of the path hasn't changed, and the bits can be scrolled within the scrolling region.

If there is a difference in height, then we first adjust the size and location of the scrolling region based on the amount of the change.

If the difference is greater than zero (e.g. the path is smaller than it had been previously), then we don't scroll, but we do have to refresh the topmost figures of the area that was vacated when the path region was made smaller.

If the difference is less than zero (e.g. the path is larger than it had been previously) then the resizing of the scrolling region is sufficient, and no scrolling is necessary since the topmost figure in the scrolling region will have been moved up into the vacated path area.

In this way, the current path to the topmost item is always visible.

Domains

Domains define an "area of expertise" for MFS. Typical domains include personal information management (appointments and contacts); file management (folders, files, disks); image file management (also known as digital asset management); and email, among others. Domains provide a way to extend MFS's capabilities and functions by leveraging MFS's architecture in new ways.

A domain is responsible for implementing the following procedures:
a. Registration of new object classes and properties for same;
b. Creation of new objects of specific classes when needed;
c. Creating and managing UUID mappings between reference objects and external data;
d. Adding metadata properties to objects;
e. Basic classification of objects by class and property values;
f. Updating of object metadata in response to changes in the operating environment; and
g. Performing basic operations on behalf of objects that the domain manages.

The following describes these procedures for domains defining file management, email handling, music organization, personal information management, image management, and organization by time.

The File Domain. This domain registers new object classes for disks, folders, and files. The properties that are registered include file and folder names; creation date; modification date; physical size; and permissions, among others.

The domain is also responsible for scanning folder and file objects, and resolving changes with the objects on the disk as the disk contents change. For example, when a folder's modification date differs from its corresponding object in MFS, the domain compares the folder's contents with the contents of the folder object, and creates or deletes file and folder objects in the folder object as required to match exactly the contents of the disk folder. Similarly, if a file's modification date changes, its corresponding file object is updated with the current filename, modification date, size, and so on in order to mirror exactly the file's property values.

Certain file types are handled specially by this domain. In particular, application and document files must have the appropriate icons associated with them, and behaviors such as opening a document must be defined to launch the correct application.

This domain provides window layouts for information about files and folders, and utilizes built-in MFS windows for displaying folder contents. Window layouts for certain types of files also are supported, including text files and clippings.

All sources provide the ability to scan external data to add information to the Working Set, and match the external data to update MFS's internal reference objects as the external data changes. By way of example we describe the File domain's implementation details of these two processes.

Implementation Details. The File domain is notified of files to add to the Working Set as follows. The user drags a folder to MFS's workspace window; this causes a reference object is created for the folder by the specific source handling the folder; in this case, File source, which is responsible for all file system objects. Next, a scanner thread is created with the reference object as a parameter. This thread performs the following functions, in order:
a. Traverse: A procedure recursively descends the folder hierarchy, creating data entries that are stored in an array. Each entry contains a file system specifier that represents the file; a depth in the folder hierarchy; and a flag that determines whether the file system specifier is for a folder or a file. The array is then sorted, deepest objects in the tree first (so that files within a folder are created before the folder is).
b. Annotate: Once this array has been populated, the entries are annotated with metadata that can be efficiently fetched "en masse", such as file and folder comments.
c. Create: The entries are fetched one by one from the array. For each entry, a reference object is created with the entry's information (e.g. the file specifier and any metadata that was previously fetched and added to the catalog). A new array of reference objects is created.
d. Classify: Each object in the array is then classified by examining its metadata and determining in which collections the object belongs, based on the collections' specifications. Every collection that is modified (e.g. that has received a new object through the classification process) is added to yet a third array for notification.
e. Notify: Finally, each collection that participated in the classify step is notified that it has been changed. This typically results in the collection updating dependent property values (e.g. count of contained objects), which are then updated in a separate thread.

Then, the folder reference object is then added to the HFS source's working set, which is the set of all folders that MFS should manage. The Workspace window is then updated, since the working set property determines which folders are shown in the window.

Because the file system data that the File source tracks changes over time, the File source has the ability to match these changes and propagate them throughout the catalog and object store. This is done as follows:
a. During the match process, MFS compares its stored information against the source's versions of the same information. If there is an indication of difference between a reference object in MFS and the actual external object (by noting a changed modification date, for example), MFS invalidates the reference object's metadata.

b. Once the metadata has been invalidated for all objects suspected of being changed externally, MFS puts each object on the updater queue.
c. While items exist on the updater queue, the updater does the following:
d. Takes the next item off the queue
e. Tells the object to update itself. This, in turn, causes the object to go to the source to determine what the true values should be for each of the invalid property values. Once the values have been retrieved from the source (by asking the file system for file metadata such as name, modification date, etc.), the new values are set in the catalog and the property is validated.
f. The catalog then creates notification events based on the objects and values that were set, and enqueues them on the notifier queue
g. The notifier goes through each event, telling all of the object's dependents (any containers to which the object belongs as a member, as well as any other dependent objects) that it has changed the given properties.
h. Those objects, in turn, determine whether any of their properties need invalidation. For example, if a file's size has changed, the containing folder's size property needs to be updated, since it is dependent on the sizes of all the files within the folder.

Using these two processes, scan and match, the File domain creates a Mirrored Object System within MFS that exactly represents the file and folder hierarchy that the Domain tracks, regardless of external changes.

The EMail Domain. This domain registers new object classes for mailboxes, which describe servers and passwords for retrieving mail; signatures, for signing messages; and email messages themselves. Properties for these objects include server names, addresses, and passwords, for mailboxes; a name and text string, for signatures; and the full suite of email properties for messages, including From, Date, Subject, and message body.

The domain is responsible for communicating with mail servers for both sending and receiving email; creating outgoing message objects; and for creating new received message objects as they are downloaded from the server. Attachments are handled by communication with the File domain for creating and linking to file objects as they are downloaded to disk.

Finally, window layouts are provided for outgoing and incoming email messages; mailboxes; and signatures. Behaviors such as sending messages, forwarding, replying, and so on are also supported by the domain.

The Music Domain. This domain, a client of the File domain, registers a new object for a music file, generally in the MP3 format. Properties registered include the track's title, artist, album, genre, and comments.

The domain is responsible for extracting the property values from the file using the ID3 tags that are embedded in the file, and for setting the properties in the catalog for the object. The domain also creates predefined collections for titles by album, and albums by artist, based on the music files that are handled by the system.

The domain may also provide a music player for all files in a given container; in this way the user can play all the tracks on a given album, or tracks grouped together in an arbitrary collection.

Finally, a window layout is provided for information about the music track, showing album, artist, title, and so on in addition to the generic file information such as filename, file size, and so on.

The Personal Information Domain. This domain registers new objects for contacts, notes, appointments, projects, events, and tasks. Specific properties are registered for each object: for contacts, the standard list of contact information such as first and last name, email address, phone, and so on; for notes, the note text; for appointments, the date and time, repeat interval, description, contacts, and so on; for projects, the project name and description; for events, the event name, date, and so on; and for tasks, the task description, priority, and the like.

The domain is responsible for scanning and matching with system-level address book databases, creating, deleting, and modifying contacts as required. Depending on the domain implementation, it may also match with other PIM databases such as Outlook and Palm in the same way, by creating mirror objects in MFS for each object in the target database.

The domain creates predefined collections for all notes, all contacts, and so forth, as well as predefined collections for each contact that collect all objects that reference the contact's name.

Finally, window layouts are provided for each type of object to allow display and editing of the object's data.

The Image Management Domain. This domain, a client of the File domain, registers new objects for file types that store images. Properties registered include image resolution, width, height, depth, and the like.

The domain is responsible for extracting the attribute from the file and attributing the MFS object appropriately, as well as for reading the file data and displaying it as an image within an MFS window.

The domain creates predefined collections for all images of various types (e.g. JPEG files, GIF files, Photoshop files, etc.), as well as a single Images collection for all images.

Finally, a window layout is provided for the display of image files.

The Time Domain. This domain provides no new object classes, but creates and maintains a set of dynamic collections that are based on relative time. For example, the domain creates and keeps up to date a Today collection that changes each day; similarly, Last Week, Last Month, Last Year, and collections created on demand by the user are handled by this domain.

The domain provides a root collection called Time; in this collection the various other collections are created and stored. A collection for the current year contains collections for each month of the year to date; in turn, each month has collections for each week of the month.

Finally, the domain provides window layouts for unique views of objects by time, including a Timeline view where documents are arranged by a date property within a given range, among others. This domain is particularly adaptable to use in the legal field where extensive docketing systems are required.

Additional Domains. It should be understood, as will be evident to one skilled in the art that a wide variety of other Domains may be added, e.g., Location, Space, Event, Symptom, Cause of Action, etc., as the Domains described above are merely exemplary and not limiting of the scope, nature and character of domains that the inventive system can employ. The Domains can be special in nature, as noted by the Symptom for those in the medical profession, and Cause of Action for those in the legal services profession. Another Domain could be "MO" for modus operandi, for use by investigators and police, which can be set to automatically group in collections sets of facts (objects representing text narratives of criminal activities, images and the like) based on similar MOs. This automatic building of collections could be a powerful tool in the criminal justice field. Likewise, engineering professions can build collections with similarities in data trends or values, e.g., temperatures, materials values, velocity, concentrations of chemical components, etc. for analytic purposes.

INDUSTRIAL APPLICABILITY

The inventive data storage organization, archiving, retrieval and presentation system architecture and technology can be used in a wide variety of applications; the primary being desktop file organization and server data management. The inventive system is remarkably robust, yet is a relatively small application program that can function with any type of Operating System: Microsoft Windows, Windows NT, Windows 2000, and Windows XP; Apple Macintosh OS 9 and OSX; BSD Unix, HP-UX, Sun Solaris, Linux, and the like. Currently the inventive technology is preferably implemented in its current best mode in a form that is executable on the Apple Macintosh OS9 and OSX operating systems.

As to Desktop Organization, the invention is useful as an improved desktop organization application for all types of data, limited only by the domains that can be conceived-of. Domains may be easily created to extend the MFS capabilities to new areas of expertise.

As to File Organization, similar to the Apple Macintosh Finder or Microsoft Windows Explorer, the inventive MFS system provides basic disk navigation and display features. In addition, the File domain allows additional properties to be specified for files, including: a due date; a file species (e.g. an application, a bookmark, a text-readable file, an image file, a font file, etc.); and a file path. Folders have additional properties that are maintained automatically: the size of the contents of the folder; and the depth of the folder from the root directory of the disk, among others.

As to Image Cataloging, image asset management is easily implemented as an extension of the MFS File domain. A domain that can extract relevant information from images found on disk (e.g. size, type of image, colors used, resolution, and so on) is created as a representative object within MFS that has the given properties. Users can then view and select the images that satisfy certain collection criteria. Comments on the objects can also be used to describe and/or define the content of the images, and collections can be created to organize all images based on their described/defined content.

As to Personal Information Management the inventive MFS system is useful for scheduling, organization and tracking of appointments, contacts, events, notes, projects, and tasks as typical kinds of objects that are defined by the PIM (Personal Information Management) domain. What makes the inventive system of particular interest to industry is that the PIM Domain functionality provides a new feature: the ability to organize information objects by person and by project.

As to EMail, a basic embodiment of the inventive MFS system provides basic EMail client services. The objects that the basic EMail domain defines include: mailboxes, email messages, and signatures. This can be expanded to include all types of e-business trust services, including: signature legalization; payment transfers; electronic record retention and verification; electronic filing of documents, including formal/legal documents, applications, forms and the like; privacy and confidentiality guards; identity verification and authentication; access guards; time verification and authentication, including times of sending, acceptance, receipt and performance; and the like.

As to EMail Notification, the inventive MFS system permits the user to watch all postings and create emails describing when a message will be classified into a given collection (automatic forum). This results from the functionality of the classifier; as it is data-driven, it classifies all collections simultaneously. When a key phrase is found it lists all collections from all users that specify that phrase. The phrases can be defined in Boolean search terms for the broadest inclusive categorization and inclusion.

As to Custom Desktop Client, the inventive MFS system includes, by way of example, the useful functionality of Portfolio management by which the user, as a customer of a financial services site, such as Marketocracy.com, can communicate with the site server to synchronize data, e.g., to provide automatic portfolio updates, stock quote display, market, sector and stock performance graphing, and the like.

As to Personal Finance, a personal finance domain may be implemented in MFS to provide objects for checks, checkbooks, receipts, invoices, stocks, funds, and so on. The normal accounting principles apply; the value propagation feature mechanism is used to ensure that the checkbook properties (e.g. balance) are computed from the check properties (e.g. amount of check). Stocks and funds can be updated over the network and their values displayed in MFS.

It should be understood that various modifications within the scope of this invention can be made by one of ordinary skill in the art without departing from the spirit thereof and without undue experimentation. It is apparent to those skilled in the art that many features and functionalities of the inventive MFS can be enabled and realized separately. For example, sticky paths or drag and drop link creation can each be coded in a separate application or applet, or can be provided as incremental upgrades to a program, or as plug-ins or add-ons to existing other productivity, organizational or creativity application programs or applets. That is, MFS can include less than all the dozen or more features described above, and, conversely, MFS is extensible to include additional features and is adaptable to co-operatingly interact and enhance other applications. This invention is therefore to be defined by the scope of the appended claims as broadly as the prior art will permit, and in view of the specification if need be, including a full range of current and future equivalents thereof.

What is claimed is:

1. A computer data processing system comprising:
   a computer readable memory configured to store informational objects having property identifiers associated therewith;
   a display configured to display the property identifiers of the informational objects organized within a plurality of groups, each of said groups described by a characteristic of the property identifiers of the informational objects;
   a processor coupled to said computer readable memory and to said display, said processor configured to execute computer executable instructions to:
     present on said display at least some of the property identifiers of at least one of said informational objects in a first scrollable area of said display;
     present on said display, in a second, independently scrollable area of said display, at least one of said organizational identifiers that describes those of the property identifiers of the informational objects presented in the first area of said display;

and upon scrolling of said property identifiers presented in said first area of the display, dynamically update the at least one organizational identifier of the property identifiers of said informational objects presented in said second area of said display, said dynamic updating being processed so that:

when the scrolling of the property identifiers of the informational objects presented in the first area of the display enters a beginning of a new group of said property identifiers of said informational objects, said new group described by a new organizational identifier, said new organizational identifier is rendered in said second area of said display so that said new organizational identifier is visibly displayed in said second area of said display adjacent any visible organizational identifier of a previously-entered and still open group of said property identifiers of said informational objects that includes said new group of said property identifiers of said informational objects described by the new organizational identifier, and if there is no visible organizational identifier of a previously-entered and still open group of said property identifiers of said informational objects, said new organizational identifier is visibly displayed by itself in said second area of said display;

when the scrolling continues past an end of all entries of said new group of said property identifiers of said informational objects described by the new organizational identifier to exit said new group such that the entries of said new group of said property identifiers of said informational objects are no longer visible in said second area of said display, and said new organizational identifier of said new group of said property identifiers is removed from said second area of said display, while any organizational identifiers of previously-entered groups of said property identifiers of said informational objects remain in said second area of said display until they in turn are exited; and provide continuous automatic dynamically-updated display, in said second area of said display, of at least one organizational identifier of said groups of property identifiers of said informational objects.

2. A computer data processing system as in claim 1 wherein said processor is further configured to execute computer executable instructions so as to display said second area adjacent an edge of said first area.

3. A computer data processing system as in claim 2 wherein said second area is displayed within said first area.

4. A computer data processing system as in claim 1 wherein said processor is further configured to execute computer executable instructions so as to cause at least one of:
a) rendering of said second area to be transparent, translucent, or opaque; and
b) expansion or collapse of individual groups of displayed property identifiers of said informational objects through user action.

5. A computer data processing system as in claim 1 wherein said processor is further configured to execute computer executable instructions so as to cause said second area to appear and disappear in response to user action in said first area.

6. A method, comprising:
displaying property identifiers of informational objects in a first scrollable area of a display of a processor-based device, the property identifiers organized within groups, each respective one of said groups described by a characteristic of those of the property identifiers that comprise the respective group of property identifiers;

displaying, in said first area of the display, a next organizational identifier associated with a next one of the groups of said property identifiers of informational objects;

displaying, in a second, independently scrollable area of the display, a current organizational identifier that identifies a current group of property identifiers of informational objects displayed in the first area of the display that is presently displayed adjacent to said second area of the display; and in response to a user scrolling action, changing the displayed ones of said property identifiers of informational objects and next organizational identifier in said first area of the display, and updating dynamically the displaying of the current organizational identifier in the second area of said display such that:

i) the current organizational identifier remains in said second area so long as members of the current group of property identifiers of informational objects remain displayed in the first area of the display as scrolling continues; and, ii) when the scrolling continues so that a member of the next group of property identifiers of informational objects displayed in said first area of said display, and the next organizational identifier of the next one of the groups of property identifiers of informational objects is adjacent to said second area of said display, said second area of the display is updated to include the next organizational identifier that is adjacent to said second area of said display;

thereby to provide a continuous automatic dynamically-updated display, in said second area of said display, of all organizational identifiers of a presently displayed group of property identifiers of said informational objects in said first area of said display.

7. The method of claim 6, further comprising dynamically resizing said second area of the display to accommodate presently displayed ones of the organizational identifiers therein.

8. The method of claim 6, further comprising displaying in said second area of said display each organizational identifier of groups of the property identifiers into which said user scrolling action proceeds.

9. The method of claim 8, wherein each organizational identifier of the property identifiers presently displayed in the first area of the display is displayed in the second area of the display indented in accordance with a depth of a respective group of property identifiers in a hierarchy order of said property identifiers.

10. The method of claim 9, wherein the hierarchy order of the property identifiers is displayed such that only an adjacent parent of each level of the hierarchy order is displayed as said user scrolls.

11. The method of claim 6, wherein said second area is displayed within said first area.

12. The method of claim 6, wherein said second area is displayed as a transparent or translucent overlay in a portion of said first area.

13. The method of claim 9, wherein said hierarchy order is displayed as a multi-level nested structure, wherein each level of said hierarchy order includes an identifier indicating at least of a specific level of said hierarchy order.

* * * * *